(12) United States Patent
Ambur et al.

(10) Patent No.: US 10,921,594 B2
(45) Date of Patent: *Feb. 16, 2021

(54) METHOD OF MAKING OPTICAL FILMS AND STACKS

(71) Applicant: 3M INNOVATIVE PROPERTIES COMPANY, St. Paul, MN (US)

(72) Inventors: Gregg A. Ambur, River Falls, WI (US); Timothy L. Wong, St. Paul, MN (US); Andrew J. Ouderkirk, St. Paul, MN (US); Zhisheng Yun, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/987,166

(22) Filed: May 23, 2018

(65) Prior Publication Data

US 2018/0267222 A1 Sep. 20, 2018

Related U.S. Application Data

(63) Continuation of application No. 15/380,197, filed on Dec. 15, 2016, now Pat. No. 10,007,043, which is a
(Continued)

(51) Int. Cl.
*B29D 11/00* (2006.01)
*G02B 27/01* (2006.01)
(Continued)

(52) U.S. Cl.
CPC .... *G02B 27/0172* (2013.01); *B29D 11/00644* (2013.01); *G02B 5/30* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,007,979 | A | 2/1977 | Coblitz |
| 4,653,875 | A | 3/1987 | Hines |

(Continued)

FOREIGN PATENT DOCUMENTS

| | | |
|---|---|---|
| CN | 204331144 | 5/2015 |
| DE | 1297351 | 6/1969 |

(Continued)

OTHER PUBLICATIONS

Final Office Action dated Nov. 14, 2018, U.S. Appl. No. 15/786,810, filed Oct. 18, 2017, Optical System and Magnifying Device, 10 pages.
Office Action dated Jan. 10, 2019, U.S. Appl. No. 15/901,391, filed Feb. 21, 2018, Convex Multilayer Reflective Polarizer, 6 pages.
Office Action dated Jan. 9, 2020, U.S. Appl. No. 15/902,128, filed Feb. 22, 2018, Optical System, 28 pages.
Office Action dated Jan. 22, 2020, U.S. Appl. No. 14/865,206, filed Sep. 25, 2015, Beam Expander, 13 pages.
(Continued)

*Primary Examiner* — Mathieu D Vargot
(74) *Attorney, Agent, or Firm* — Clifton F. Richardson

(57) ABSTRACT

Methods of making optical films and optical stacks are described. A method of making an optical lens molded to a first curved optical film includes providing a first optical film including alternating first and second polymeric layers; providing a thermoform tool having a curved surface; heating and conforming the first optical film to the curved surface to form a first curved optical film; and molding an optical lens onto the first curved optical film.

16 Claims, 29 Drawing Sheets

Related U.S. Application Data continuation of application No. 14/865,608, filed on Sep. 25, 2015, now Pat. No. 9,555,589.

(60) Provisional application No. 62/214,049, filed on Sep. 3, 2015.

(51) Int. Cl.

| | | |
|---|---|---|
| *G02B 13/00* | (2006.01) | |
| *G02B 17/08* | (2006.01) | |
| *G02B 5/30* | (2006.01) | |
| *G02B 27/14* | (2006.01) | |
| *G02B 27/28* | (2006.01) | |
| *G02B 27/00* | (2006.01) | |
| *G02B 27/09* | (2006.01) | |
| *G03B 21/28* | (2006.01) | |

(52) U.S. Cl.
CPC ........... *G02B 5/305* (2013.01); *G02B 5/3041* (2013.01); *G02B 5/3058* (2013.01); *G02B 5/3066* (2013.01); *G02B 5/3083* (2013.01); *G02B 13/0055* (2013.01); *G02B 17/0804* (2013.01); *G02B 17/0856* (2013.01); *G02B 27/0068* (2013.01); *G02B 27/0081* (2013.01); *G02B 27/0905* (2013.01); *G02B 27/0983* (2013.01); *G02B 27/144* (2013.01); *G02B 27/145* (2013.01); *G02B 27/148* (2013.01); *G02B 27/283* (2013.01); *G02B 27/286* (2013.01); *G03B 21/28* (2013.01); *G02B 17/0896* (2013.01); *G02B 2027/011* (2013.01); *G02B 2027/013* (2013.01); *G02B 2027/0138* (2013.01)

(56) References Cited

U.S. PATENT DOCUMENTS

| | | |
|---|---|---|
| 5,517,366 A | 5/1996 | Togino |
| 5,644,436 A | 7/1997 | Togino et al. |
| 5,654,828 A | 8/1997 | Togino |
| 5,662,951 A | 9/1997 | Greshes |
| 5,715,023 A | 2/1998 | Hoppe |
| 5,768,039 A | 6/1998 | Togino |
| 5,801,885 A | 9/1998 | Togino |
| 5,853,240 A | 12/1998 | Tanaka et al. |
| 5,867,239 A | 2/1999 | Sahouani et al. |
| 5,882,774 A | 3/1999 | Jonza |
| 5,988,813 A | 11/1999 | Neadle et al. |
| 6,008,947 A | 12/1999 | Togino |
| 6,074,579 A | 6/2000 | Greshes |
| 6,075,651 A | 6/2000 | Hoppe |
| 6,180,033 B1 | 1/2001 | Greshes |
| 6,262,841 B1 | 7/2001 | Dike |
| 6,266,194 B1 | 7/2001 | Tanijiri |
| 6,271,969 B1 | 8/2001 | Mertz |
| 6,366,400 B1 | 4/2002 | Ohzawa |
| 6,400,493 B1 | 6/2002 | Mertz |
| 6,421,183 B1 | 7/2002 | Ophey |
| 6,480,338 B1 | 11/2002 | Ohzawa |
| 6,487,021 B1 | 11/2002 | Ophey |
| 6,519,090 B2 | 2/2003 | Endo |
| 6,609,795 B2 | 8/2003 | Weber |
| 6,661,495 B1 | 12/2003 | Popovich |
| 6,785,049 B1 | 8/2004 | Boyd et al. |
| 6,788,463 B2 | 9/2004 | Merrill |
| 6,910,440 B2 | 7/2005 | Jackson |
| 7,123,418 B2 | 10/2006 | Weber |
| 7,153,122 B2 | 12/2006 | Jackson |
| 7,206,134 B2 | 4/2007 | Weissman et al. |
| 7,229,271 B2 | 6/2007 | Merrill |
| 7,242,524 B2 | 7/2007 | Dike |
| 7,242,525 B2 | 7/2007 | Raymond |
| 7,445,340 B2 | 11/2008 | Conner et al. |
| 7,529,029 B2 | 5/2009 | Duncan et al. |
| 7,740,470 B2 | 6/2010 | Merrill |
| 7,771,045 B2 | 8/2010 | Matera et al. |
| 8,064,137 B2 | 11/2011 | Dike |
| 8,279,395 B2 | 10/2012 | Chen |
| 8,305,690 B2 | 11/2012 | Ruhle et al. |
| 8,384,852 B2 | 2/2013 | Biernath |
| 8,493,520 B2 | 7/2013 | Gay |
| 8,642,159 B2 | 2/2014 | Konokawa et al. |
| 8,662,687 B2 | 3/2014 | Weber et al. |
| 8,780,039 B2 | 7/2014 | Gay |
| 9,176,340 B1 | 11/2015 | Mahdi et al. |
| 9,323,059 B2 | 4/2016 | Wang et al. |
| 9,405,048 B2 | 8/2016 | Oya et al. |
| 9,470,896 B2 | 10/2016 | Dobschal et al. |
| 9,477,011 B2 | 10/2016 | Liu et al. |
| 9,513,420 B2 | 12/2016 | Derks et al. |
| 9,555,589 B1 * | 1/2017 | Ambur ................. G02B 30/34 |
| 9,557,568 B1 | 1/2017 | Ouderkirk et al. |
| 9,581,744 B1 | 2/2017 | Yun et al. |
| 9,581,827 B1 | 2/2017 | Wong et al. |
| 9,599,761 B1 | 3/2017 | Ambur et al. |
| 9,715,114 B2 | 7/2017 | Yun et al. |
| 9,836,122 B2 | 12/2017 | Border |
| 10,007,043 B2 * | 6/2018 | Ambur ................. G02B 5/3041 |
| 2002/0057498 A1 | 5/2002 | Kobayashi |
| 2002/0101664 A1 | 8/2002 | King et al. |
| 2002/0154406 A1 | 10/2002 | Merrill et al. |
| 2002/0159150 A1 | 10/2002 | King et al. |
| 2002/0180916 A1 | 12/2002 | Schadt |
| 2003/0028048 A1 | 2/2003 | Cherkaoui |
| 2004/0014504 A1 | 1/2004 | Coates |
| 2004/0057138 A1 | 3/2004 | Tanijiri et al. |
| 2005/0072959 A1 | 4/2005 | Moia |
| 2005/0111101 A1 | 5/2005 | Dike |
| 2007/0018351 A1 * | 1/2007 | Ishizawa ................. F21S 41/37 264/255 |
| 2007/0047230 A1 | 3/2007 | Yamazaki et al. |
| 2007/0104073 A1 | 5/2007 | Kato et al. |
| 2007/0273970 A1 | 11/2007 | Hoppe et al. |
| 2008/0129931 A1 | 6/2008 | Takahashi et al. |
| 2009/0290079 A1 | 11/2009 | Evans et al. |
| 2010/0177113 A1 | 7/2010 | Gay |
| 2010/0214762 A1 | 8/2010 | Nevitt et al. |
| 2010/0254002 A1 | 10/2010 | Merrill |
| 2010/0328578 A1 | 12/2010 | Biernath et al. |
| 2011/0193814 A1 | 8/2011 | Gay |
| 2011/0205627 A1 | 8/2011 | Kobuchi et al. |
| 2011/0228511 A1 | 9/2011 | Weber et al. |
| 2011/0249332 A1 | 10/2011 | Merrill et al. |
| 2011/0255167 A1 | 10/2011 | Merrill et al. |
| 2012/0056897 A1 | 3/2012 | Okamoto |
| 2012/0057228 A1 | 3/2012 | Okamoto |
| 2012/0062990 A1 | 3/2012 | Okamoto |
| 2012/0069264 A1 | 3/2012 | Inoue |
| 2013/0044373 A1 | 2/2013 | Kaida et al. |
| 2013/0057961 A1 | 3/2013 | Evans |
| 2013/0100530 A1 | 4/2013 | Weber et al. |
| 2014/0029096 A1 | 1/2014 | Kessler et al. |
| 2015/0070773 A1 | 3/2015 | Wang et al. |
| 2015/0160529 A1 | 6/2015 | Popovich et al. |
| 2015/0187115 A1 | 7/2015 | MacDonald et al. |
| 2015/0212326 A1 | 7/2015 | Kress et al. |
| 2015/0234191 A1 | 8/2015 | Schowengerdt |
| 2015/0235427 A1 | 8/2015 | Nobori et al. |
| 2015/0325816 A1 | 11/2015 | Haag et al. |
| 2015/0370074 A1 | 12/2015 | McDowall et al. |
| 2015/0378074 A1 | 12/2015 | Kollin et al. |
| 2016/0018654 A1 | 1/2016 | Haddick et al. |
| 2016/0245972 A1 | 8/2016 | Yamanaka et al. |
| 2016/0306088 A1 | 10/2016 | Ouderkirk et al. |
| 2016/0349508 A1 | 12/2016 | Horikawa |
| 2017/0017077 A1 | 1/2017 | Tang et al. |
| 2017/0068096 A1 | 3/2017 | Ouderkirk et al. |
| 2017/0068099 A1 | 3/2017 | Ouderkirk et al. |
| 2017/0068100 A1 | 3/2017 | Ouderkirk et al. |
| 2017/0068101 A1 | 3/2017 | Yun et al. |
| 2017/0068104 A1 | 3/2017 | Ouderkirk et al. |
| 2017/0068105 A1 | 3/2017 | Yun et al. |

(56) References Cited

U.S. PATENT DOCUMENTS

| | | |
|---|---|---|
| 2017/0097449 A1 | 4/2017 | Ouderkirk et al. |
| 2017/0097453 A1 | 4/2017 | Ambur et al. |
| 2017/0097454 A1 | 4/2017 | Wong et al. |
| 2017/0146714 A1 | 5/2017 | Ambur et al. |
| 2017/0269368 A1 | 9/2017 | Yun et al. |
| 2017/0343820 A1 | 11/2017 | Osterhout |
| 2018/0039004 A1 | 2/2018 | Yun et al. |
| 2018/0059296 A1 | 3/2018 | Ouderkirk et al. |
| 2018/0180784 A1 | 6/2018 | Ouderkirk et al. |
| 2018/0180788 A1 | 6/2018 | Ambur et al. |
| 2018/0196181 A1 | 7/2018 | Wong et al. |
| 2018/0239149 A1 | 9/2018 | Yun et al. |
| 2018/0267222 A1 | 9/2018 | Ambur et al. |
| 2018/0267319 A1 | 9/2018 | Ouderkirk et al. |
| 2019/0235235 A1 | 8/2019 | Ouderkirk et al. |
| 2019/0265465 A1 | 8/2019 | Wong et al. |
| 2019/0265466 A1 | 8/2019 | Yun et al. |
| 2019/0265467 A1 | 8/2019 | Yun et al. |

FOREIGN PATENT DOCUMENTS

| | | |
|---|---|---|
| EP | 0803756 | 10/1997 |
| EP | 1014154 | 6/2000 |
| EP | 1014155 | 6/2000 |
| EP | 1096293 | 5/2001 |
| EP | 0718645 | 6/2003 |
| EP | 2372431 | 10/2011 |
| EP | 2889671 | 7/2015 |
| GB | 2274727 | 8/1994 |
| JP | 07-074973 | 7/1995 |
| JP | 07-175009 | 7/1995 |
| JP | 07-231413 | 8/1995 |
| JP | 08-110492 | 4/1996 |
| JP | 08-122642 | 5/1996 |
| JP | 09-211377 | 8/1997 |
| JP | 2002-214545 | 7/2002 |
| JP | 2013-130647 | 7/2013 |
| JP | 2013-200482 | 10/2013 |
| JP | 2014-139664 | 7/2014 |
| JP | 3199148 | 8/2015 |
| KR | 20060078094 | 7/2006 |
| TW | 200935090 | 8/2009 |
| WO | WO 99-30199 | 6/1999 |
| WO | WO 00-70386 | 11/2000 |
| WO | WO 01-02893 | 1/2001 |
| WO | WO 01/10137 | 2/2001 |
| WO | WO 02-03122 | 1/2002 |
| WO | WO 02-099508 | 12/2002 |
| WO | WO 2007-056072 | 5/2007 |
| WO | WO 2007-096521 | 8/2007 |
| WO | WO 2010-064582 | 6/2010 |
| WO | WO 2011-091314 | 7/2011 |
| WO | WO 2012-140503 | 10/2012 |
| WO | WO 2013-152205 | 10/2013 |
| WO | WO 2014-031326 | 2/2014 |
| WO | WO 2014-130283 | 8/2014 |
| WO | WO 2014-197539 | 12/2014 |
| WO | WO 2015-34801 | 3/2015 |

OTHER PUBLICATIONS

Office Action dated Jan. 31, 2020, U.S. Appl. No. 16/108,301, filed Aug. 22, 2018, Optical System, 23 pages.
Yun, U.S. Appl. No. 16/108,301, filed Aug. 22, 2018, Optical System.
Office Action dated Jan. 2, 2018, U.S. Appl. No. 14/865,063, filed Sep. 25, 2015, Optical System, 18 pages.
Office Action dated Jul. 9, 2018, U.S. Appl. No. 15/786,810, filed Oct. 18, 2017, Optical System and Magnifying Device, 12 pages.
Office Action dated Sep. 7, 2018, U.S. Appl. No. 15/988,264, filed May 24, 2018, Head-Mounted Display, 10 pages.

International Search Report for PCT International Application No. PCT/US2015/052258 dated Mar. 17, 2016, 5 pages.
International Search Report for PCT International Application No. PCT/US2015/052100 dated Jun. 2, 2016, 4 pages.
International Search Report for PCT International Application No. PCT/US2015/052105 dated Jun. 2, 2016, 4 pages.
International Search Report for PCT International Application No. PCT/US2015/052139 dated May 30, 2016, 6 pages.
International Search Report for PCT International Application No. PCT/US2015/052246 dated Jun. 28, 2016, 6 pages.
International Search Report for PCT International Application No. PCT/US2015/052122 dated Jul. 14, 2016, 8 pages.
International Search Report for PCT International Application No. PCT/US2015/052098 dated Aug. 1, 2016, 7 pages.
International Search Report for PCT International Application No. PCT/US2015/052115 dated Jul. 20, 2016, 7 pages.
International Search Report for PCT International Application No. PCT/US2015/052110 dated Jul. 14, 2016, 7 pages.
International Search Report for PCT International Application No. PCT/US2015/052229 dated Jul. 14, 2016, 8 pages.
International Search Report for PCT International Application No. PCT/US2015/052141 dated Aug. 30, 2016, 8 pages.
Office Action dated Mar. 10, 2016 in U.S. Appl. No. 14/865,017, filed Sep. 25, 2015, Optical System, 32 pages.
Final Office Action dated Jul. 6, 2016 in U.S. Appl. No. 14/865,017, filed Sep. 25, 2015, Optical System, 17 pages.
Office Action dated Apr. 8, 2016 in U.S. Appl. No. 14/865,031, filed Sep. 25, 2015, Optical System, 12 pages.
Office Action dated Apr. 6, 2016 in U.S. Appl. No. 14/865,063, filed Sep. 25, 2015, Optical System, 16 pages.
Office Action dated May 12, 2016 in U.S. Appl. No. 14/865,206, filed Sep. 25, 2015, Beam Expander, 19 pages.
Office Action dated Sep. 2, 2016 in U.S. Appl. No. 14/865,206, filed Sep. 25, 2015, Beam Expander, 16 pages.
Ex Parte Quale Action dated Jul. 15, 2016 in U.S. Appl. No. 14/865,361, filed Sep. 25, 2015, Head-Mounted Display, 6 pages.
Office Action dated Mar. 7, 2016 in U.S. Appl. No. 14/865,394, filed Sep. 25, 2015, Camera, 19 pages.
Final Office Action dated Jul. 6, 2016 in U.S. Appl. No. 14/865,394, filed Sep. 25, 2015, Camera, 16 pages.
Office Action dated May 11, 2016 in U.S. Appl. No. 14/865,439, filed Sep. 25, 2015, Magnifying Device, 16 pages.
Final Office Action dated Aug. 17, 2016 in U.S. Appl. No. 14/865,439, filed Sep. 25, 2015, Magnifying Device, 11 pages.
Final Office Action dated May 3, 2017, U.S. Appl. No. 14/865,394, filed Sep. 25, 2015, Camera, 24 pages.
Office Action dated May 2, 2017, U.S. Appl. No. 14/865,031, filed Sep. 25, 2015, Optical System, 29 pages.
Office Action dated Oct. 21, 2016, U.S. Appl. No. 14/865,017, filed Sep. 25, 2015, Optical System, 13 pages.
Office Action dated Dec. 13, 2016, U.S. Appl. No. 14/865,439, filed Sep. 25, 2015, Magnifying Device, 15 pages.
Office Action dated Dec. 21, 2016, U.S. Appl. No. 14/865,394, filed Sep. 25, 2015, Camera, 21 pages.
Final Office Action dated Jan. 19, 2017, U.S. Appl. No. 14/865,206, filed Sep. 25, 2015, Beam Expander, 21 pages.
Final Office Action dated Apr. 28, 2017, U.S. Appl. No. 14/865,017, filed Sep. 25, 2015, Optical System, 14 pages.
Examiner's Answer to Appeal Brief dated Nov. 17, 2017, U.S. Appl. No. 14/865,206, filed Sep. 25, 2015, Beam Expander, 20 pages.
Examiner's Answer to Appeal Brief dated Jan. 4, 2018, U.S. Appl. No. 14/865,017, filed Sep. 25, 2015, Optical System, 13 pages.
Examiner's Answer to Appeal Brief dated Jan. 11, 2018, U.S. Appl. No. 14/865,394, filed Sep. 25, 2015, Camera, 20 pages.
Yun, U.S. Appl. No. 15/956,887, filed Apr. 19, 2018, Optical Stack and Optical System.
Ouderkirk, U.S. Appl. No. 15/988,264, filed May 24, 2018, Head-Mounted Display.
Office Action dated Sep. 26, 2018, U.S. Appl. No. 15/956,8871, filed Apr. 19, 2018, Optical Stack and Optical System, 9 pages.

\* cited by examiner

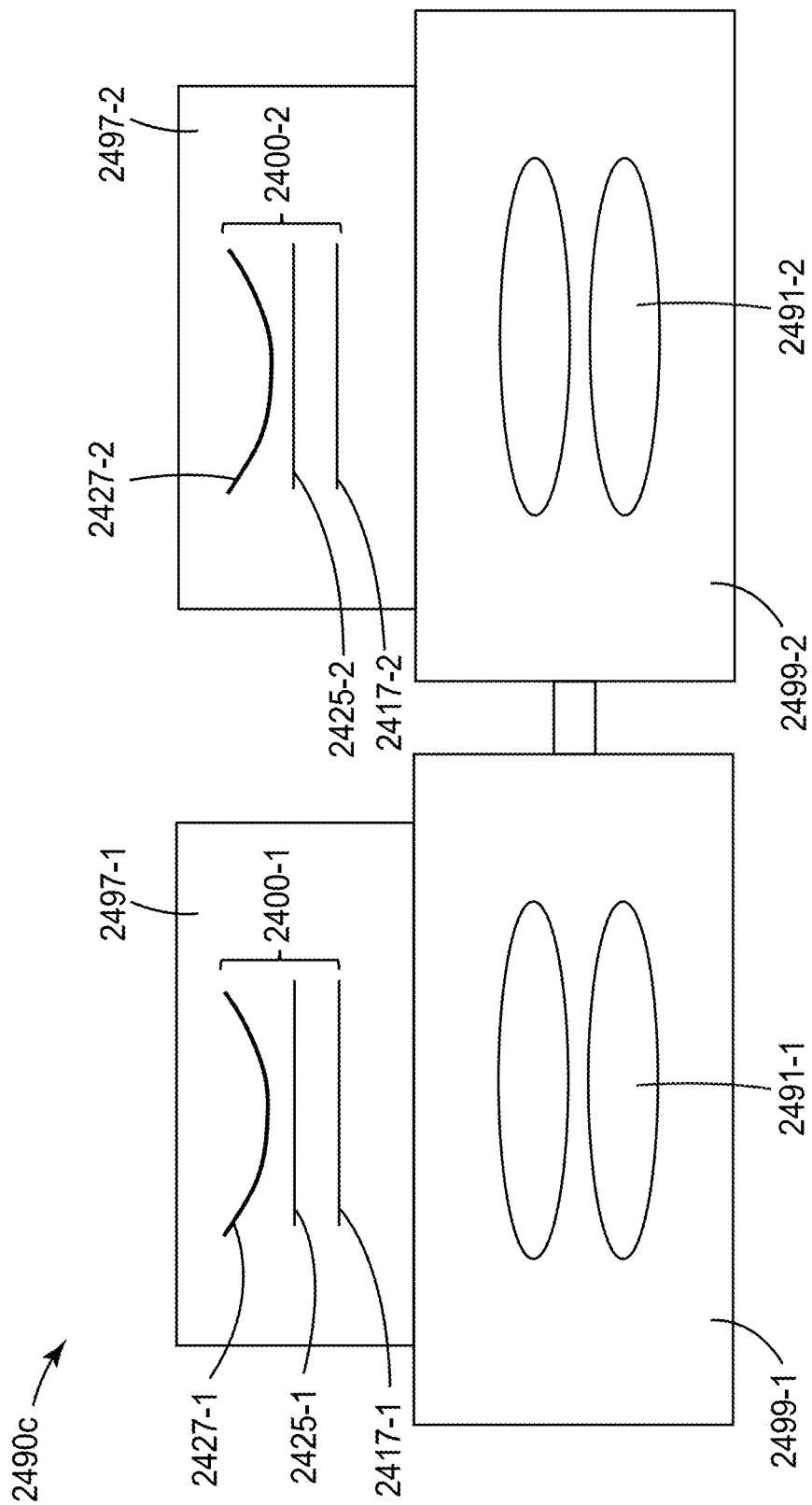

METHOD OF MAKING OPTICAL FILMS AND STACKS

This application is a continuation of application Ser. No. 15/380,197, filed on Dec. 15, 2016, now U.S. Pat. No. 10,007,043, which is a continuation of application Ser. No. 14/865,608, filed on Sep. 25, 2015, now U.S. Pat. No. 9,555,589.

BACKGROUND

Display systems may include a beam splitter, a quarter wave retarder and a reflective polarizer.

U.S. Pat. No. 7,242,525 (Dike) describes an optical system that projects a real image into space and includes one or more features located along the optical path that enhance the viewability of the real image. The optical system includes a converging element for converging a portion of source light so as to form the real image.

U.S. Pat. No. 6,271,969 (Mertz) describes an optical collimating assembly for imaging light from a display. The optical assembly includes first and second linear polarization filters having polarization directions that are orthogonal to one another. A folded imaging assembly that includes a first beam splitter, a first Y4 wave plate, and a second beam splitter is located between the polarization filters.

U.S. Pat. No. 8,780,039 (Gay et al.) describes an optical system for varying the shape of a surface in which an image displayed by the display device is perceived. The optical system comprises first and second spaced-apart partial reflectors, at least one of which is switchable between a first non-flat shape and a second different shape, which may be flat or non-flat. The reflectors, together with polarization optics, provide a light path such that light from the display is at least partially transmitted by the first reflector, partially reflected by the second reflector, partially reflected by the first reflector and partially transmitted by the second reflector. Reflective polarizers may be multilayer optical films. U.S. Pat. No. 6,916,440 (Jackson et al.) describes a process for stretching multilayer optical films in a uniaxial fashion. U.S. Pat. No. 6,788,463 (Merrill et al) describes post-formed multilayer optical films.

SUMMARY

In some aspects of the present description, an optical system including an image surface, a stop surface, a first optical stack disposed between the image surface and the stop surface, and a second optical stack disposed between the first optical stack and the stop surface is provided. The first optical stack is convex toward the image surface along orthogonal first and second axes, and includes a first optical lens and a partial reflector having an average optical reflectance of at least 30% in a desired plurality of wavelengths. The second optical stack is convex toward the image surface along the first and second axes, and includes a second optical lens, a multilayer reflective polarizer substantially transmitting light having a first polarization state and substantially reflecting light having an orthogonal second polarization state, and a first quarter wave retarder disposed between the reflective polarizer and the first optical stack.

In some aspects of the present description, an optical system including an image surface, a stop surface, a first optical stack disposed between the image surface and the stop surface, and a second optical stack disposed between the first optical stack and the stop surface is provided. The first optical stack includes a first optical lens, and a partial reflector having an average optical reflectance of at least 30% in a desired plurality of wavelengths. The second optical stack includes a second optical lens, a multilayer reflective polarizer including at least one layer substantially optically biaxial at at least one first location on the at least one layer away from an optical axis of the second optical stack and substantially optically uniaxial at at least one second location away from the optical axis, and a first quarter wave retarder disposed between the reflective polarizer and the first optical stack. Substantially any chief light ray that passes through the image surface and the stop surface is incident on each of the first optical stack and the second optical stack with an angle of incidence less than about 30 degrees.

In some aspects of the present description, an optical system including an image source emitting an undistorted image, an exit pupil, a partial reflector and a reflective polarizer is provided. The partial reflector has a first shape convex toward the image source along orthogonal first and second axes and has an average optical reflectance of at least 30% in a pre-determined plurality of wavelengths. The reflective polarizer has a different second shape convex toward the image source along the first and second axes, such that a distortion of the emitted undistorted image transmitted by the exit pupil is less than about 10%.

In some aspects of the present description, an optical system including an image source, an exit pupil, a first optical stack disposed between the image source and the exit pupil, and a second optical stack disposed between the first optical stack and the exit pupil is provided. The first optical stack includes a first optical lens, and a partial reflector having an average optical reflectance of at least 30% in a desired plurality of wavelengths. The second optical stack includes a second optical lens, a multilayer reflective polarizer, and a first quarter wave retarder disposed between the reflective polarizer and the first optical stack. Substantially any chief light ray having at least first and second wavelengths at least 150 nm apart in the desired plurality of wavelengths and emitted by the image source and transmitted by the exit pupil has a color separation distance at the exit pupil of less than 1.5 percent of a field of view at the exit pupil.

In some aspects of the present description, an optical system including an image source, an exit pupil, a first optical stack disposed between the image source and the exit pupil, and a second optical stack disposed between the first optical stack and the exit pupil is provided. The first optical stack includes a first optical lens, and a partial reflector having an average optical reflectance of at least 30% in a desired plurality of wavelengths. The second optical stack includes a second optical lens, a multilayer reflective polarizer, and a first quarter wave retarder disposed between the reflective polarizer and the first optical stack. Substantially any chief light ray having at least first and second wavelengths at least 150 nm apart in the desired plurality of wavelengths and emitted by the image source and transmitted by the exit pupil has a color separation distance at the exit pupil of less than 20 arc minutes.

In some aspects of the present description, an optical system including an image surface having a maximum lateral dimension A, a stop surface having a maximum lateral dimension B, and an integral optical stack disposed between the image surface and the stop surface is provided. A/B is at least 3. The integral optical stack includes a first optical lens, a partial reflector having an average optical reflectance of at least 30% in a pre-determined plurality of wavelengths, a multilayer reflective polarizer substantially transmitting light having a first polarization state and substantially reflecting light having an orthogonal second polarization state, and a first quarter wave retarder at at least one wavelength in the pre-determined plurality of wavelengths. At least one chief light ray transmitted through the stop surface and the image surface passes through the stop surface at an incident angle of at least 40 degrees. An integral optical stack may be described as an optical stack with the various components and layers in the optical stack formed together or adhered together, for example.

In some aspects of the present description, an optical system including an image surface, a substantially planar stop surface, and, disposed between the image surface and the stop surface, first, second and third optical lenses, a partial reflector having an average optical reflectance of at least 30% in a pre-determined plurality of wavelengths, a multilayer reflective polarizer substantially transmitting light having a first polarization state and substantially reflecting light having an orthogonal second polarization state, and a first quarter wave retarder at at least one wavelength in the pre-determined plurality of wavelengths is provided. The optical system includes a plurality of major surfaces disposed between the image surface and the stop surface, each major surface convex toward the image surface along orthogonal first and second axes, and at least six different major surfaces have six different convexities.

In some aspects of the present description, a thermoformed multilayer reflective polarizer substantially rotationally symmetric about an optical axis passing thorough an apex of the thermoformed multilayer reflective polarizer and convex along orthogonal first and second axes orthogonal to the optical axis is provided. The thermoformed multilayer reflective polarizer has at least one inner layer substantially optically uniaxial at at least one first location away from the apex, and at least one first location on the reflective polarizer having a radial distance, r1, from the optical axis and a displacement, s1, from a plane perpendicular to the optical axis at the apex, where s1/r1 is at least 0.2.

In some aspects of the present description, a thermoformed multilayer reflective polarizer substantially rotationally symmetric about an optical axis passing thorough an apex of the thermoformed multilayer reflective polarizer and convex along orthogonal first and second axes orthogonal to the optical axis is provided. The thermoformed multilayer reflective polarizer has at least one first location on the reflective polarizer having a radial distance, r1, from the optical axis and a displacement, s1, from a plane perpendicular to the optical axis at the apex, where s1/r1 is at least 0.2. For an area of the reflective polarizer defined by s1 and r1, a maximum variation of a transmission axis of the reflective polarizer is less than about 2 degrees.

In some aspects of the present description, a method of making an optical stack is provided. The method includes the steps of providing a thermoform tool centered on a tool axis and having an external surface rotationally asymmetric about the tool axis; heating an optical film resulting in a softened optical film; conforming the softened optical film to the external surface while stretching the softened film along at least orthogonal first and second directions away from the tool axis resulting in a conformed optical film rotationally asymmetric about an optical axis of the conformed film, where the optical axis coincident with the tool axis; cooling the conformed optical film resulting in a symmetric optical film rotationally symmetric about the optical axis; and molding an optical lens on the symmetric optical film resulting in the optical stack.

In some aspects of the present description, a method of making a desired optical film having a desired shape is provided. The method includes the steps of providing a thermoform tool having an external surface having a first shape different than the desired shape; heating an optical film resulting in a softened optical film; conforming the softened optical film to the external surface having the first shape while stretching the softened film along at least orthogonal first and second directions resulting in a conformed optical film having the first shape; and cooling the conformed optical film resulting in the desired optical film having the desired shape.

In some aspects of the present description, an optical system including an image surface, a stop surface, a first optical stack disposed between the image surface and the stop surface, and a second optical stack disposed between the first optical stack and the exit pupil is provided. The first optical stack includes a first optical lens, and a partial reflector having an average optical reflectance of at least 30% in a desired plurality of wavelengths. The second optical stack includes a second optical lens, a thermoformed multilayer reflective polarizer rotationally symmetric about an optical axis of the second optical stack and convex toward the image source along orthogonal first and second axes orthogonal to the optical axis, and a first quarter wave retarder disposed between the reflective polarizer and the first optical stack. The thermoformed multilayer reflective polarizer has at least one first location having a radial distance, r1, from an optical axis passing through an apex of the thermoformed multilayer reflective polarizer, and a displacement, s1, from a plane perpendicular to the optical axis at the apex, where s1/r1 is at least 0.1.

In some aspects of the present description, an optical stack is provided. The optical stack includes a first lens, a second lens adjacent the first lens, a quarter wave retarder disposed between the first and second lenses, a reflective polarizer disposed on the second lens opposite the first lens, and a partial reflector disposed on the first lens opposite the second lens. The reflective polarizer is curved about two orthogonal axes, and the optical stack is an integral optical stack.

In some aspects of the present description, an optical system including a partial reflector, a multilayer reflective polarizer, and a first quarter wave retarder disposed between the partial reflector and the multilayer reflective polarizer is provided. The partial reflector has an average optical reflectance of at least 30% in a desired plurality of wavelengths. The multilayer reflective polarizer substantially transmits light having a first polarization state and substantially reflects light having an orthogonal second polarization state. The multilayer reflective polarizer is convex along orthogonal first and second axes, and has at least one first location on the multilayer reflective polarizer having a radial distance r1 from an optical axis of the multilayer reflective polarizer and a displacement s1 from a plane perpendicular to the optical axis at an apex of the multilayer reflective polarizer, where s1/r1 is at least 0.1. The multilayer reflective polarizer comprises at least one layer substantially optically biaxial at at least one first location on the at least one layer away from the optical axis and substantially optically uniaxial at at least one second location away from the optical axis.

In some aspects of the present description, an optical system including a first optical stack, a second optical stack disposed adjacent to the first optical stack and convex along orthogonal first and second axes, and a first quarter wave retarder disposed between the second optical stack and the first optical stack is provided. The first optical stack includes a first optical lens and a partial reflector having an average optical reflectance of at least 30% in a desired plurality of wavelengths. The second optical stack includes a second optical lens, and a multilayer reflective polarizer substantially transmitting light having a first polarization state and substantially reflecting light having an orthogonal second polarization state. The reflective polarizer includes at least one first location on the multilayer reflective polarizer having a radial distance r1 from an optical axis of the second optical stack and a displacement s1 from a plane perpendicular to the optical axis at an apex of the multilayer reflective polarizer, where s1/r1 is at least 0.1. The multilayer reflective polarizer includes at least one layer substantially optically biaxial at at least one first location on the at least one layer away from the optical axis and substantially optically uniaxial at at least one second location away from the optical axis.

In some aspects of the present description, an optical system including a first optical stack, a second optical stack disposed adjacent to the first optical stack and convex along orthogonal first and second axes, and a first quarter wave retarder disposed between the second optical stack and the first optical stack is provided. The first optical stack includes a first optical lens and a partial reflector having an average optical reflectance of at least 30% in a desired plurality of wavelengths. The second optical stack includes a second optical lens, a reflective polarizer substantially transmitting light having a first polarization state and substantially reflecting light having an orthogonal second polarization state. The reflective polarizer has at least one first location on the multilayer reflective polarizer having a radial distance r1 from an optical axis of the second optical stack and a displacement s1 from a plane perpendicular to the optical axis at an apex of the reflective polarizer, where s1/r1 is at least 0.1. The optical system has a contrast ratio of at least 50 over a field of view of the optical system.

In some aspects of the present description, an optical system including a first optical stack, a second optical stack disposed adjacent to the first optical stack and convex along orthogonal first and second axes, and a first quarter wave retarder disposed between the second optical stack and the first optical stack is provided. The first optical stack includes a first optical lens and a partial reflector having an average optical reflectance of at least 30% in a desired plurality of wavelengths. The second optical stack includes a second optical lens and a reflective polarizer substantially transmitting light having a first polarization state and substantially reflecting light having an orthogonal second polarization state. At least one first location on the reflective polarizer has a radial distance r1 from an optical axis of the second optical stack and a displacement s1 from a plane perpendicular to the optical axis at an apex of the reflective polarizer, where s1/r1 is at least 0.1. The optical system is adapted to provide an adjustable dioptric correction.

In some aspects of the present description, a head-mounted display including first and second optical systems is provided. The first optical system includes a first image surface, a first exit pupil, a first reflective polarizer disposed between the first exit pupil and the first image surface, and a first quarter wave retarder disposed between the first reflective polarizer and the first partial reflector. The first reflective polarizer is convex about two orthogonal axes. The first partial reflector is disposed between the first reflective polarizer and the first image surface, and the first partial reflector has an average optical reflectance of at least 30% in a pre-determined plurality of wavelengths. The second optical system includes a second image surface, a second exit pupil, a second reflective polarizer disposed between the second exit pupil and the second image surface, a second partial reflector disposed between the second reflective polarizer and the second image surface, and a second quarter wave retarder disposed between the second reflective polarizer and the second partial reflector. The second reflective polarizer is convex about two orthogonal axes. The second partial reflector has an average optical reflectance of at least 30% in the pre-determined plurality of wavelengths.

In some aspects of the present description, a camera including an aperture and an image recording device is provided. The camera includes a reflective polarizer disposed between the aperture and the image recording device. The reflective polarizer is curved about two orthogonal axes. A partial reflector having a having an average optical reflectance of at least 30% in a pre-determined plurality of wavelengths is disposed between the reflective polarizer and the image recording device. A quarter wave retarder disposed between the reflective polarizer and the partial reflector.

In some aspects of the present description, a beam expander is provided. The beam expander includes a partial reflector having a having an average optical reflectance of at least 30% in a pre-determined plurality of wavelengths, a reflective polarizer disposed adjacent to and spaced apart from the partial reflector, and a quarter wave retarder disposed between the reflective polarizer and the partial reflector. The reflective polarizer curved about two orthogonal axes.

In some aspects of the present description, a projection system including a light source, an image forming device disposed to receive light from the light source and emit a converging patterned light, and a beam expander is provided. The beam expander includes a partial reflector having a having an average optical reflectance of at least 30% in a pre-determined plurality of wavelengths, a reflective polarizer disposed adjacent to and spaced apart from the partial reflector, and a quarter wave retarder disposed between the reflective polarizer and the partial reflector. The reflective polarizer curved about two orthogonal axes. The beam expander is disposed such that the converging patterned light from the image forming device is incident on the partial reflector and the beam expander transmits a diverging patterned light.

In some aspects of the present description an illuminator including a beam expander, a polarizing beam splitter, a light source and a reflective component is provided. The beam expander includes a reflective polarizer curved about two orthogonal directions.

The polarizing beam splitter includes a first prism having an input face, an output face and a first hypotenuse; a second prism having a first face and a second hypotenuse with the second hypotenuse disposed adjacent the first hypotenuse; and a second reflective polarizer disposed between the first hypotenuse and the second hypotenuse. The light source is disposed adjacent the input face and defines an input active area on the input face. The reflective component is disposed adjacent the first face for receiving light emitted from the light source and emitting a converging light. The reflective component has a largest active area which defines an output active area on the output face. The beam expander is disposed to receive the converging light and transmit a diverging light. One or both of the input active area and the output active area are less than about half the largest active area of the reflective component.

In some aspects of the present description, a magnifying device including an optical system is provided. The optical system includes an exit pupil, a reflective polarizer proximate the exit pupil and curved about two orthogonal axes, a partial reflector disposed adjacent the reflective polarizer opposite the exit pupil and spaced apart from the reflective polarizer. The partial reflector has a having an average optical reflectance of at least 30% in a pre-determined plurality of wavelengths. A quarter wave retarder is disposed between the reflective polarizer and the partial reflector.

BRIEF DESCRIPTION OF THE DRAWINGS

FIGS. 24A-24C are schematic top views of devices including one or more optical systems.

DETAILED DESCRIPTION

Figure 1:
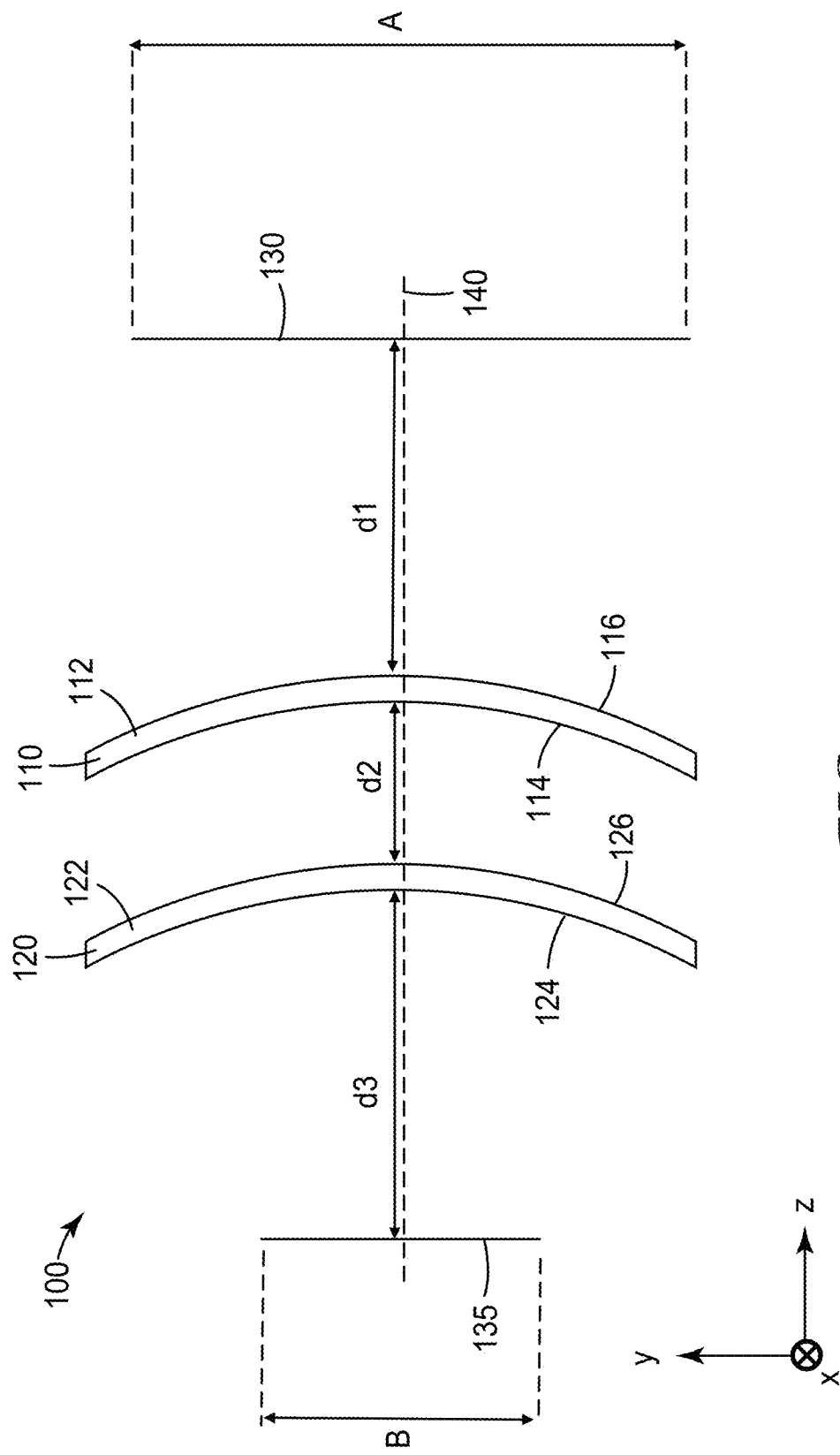
FIGS. 1-2 are schematic cross-sectional views of optical systems.

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

According to the present description, it has been found that optical systems including a reflective polarizer that is convex about two orthogonal axes and disposed between a stop surface (e.g., an exit pupil or an entrance pupil) and an image surface (e.g., a surface of a display panel or a surface of an image recorder) can provide a system having a high field of view, a high contrast, a low chromatic aberration, a low distortion, and/or a high efficiency in a compact configuration that is useful in various devices including head-mounted displays, such as virtual reality displays, and cameras, such as cameras included in a cell phone, for example.

The optical system may include a partial reflector disposed between the reflective polarizer and the image surface and may include at least one quarter wave retarder. For example, a first quarter wave retarder may be disposed between the reflective polarizer and the partial reflector and in some cases a second quarter wave retarder may be disposed between the partial reflector and the image surface. The optical systems may be adapted to utilize wavelengths in a desired or pre-determined plurality of wavelengths and the partial reflector may have an average optical reflectance of at least 30% in the desired or pre-determined plurality of wavelengths and may have an average optical transmittance of at least 30% in the desired or pre-determined plurality of wavelengths. The quarter wave retarder(s) may be quarter wave retarder(s) at at least one wavelength in the desired or pre-determined plurality of wavelengths. In some embodiments, the desired or pre-determined plurality of wavelengths may be a single continuous range of wavelengths (e.g., a visible range of 400 nm to 700 nm) or it may be a plurality of continuous ranges of wavelengths. The partial reflector may be a notch reflector and the desired or pre-determined plurality of wavelengths may include one or more wavelength ranges at least some of which having a full width at half maximum reflection band of no more than 100 nm or no more than 50 nm. The reflective polarizer may be a notch reflective polarizer and may have reflection bands that match or substantially match reflection the bands of the partial reflector. In some cases, the optical system may be adapted for use with one or more lasers and the plurality of desired or predetermined wavelengths may include narrow band(s) (e.g., 10 nm in width) about the laser(s) wavelength(s).

The reflective polarizer, the partial reflector and/or the quarter wave retarder(s) may also be curved about two orthogonal axes. In some embodiments, each of the reflective polarizer, the first quarter wave retarder and partial reflector are curved about two orthogonal axes, and in some embodiments, each of these layers or components are convex toward the image surface. In some embodiments, a plurality of surfaces are provided between the stop surface and the image surface, and each of the reflective polarizer, the first quarter wave retarder and partial reflector are disposed on one of the surfaces. These layers or components may be each disposed on different surfaces, or two or more of the layers components may be disposed on a single surface. In some embodiments, one, two, three, or more lenses are disposed between the stop surface and the image surface and the plurality of surfaces may include the major surfaces of the one or more lenses. One or more of the lenses may be positioned between the reflective polarizer and the partial reflector, one or more of the lenses may be positioned between the stop surface and reflective polarizer, and one or more of the lenses may be position between the partial reflector and the image surface.

The reflective polarizer may be a thermoformed reflective polarizer and may be a thermoformed polymeric multilayer optical film reflective polarizer or may be a thermoformed wire grid polarizer, for example. Thermoforming refers to a forming process carried out above ambient temperature. Conventional display designs incorporating a reflective polarizer either use a flat reflective polarizer or use a reflective polarizer disposed in a cylindrically curved shape which is curved about a single axis. Curving a reflective polarizer into a cylindrical shape does not stretch the reflective polarizer and so does not substantially alter its performance as a reflective polarizer. The reflective polarizers of the present description may be curved about two orthogonal axes and may be stretched as a result of forming the reflective polarizer into the curved shape. According to the present description, it has been found that such compound curved reflective polarizers can be used in optical systems for display and camera applications, for example, while contributing to various improved optical properties (e.g., reduced color separation, reduced distortion, improved field of view, improved contrast ratio, etc.) even though the reflective polarizer is stretched into the compound curved shape. As discussed further elsewhere herein, it has been found that convex reflective polarizers made by thermoforming polymeric multilayer optical film that was uniaxially oriented prior to thermoforming are particularly advantageous when used in the optical systems of the present description. In some embodiments, the uniaxially oriented multilayer reflective polarizers is APF (Advanced Polarizing Film, available from 3M Company, St. Paul, Minn.). In some embodiments, optical systems include a thermoformed APF and any or substantially any chief ray in the optical system that is incident on the thermoformed APF has a low angle of incidence (e.g., less than about 30 degrees, less than about 25 degrees, or less than about 20 degrees). FIG. 1 is a schematic cross-sectional view of optical system 100 including image surface 130, stop surface 135, a first optical stack 110 disposed between the image surface 130 and the stop surface 135, a second optical stack 120 is disposed between the first optical stack 110 and the stop surface 135. Each of the first and second optical stacks 110 and 120 are convex toward the image surface 130 along orthogonal first and second axes. An x-y-z coordinate system is provided in FIG. 1. The orthogonal first and second axes may be the x- and y-axes, respectively. The image surface 130 has a maximum lateral dimension of A and the stop surface 135 has a maximum lateral dimension of B. The maximum lateral dimension may be a diameter for circular image or stop surfaces or may be a diagonal distance for rectangular image or stop surfaces. In some embodiments, A/B may be at least 2, at least 3, at least 4, or at least 5. The image surface 130 and/or the stop surface 135 may be substantially planar or may be curved.

The first optical stack 110 includes a first optical lens 112 having opposing first and second major surfaces 114 and 116 respectively. The first and/or second major surfaces 114 and 116 may have one or more layers or coatings disposed thereon. The first optical stack 110 also includes a partial reflector disposed on one of the first or second major surfaces 114 and 116, as described further elsewhere herein (see, e.g., FIG. 2 and FIGS. 3A-3C). Any of the partial reflectors included in the optical systems of the present description may have an average optical reflectance of at least 30% in a desired or pre-determined plurality of wavelengths. The desired or pre-determined plurality of wavelengths may be a visible wavelength range (e.g., 400 nm to 700 nm), an infrared wavelength range, an ultraviolet wavelength range, or some combination of visible, infrared and ultraviolet wavelengths. In some embodiments, the desired or pre-determined plurality of wavelengths may be a narrow wavelength range or a plurality of narrow wavelength ranges and the partial reflector may be a notch reflector having at least one reflection band with a full-width at half maximum of no more than 100 nm or no more than 50 nm. The average optical reflectance can be determined by averaging the reflectance over the desired or pre-determined plurality of wavelengths. Similarly, an average optical transmittance can be determined by averaging the transmittance over the desired or pre-determined plurality of wavelengths. In some embodiments, the partial reflector has an average optical reflectance and an average optical transmittance in the desired or pre-determined plurality of wavelengths that are each in a range of 30% to 70%, or each in a range of 40% to 60%. The partial reflector may be a half mirror, for example. Any suitable partial reflector may be used. For example, the partial reflectors may be constructed by coating a thin layer of a metal (e.g., silver or aluminum) on a transparent substrate. The partial reflector may also be formed by depositing thin-film dielectric coatings onto a surface of a lens, or by depositing a combination of metallic and dielectric coatings on the surface of the lens, for example. In some embodiments, the partial reflector may be a second reflective polarizer which may be a multilayer polymeric reflective polarizer (e.g., APF or DBEF) or may be a wire grid polarizer.

The second optical stack includes a second optical lens 122 having first and second major surfaces 124 and 126. The first and/or second major surfaces 124 and 126 may have one or more layers or coatings disposed thereon. As described further elsewhere herein (see, e.g., FIG. 2 and FIGS. 4A-4C), the second optical stack 120 may include a reflective polarizer and a first quarter wave retarder that are either disposed on each other (e.g., a quarter wave retarder film (e.g., an oriented polymer film) laminated to a reflective polarizer film or a quarter wave retarder coating (e.g., a liquid crystal polymer coating on a reflective polarizer film) and on one of the first and second major surfaces 124 and 126, or the reflective polarizer is disposed on first major surface 124 and the first quarter wave retarder is disposed on second major surface 126. The first quarter wave retarder may be a film molded with second optical lens 122 or may be a coating applied to second major surface 126 after the second optical lens 122 has been formed, for example. Suitable coatings for forming a quarter wave retarder include the linear photopolymerizable polymer (LPP) materials and the liquid crystal polymer (LCP) materials described in US Pat. App. Pub. Nos. US 2002/0180916 (Schadt et al.), US 2003/028048 (Cherkaoui et al.) and US 2005/0072959 (Moia et al.). Suitable LPP materials include ROP-131 EXP 306 LPP and suitable LCP materials include ROF-5185 EXP 410 LCP, both available from Rolic Technologies, Allschwil, Switzerland. The quarter wave retarder may be quarter wave at at least one wavelength in the desired or predetermined plurality of wavelengths.

In some embodiments, the second optical stack 120 includes a reflective polarizer on one of the first and second major surfaces 124 and 126. The optical system 100 includes a first quarter wave retarder disposed between the first and second lenses 112 and 122. The first quarter wave retarder may be disposed on the second surface 126 of the second optical stack 122 (in which case, it may be considered to be part of second optical stack 120 or it may be considered to be disposed between the first and second optical stacks 110 and 120), or may be included as a separate component with spacings between the first and second optical stacks 110 and 120, or may be disposed on first surface 114 of the first optical stack 110 (in which case, it may be considered to be part of first optical stack 110 or it may be considered to be disposed between the first and second optical stacks 110 and 120).

The multilayer reflective polarizer substantially transmits light having a first polarization state and substantially reflects light having an orthogonal second polarization state. The first and second polarization states may be linear polarization states. The first quarter wave retarder is disposed between the reflective polarizer and the first optical stack 110.

The optical stacks of the present description can be made by thermoforming any films included in the optical stack and then injection molding a lens onto the films using a film insert molding process, for example. As described further elsewhere herein, the reflective polarizer film may have anisotropic mechanical properties which may make the film rotationally asymmetric after cooling if it is thermoformed on a rotationally symmetric mold. It may be difficult to injection mold a rotationally asymmetric film onto a rotationally symmetric lens without causing wrinkling or other defects in the film. It has been found that using a rotationally asymmetric thermoform mold can result in a rotationally symmetric film after cooling if the film has anisotropic mechanical properties. A rotationally symmetric lens can be insert molded onto the resulting rotationally symmetric film without wrinkling or otherwise damaging the thermoformed film.

Image surface 130 may be any surface where an image is formed. In some embodiments, an image source comprises the image surface 130 and the stop surface 135 is an exit pupil. For example, image surface 130 may be an output surface of an image forming device such as a display panel. Stop surface 135 may be an exit pupil of optical system 100 and may be adapted to overlap an entrance pupil of a second optical system, which may be a viewer's eye or a camera, for example. The entrance pupil of the second optical system may be an entrance pupil of a viewer's eye, for example. The image source may emit polarized or unpolarized light. In some embodiments, image surface 130 is an aperture adapted to receive light reflected from objects external to optical system 100.

The optical system 100 may include one or more additional retarders. For example, a second quarter wave retarder may be included in first optical stack 110 and may be disposed on one of the first and second major surfaces 114 and 116 or may be disposed on the partial reflector. It may be desirable to include the second quarter wave retarder, for example, when the image surface 130 is a surface of a display panel producing polarized light. The display panel may emit linearly, circularly or elliptically polarized light. For example, the display panel may be a liquid crystal display (LCD) panel or a Liquid Crystal on Silicon (LCoS) display panel and may emit linearly polarized light. In some embodiments, a second quarter wave retarder is disposed between the partial reflector and the image surface, and in some embodiments a linear polarizer (e.g., a linear absorbing polarizer or a second reflective polarizer) is disposed between the second quarter wave retarder and the image surface 130. In some embodiments, the display panel is substantially flat. In other embodiments a curved display panel is used. For example, a curved OLED (organic light emitting diode) display may be used. In some embodiments, a transparent or semi-transparent display (e.g., transparent OLED, LCD, or electrophoretic displays) may be used. In some embodiments, an image source comprises the image surface where the image source may include a display panel and may optionally include a shutter. In some embodiments, a shutter (e.g., a liquid crystal shutter or a PDLC (polymer dispersed liquid crystal) shutter, or a photochromic shutter, or a physically removable shield that can function as a shutter) may be used with a transparent or semi-transparent display panel to selectively allow or disallow ambient light to pass through the transparent or semi-transparent display panel. A semi-transparent display panel may have a transmission in at least one state of the display panel of at least 25 percent, or at least 50 percent for at least one visible wavelength. In some embodiments, the image source may comprise a florescent material that can be irradiated with non-visible light to produce visible images.

In some embodiments, an image recorder comprises the image surface 130 and the stop surface 135 is an entrance pupil. For example, in camera applications, the aperture stop of the camera may be an entrance pupil for optical system 100 and the image surface 130 may be a surface of the camera's image sensor, which may, for example, be a charge-coupled device (CCD) sensor or a complementary metal-oxide-semiconductor (CMOS) sensor.

Optical system 100 may be centered on folded optical axis 140 which may be defined by an optical path of a central light ray transmitted through the image surface 130. The optical axis 140 is folded because the optical path of the central light ray propagates in the minus z-direction in one segment of the optical path between the first and second optical stacks 110 and 120 and propagates in the plus z-direction on another segment of the optical path between the first and second optical stacks 110 and 120.

Figure 10:
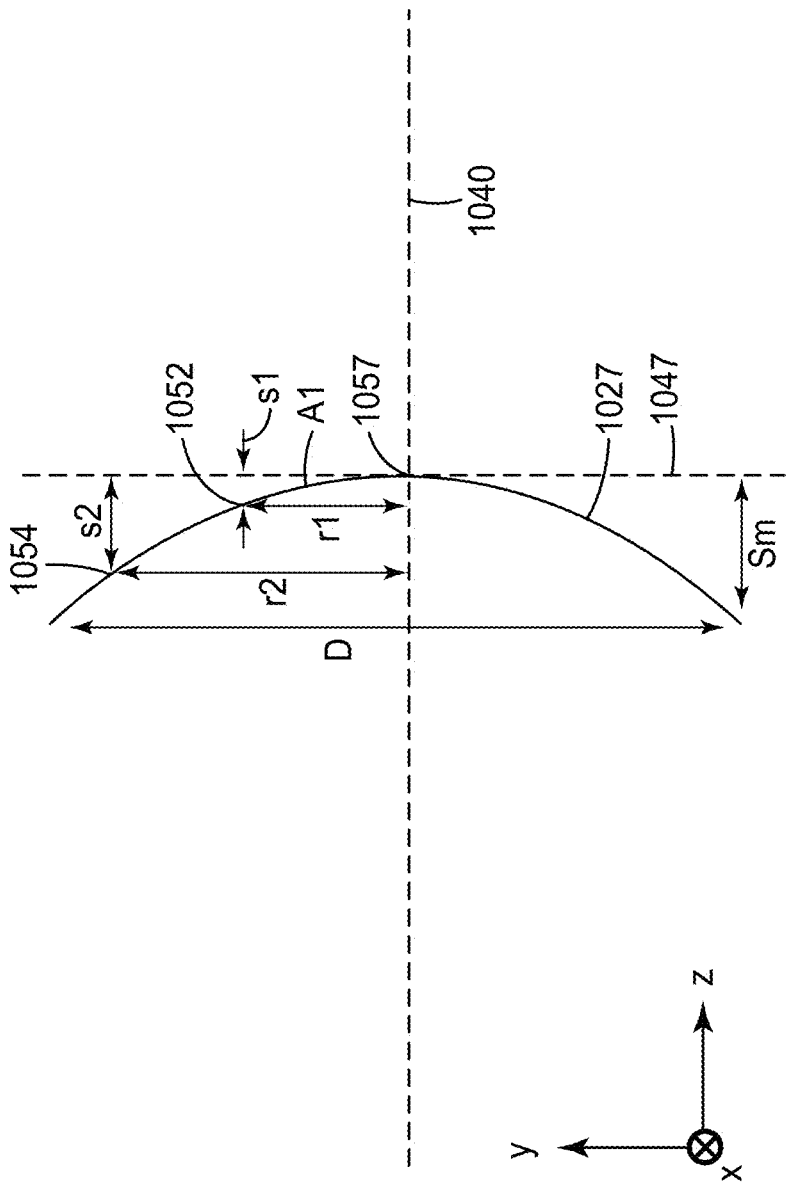
FIG. 10 is a cross-sectional view of a reflective polarizer.

The first and second optical stacks 110 and 120 may have a substantially same shape or may have different shapes. Similarly, the first and second optical lenses 112 and 122 may have a substantially same shape or may have different shapes. Any one or more of the reflective polarizer, the first quarter wave retarder, the partial reflector, the first and second major surfaces 114 and 116 of the first optical lens 112, and the first and second major surfaces 124 and 126 of the second optical lens 120 may have a shape described by an aspheric polynomial sag equation. The various surfaces or layers may have a same shape or may have different shapes and may be described by the same or different aspheric polynomial sag equations. An aspheric polynomial sag equation may take the form $$z = \frac{cr^2}{1+[1-(1+k)c^2r^2]^{1/2}} + Dr^4 + Er^6 + Fr^8 + Gr^{10} + Hr^{12} + Ir^{14} \qquad \text{(Equation 1)}$$

where c, k, D, E, F, G, H, and I are constants, z is the distance from a vertex (e.g., distance s1 in FIG. 10) and r is a radial distance (e.g., distance r1 in FIG. 10). The parameter k may be referred to as the conic constant. Any of the optical systems of the present description may include a reflective polarizer, one or more quarter wave retarders, a partial reflector and a plurality of major surfaces disposed between an image surface and a stop surface. Any one or more of the reflective polarizer, the one or more quarter wave retarders, the partial reflector, and the major surfaces may have shapes described by aspheric polynomial sag equations.

First optical stack 110 is disposed at a distance d1 from the image surface 130, second optical stack 120 is disposed at a distance d2 from the first optical stack 110 and at a distance d3 from the stop surface 135. In some embodiments, the distances d1, d2 and/or d3 are adjustable. In some embodiments, the distance between image surface 130 and stop surface 135 (d1+d2+d3) is fixed and d1 and/or d3 are adjustable. The distances d1, d2 and/or d3 may be user-adjustable by mounting one or both of the first and second optical stacks 110 and 120 on a rail providing mechanical adjustment of the positions, for example.

The ability to adjust the positions of the first and second optical stacks 110 and/or 120 relative to themselves or relative to the image and/or stop surfaces 130 and 135 allows a dioptric correction provided by the optical system 100 to be adjustable. For example, moving the second optical stack 120 while keeping the remaining components fixed allows light rays emitted by the image surface 130 and transmitted through the stop surface to be adjustable from parallel at the stop surface 135 to converging or diverging at the stop surface 135. In some embodiments, diopter values may be indicated on a mechanical adjustment device, selectable physically through the use of a hard stop, detent or similar device, or electronically adjusted such as with a stepper motor, or motor or linear actuator used in conjunction with an electronic scale. In some embodiments, the image size on the display panel comprising the image surface 130 may be changed based on the diopter adjustment. This can be done manually by the user or done automatically through the adjustment mechanism. In other embodiments, one, two, three or more optical lenses may be provided. In any embodiments in which a partial reflector is disposed on a surface of a first lens and a reflective polarizer is disposed on a surface of a different second lens, a changeable dioptric power may be provided, at least in part, by providing an adjustable position of the first and/or second lens, and/or providing an adjustable distance between the first and second lenses.

Figure 28A:
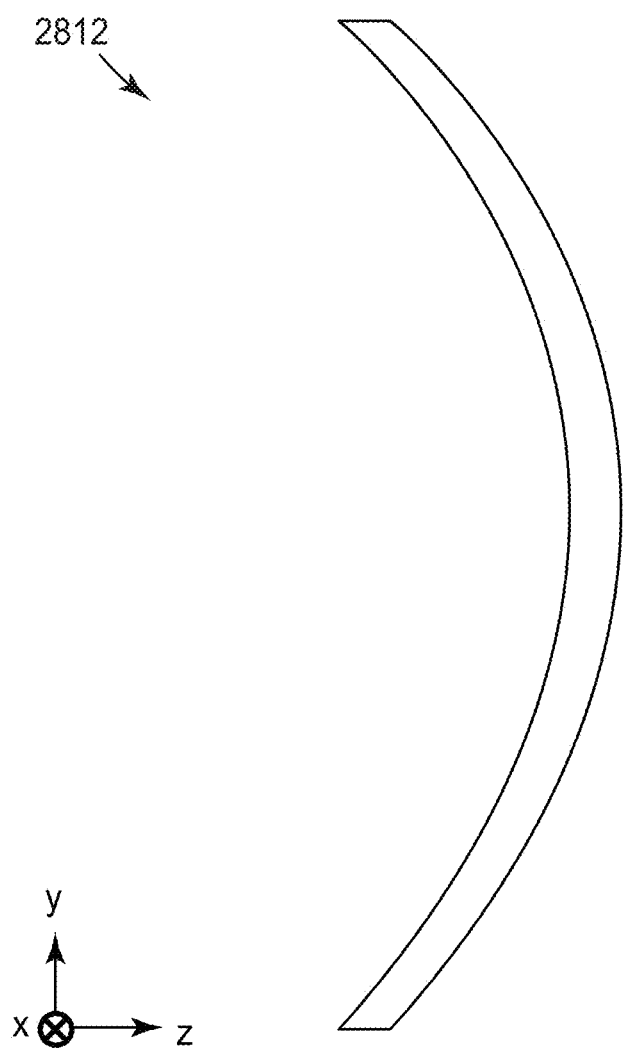
FIGS. 28A-28B are cross-sectional views of a toric lens in different planes.
Figure 28B:
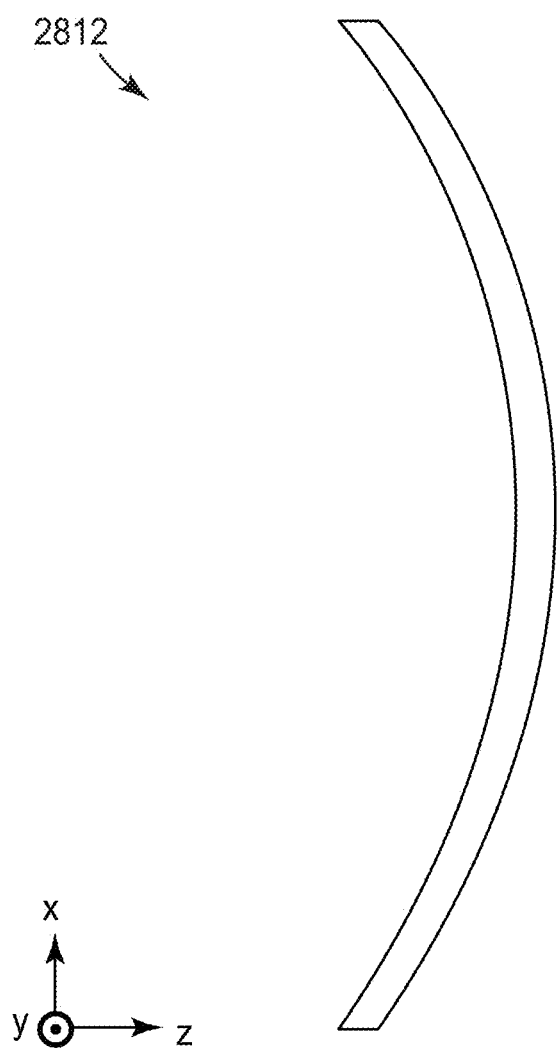

In some embodiments, one or both of the first and second optical lenses 112 and 122 may be shaped to provide a diopter value and/or a cylinder power (e.g., by molding the lenses with a toroidal surface, which may be described as a surface having differing radii of curvature in two orthogonal directions) so that the optical system 100 may provide a desired prescription correction for the user. An example of a toric lens having spherical and cylinder power in reflection and that can be utilized in the optical systems of the present description is illustrated in FIGS. 28A and 28B which are cross-sectional views of a lens 2812 in a cross-section through an apex of the lens in a y-z plane and in an x-z plane, respectively. The radius of curvature is smaller the y-z plane (FIG. 28A) than in the x-z plane (FIG. 28B). In some embodiments, cylinder power can be created by using thin plastic lenses that can be flexed. Similarly, a prescription correction may be included in any of the one, two, three or more lens optical systems described herein by providing a suitable optical power to the lens or lenses. In some embodiments, the optical system may be adapted to incorporate a prescription lens disposed between a display panel comprising the image surface and the other lenses of the optical system, which may not provide dioptric correction, or the system may be adapted to incorporate a prescription lens disposed between the stop surface and the other lenses of the optical system, which may not provide dioptric correction.

Another use for moveable optical lenses is to minimize vergence-accommodation mismatch in stereoscopic viewers. In many stereoscopic head-mounted displays, sense of depth is created by moving the left eye and right eye images of certain objects closer together. The left and right eye converge in order to see the virtual image of the object clearly and this is a cue that gives a perception of depth. However when the eyes view a real object that is near they not only converge, but the lens of each eye focuses (also called accommodation) to bring the near object into focus on the retina. Because of disparity between the vergence cues present in stereoscopic viewers and the lack of accommodation in the eye to view the virtual image of near objects, many users of stereoscopic head-mounted displays can suffer from visual discomfort, eye-strain and/or nausea. By adjusting the positions of the first and second lenses, the virtual image distance can be adjusted to near points so that the eyes focus to see the virtual image of objects. By combining vergence cues with accommodation cues, the positions of one or more lenses in the optical system can be adjusted so that vergence-accommodation mismatch can be reduced or substantially removed.

In some embodiments, a head-mounted display includes any of the optical systems of the present description and also may include an eye-tracking system. The eye-tracking system may be configured to detect where in the virtual image that the user is looking and the optical system may be adapted to adjust the virtual image distance to match the depth of the object as presented stereoscopically by adjusting the positions of one or more lenses in the optical system.

In some embodiments, the first and/or second optical lenses 112 and 122 may be shaped to have spherical and/or cylinder power in reflection or refraction or both. This can be done, for example, by using thermoforming molds and film insert molds having the desired shape. Cylinder power may be created by applying a stress to a rotationally symmetric lens as it cools after an injection molding process, for example. Alternatively, the lens may be curved (spherically or cylindrically or a combination) by post processing, diamond turning, grinding or polishing.

In some embodiments, one or both of the first and second optical lenses 112 and 122 can be flexed in the optical system dynamically or statically. An example of a static flexure is a set screw or set screws or similar mechanism statically applying a compressive or tensile force to the lens or lenses. In some embodiments, set screws could be provided in an annular manner to provide for astigmatism correction along multiple axes to account for all three types of astigmatism: with the rule, against the rule and oblique astigmatism. This would provide for accurate correction such as with eyeglass lenses which are typically made to address astigmatism in increments of 30 degrees or 15 degrees or 10 degrees of obliquity. The pitch of the set screw can be related to cylinder power to provide a measure of correction based on turns or partial turns of the screw. In some embodiments, piezo-electric, voice-coil, or stepper-motor actuators or other types of actuators can be used to flex the lens or lenses (e.g., based on user input to the device such as entering a prescription).

In prescription lens terminology, a plano lens is a lens with no refractive optical power. In some embodiments, the first optical lens 112 and/or the second optical lens 122 may be plano lenses having little or no optical power in transmission, but may have optical power in reflection (for example, due to the overall curvature of the lenses). The curvature of the first and second major surfaces 114 and 116 of the first optical lens 112 may be the same or substantially the same, and the curvature of the first and second major surfaces 124 and 126 of the second optical lens 122 may be the same or substantially the same. The first and second optical lenses 112 and 122 may have the substantially same shape. In some embodiments, the first optical lens 112 and/or the second optical lens 122 may have optical power in transmission and may also have optical power in reflection.

Figure 2:
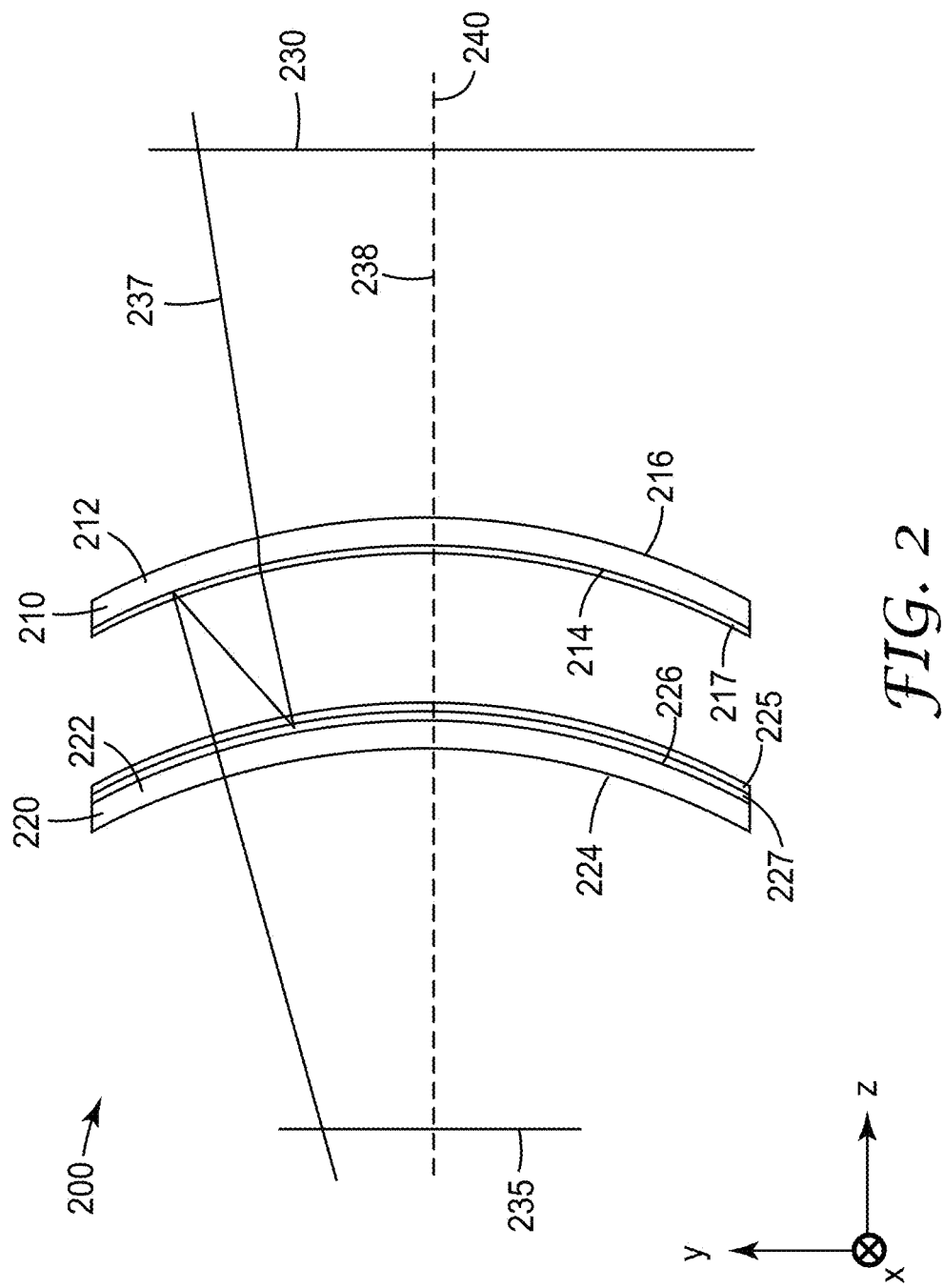

Optical system 100 includes a reflective polarizer and a quarter wave retarder in second optical stack 120 and includes a partial reflector in first optical stack 110. There are various possibilities of how the reflective polarizer, the quarter wave retarder and the partial reflector can be arranged in the optical stacks. FIG. 2 shows one possible arrangement; other arrangements are described in FIGS. 3A-4C.

FIG. 2 is a schematic cross-sectional view of optical system 200 including image surface 230, stop surface 235, a first optical stack 210 disposed between the image surface 230 and the stop surface 235, a second optical stack 220 is disposed between the first optical stack 210 and the stop surface 235. Each of the first and second optical stacks 210 and 220 are convex toward the image surface 230 along orthogonal first and second axes. An x-y-z coordinate system is provided in FIG. 2. The orthogonal first and second axes may be the x- and y-axes, respectively.

The first optical stack 210 includes a first optical lens 212 having opposing first and second major surfaces 214 and 216 respectively. The first optical stack 210 includes a partial reflector 217 disposed on the first major surface 214. The partial reflector 217 has an average optical reflectance of at least 30% in a desired or pre-determined plurality of wavelengths and may have an average optical transmission of at least 30% in the desired or pre-determined plurality of wavelengths, which may be any of the wavelength ranges described elsewhere herein.

The second optical stack includes a second optical lens 222 having first and second major surfaces 224 and 226. The second optical stack 220 includes a reflective polarizer 227 disposed on the second major surface 226 and includes a quarter wave retarder 225 disposed on the reflective polarizer 227. Quarter wave retarder 225 may be a film laminated on the reflective polarizer 227 or may be a coating applied to the reflective polarizer 227. The optical system 200 may include one or more additional retarders. For example, a second quarter wave retarder may be included in first optical stack 210 and may be disposed on the second major surface 216. The first quarter wave retarder 225 and any additional quarter wave retarders included in optical system 200 may be quarter wave retarders at at least one wavelength in the pre-determined or desired plurality of wavelengths. The second optical stack 220 may alternatively be described as including the second lens 222 and the reflective polarizer 227 disposed on the second lens 222 and the first quarter wave retarder 225 may be regarded as a separate layer or coating that is disposed on the second optical stack 220 rather than being included in the second optical stack 220. In this case, the first quarter wave retarder 225 may be described as being disposed between the first optical stack 210 and the second optical stack 220. In some embodiments, the first quarter wave retarder 225 may not be attached to the second optical stack 220, and in some embodiments, the first quarter wave retarder 225 is disposed between and spaced apart from the first and second optical stacks 210 and 220. In still other embodiments, the first quarter wave retarder 225 may be disposed on the partial reflector 217 and may be described as being included in the first optical stack 210 or may be described as being disposed between the first and second optical stacks 210 and 220.

Light rays 237 and 238 are each transmitted through the image surface 230 and the stop surface 235. Light rays 237 and 238 may each be transmitted from the image surface 230 to the stop surface 235 (in head-mounted display applications, for example), or light rays 237 and 238 may be transmitted from the stop surface 235, to the image surface 230 (in camera applications, for example). Light ray 238 may be a central light ray whose optical path defines a folded optical axis 240 for optical system 200, which may be centered on the folded optical axis 240. Folded optical axis 240 may correspond to folded optical axis 140.

In embodiments in which light ray 237 is transmitted from the image surface 230 to the stop surface 235, light ray 237 (and similarly for light ray 238) is, in sequence, transmitted through image surface 230, transmitted through second major surface 216 (and any coatings or layers thereon), transmitted through first optical lens 212, transmitted through partial reflector 217, transmitted through the quarter wave retarder 225 disposed on the reflective polarizer 227, reflected from reflective polarizer 227, transmitted back through quarter wave retarder 225, reflected from partial reflector 217, transmitted through quarter wave retarder 225, transmitted through reflective polarizer 227, transmitted through second lens 222, and transmitted through stop surface 235. Light ray 237 may be emitted from the image surface 230 with a polarization state which is rotated to a first polarization state upon passing through quarter wave retarder 225. This first polarization state may be a block state for the reflective polarizer 227. After light ray 237 passes through first quarter wave retarder 225, reflects from partial reflector 217 and passes back through quarter wave retarder 225, its polarization state is a second polarization state substantially orthogonal to the first polarization state. Light ray 237 can therefore reflect from the reflective polarizer 227 the first time that it is incident on the reflective polarizer 227 and can be transmitted through the reflective polarizer 227 the second time that it is incident on the reflective polarizer 227.

Other light rays (not illustrated) reflect from the partial reflector 217 when incident on the partial reflector 217 in the minus z-direction or are transmitted by the partial reflector 217 when incident on the partial reflector 217 in the plus z-direction. These rays may exit optical system 200.

In some embodiments, substantially any chief light ray that passes through the image surface 230 and the stop surface 235 is incident on each of the first optical stack 210 and the second optical stack 220 with an angle of incidence less than about 30 degrees, less than about 25 degrees, or less than about 20 degrees, the first time or each time that the chief light ray is incident on the first or second optical stacks 210 or 220. In any of the optical systems of the present description, substantially any chief light ray that passes through the image and stop surfaces is incident on each of the reflective polarizer and the partial reflector with an angle of incidence less than about 30 degrees, less than about 25 degrees, or less than about 20 degrees, the first time or each time that the chief light ray is incident on the reflective polarizer or the partial reflector. If a large majority (e.g., about 90 percent or more, or about 95 percent or more, or about 98 percent or more) of all chief rays transmitted through the stop and image surfaces satisfy a condition, it may be said that substantially any chief ray satisfies that condition.

Figure 14:
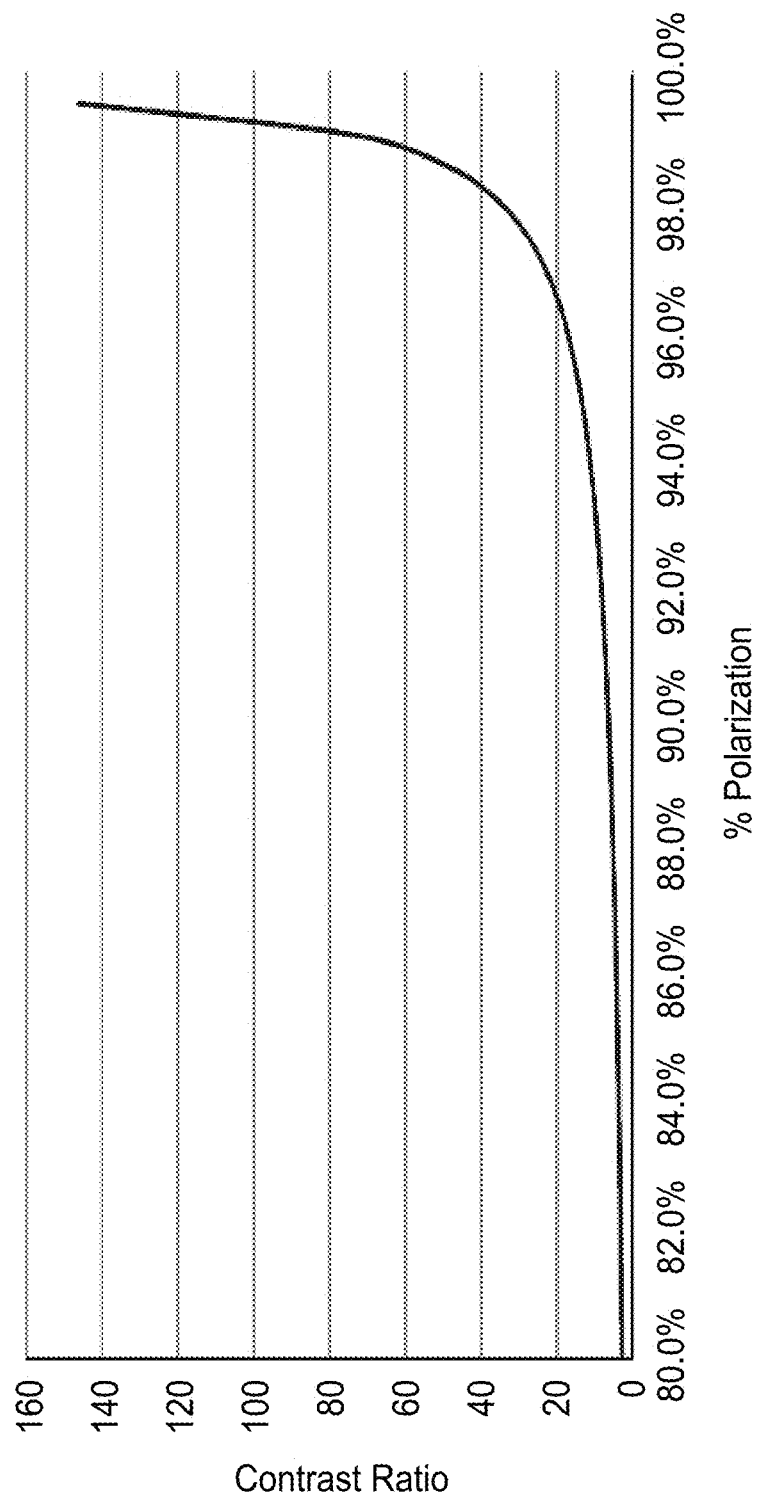
FIG. 14 is a plot of contrast ratio of an optical system versus a polarization accuracy of the optical system.

Various factors can cause light to be partially transmitted through the reflective polarizer 227 the first time that light emitted by the image surface 230 is incident on the reflective polarizer 227. This can cause unwanted ghosting or image blurriness at the stop surface 235. These factors can include performance degradation of the various polarizing components during forming and unwanted birefringence in the optical system 200. The effects of these factors can combine to degrade the contrast ratio and efficiency of the optical system 200. The effects of these factors on the contrast ratio can be seen, for example, in FIG. 14 which shows the contrast ratio at the stop surface 235 determined via optical modeling as a function of the percentage of the light having a polarization in the pass state when emitted by image surface 230 that is blocked by the reflective polarizer 227 when first incident on the reflective polarizer 227 after passing through first quarter wave retarder 225 and through a second quarter wave retarder (not illustrated) disposed on second major surface 216 of first lens 212. Such factors can be minimized by using relatively thin optical lenses, which can reduce unwanted birefringence in the lenses, for example, and using thin optical films, which can reduce optical artifacts arising from thermoforming optical films, for example. In some embodiments, the first and second optical lenses 212 and 222 each have a thickness less thickness less than 7 mm, less than 5 mm, or less than 3 mm, and may have a thickness in a range of 1 mm to 5 mm, or 1 mm to 7 mm, for example. In some embodiments, the reflective polarizer 227 may have a thickness of less than 75 micrometers, less than 50 micrometers, or less than 30 micrometers. In some embodiments, the contrast ratio at the stop surface 235 is at least 40, or at least 50, or at least 60, or at least 80, or at least 100 over the field of view of the optical system 200. It has been found that the contrast ratio can be significantly higher if the reflective polarizer 227 is a thermoformed (so that it is curved about two orthogonal axes) multilayer optical film which was uniaxially oriented prior to thermoforming (e.g., APF), compared to using other reflective polarizers curved about two orthogonal axes. Other reflective polarizers, such as non-uniaxially oriented multilayer polymeric film reflective polarizers or wire grid polarizers), may also be used.

It has been found that suitably choosing the shapes of the various major surfaces (e.g., second major surface 226 and first major surface 214) that the optical system can provide distortion sufficiently low that the image does not need to be pre-distorted. In some embodiments, an image source, which is adapted to emit an undistorted image, comprises the image surface 230. The partial reflector 217 and the reflective polarize 227 may have different shapes selected such that a distortion of the emitted undistorted image transmitted by the stop surface 235 is less than about 10%, or less than about 5%, or less than about 3%, of a field of view at the stop surface 235. The field of view at the stop surface may be greater than 80 degrees, greater than 90 degrees, or greater than 100 degrees, for example.

Figure 3A:
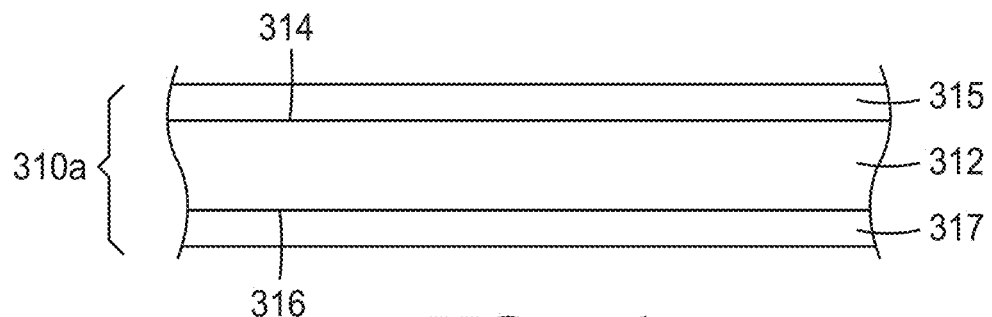
FIGS. 3A-4C are cross-sectional views of portions of optical stacks.
Figure 3B:
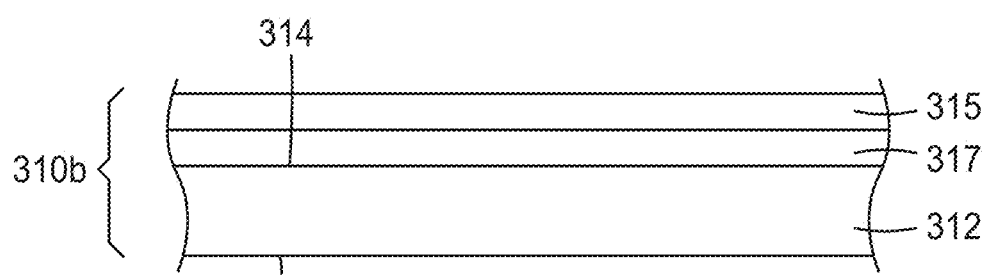
Figure 3C:
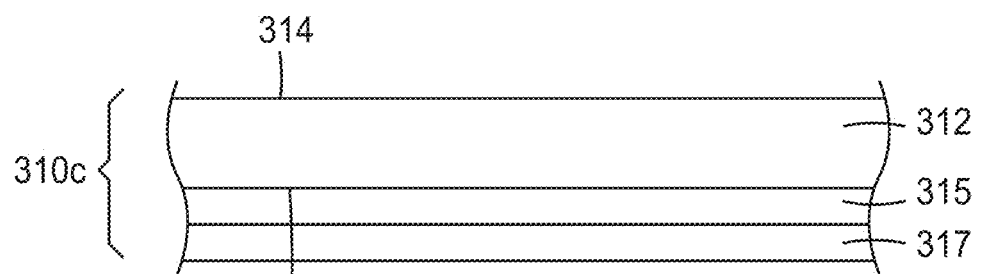

FIGS. 3A-3C are cross-sectional views of portions of optical stacks 310a-310c, any of which may correspond to first optical stack 110. Though not shown in FIGS. 3A-3C, optical stacks 310a-310c may each be curved about two orthogonal axes. Each of the optical stacks 310a-310c includes lens 312, which may correspond to optical lens 112, having first and second major surfaces 314 and 316. Optical stack 310a includes quarter wave retarder 315, which may optionally be omitted, disposed on first major surface 314 and partial reflector 317 disposed on second major surface 316. Optical stack 310b includes partial reflector 317 disposed on first major surface 314 and quarter wave retarder 315, which may optionally be omitted, disposed on partial reflector 317 opposite the optical lens 312. Optical stack 310c includes quarter wave retarder 315 disposed on second major surface 316 and includes partial reflector 317 disposed on quarter wave retarder 315 opposite lens 312.

Figure 4A:
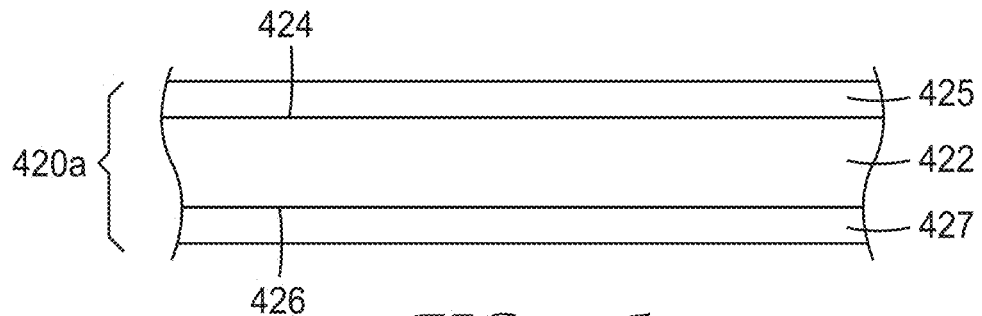
Figure 4B:
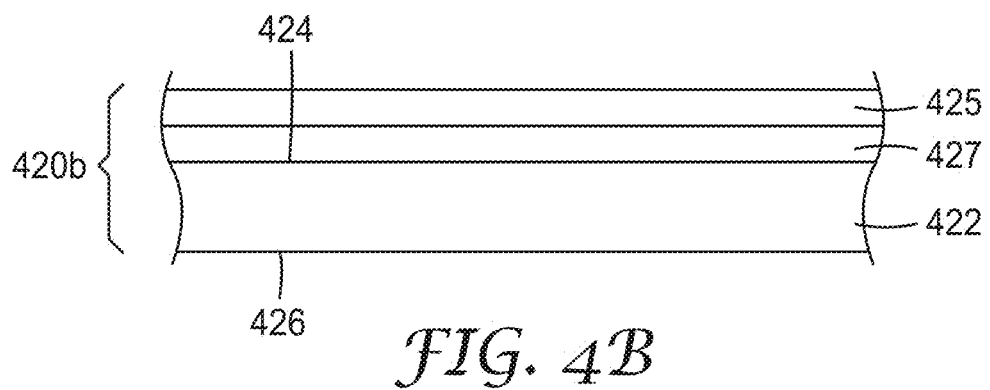
Figure 4C:
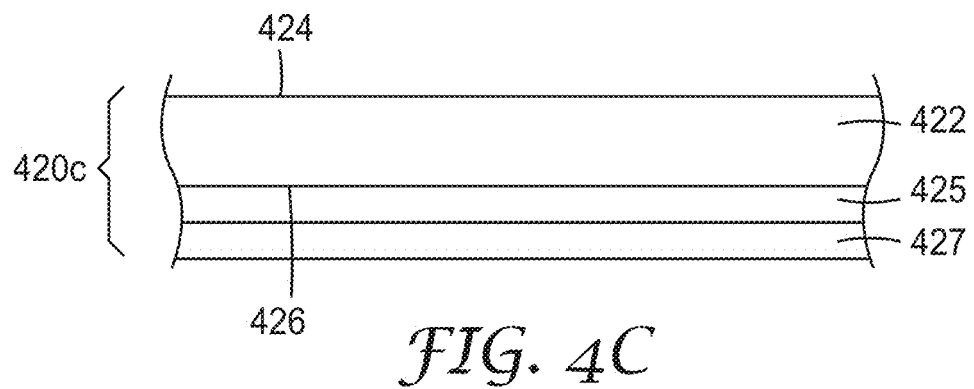

FIGS. 4A-4C are cross-sectional views of portions of optical stacks 420a-420c, any of which may correspond to second optical stack 120. Optical stacks 420a-420c may each be curved about two orthogonal axes. Each of the optical stacks 420a-420c includes lens 422 having first and second major surfaces 424 and 426. Optical stack 420a includes quarter wave retarder 425 disposed on first major surface 424 and reflective polarizer 427 disposed on second major surface 426. Optical stack 420b includes reflective polarizer 427 disposed on first major surface 424 and quarter wave retarder 425 disposed on reflective polarizer 427 opposite the lens 422 (as in FIG. 2). Optical stack 420c includes quarter wave retarder 425 disposed on second major surface 426 and includes reflective polarizer 427 disposed on quarter wave retarder 425 opposite lens 422.

Figure 5:
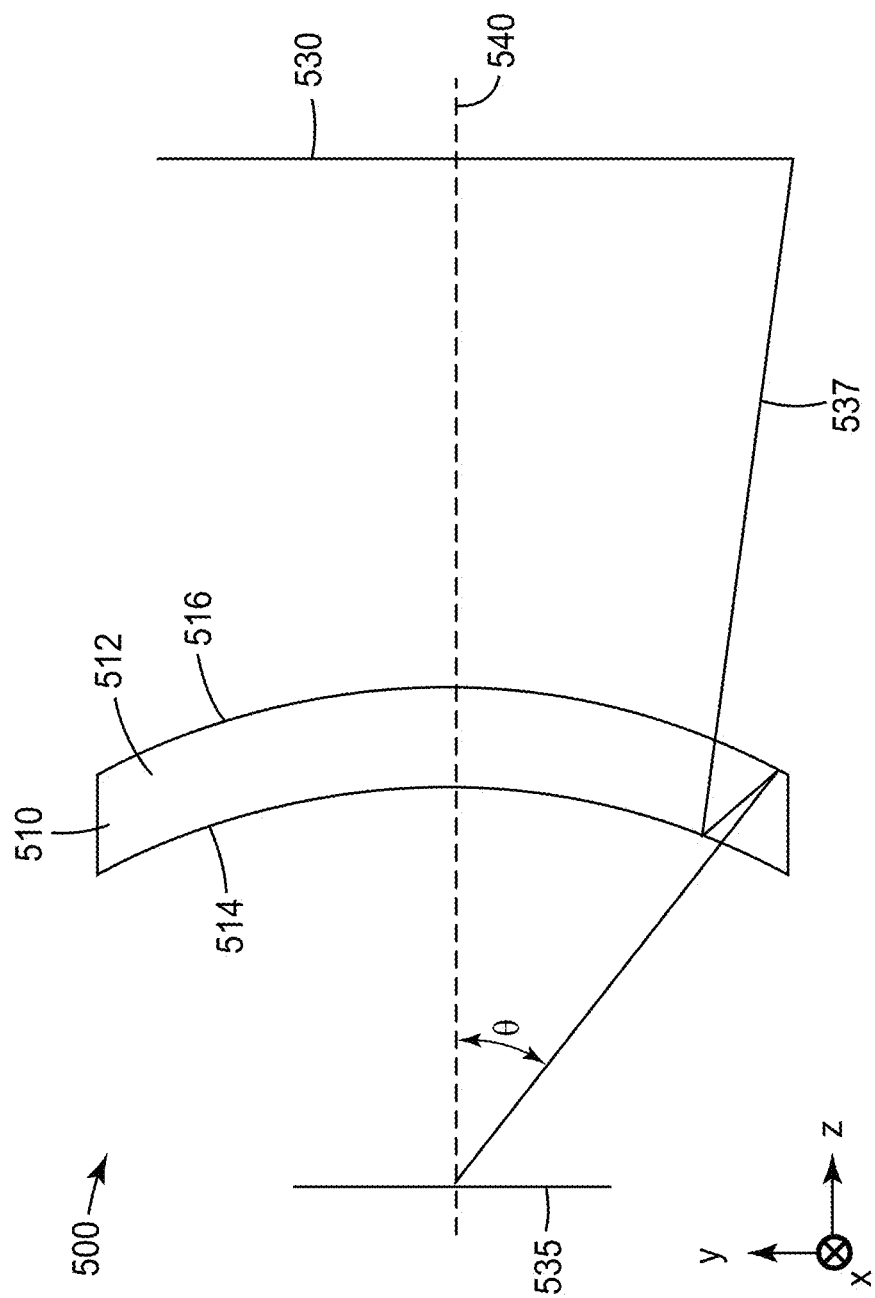
FIGS. 5-9 are schematic cross-sectional views of optical systems.

An alternate embodiment is shown in FIG. 5, which is a schematic cross-sectional view of optical system 500 including image surface 530, stop surface 535, and integral optical stack 510 including optical lens 512 having first and second major surfaces 514 and 516. The first and/or second major surfaces 514 and 516 may have one or more layers or coatings disposed thereon. The integral optical stack 510 also includes a partial reflector, a multilayer reflective polarizer and a first quarter wave retarder. These various layers or components may be disposed on one or more of first and second major surfaces 514 and 516. For example, in some embodiments the partial reflector may be disposed on the first major surface 514, the first quarter wave retarder may be disposed on the partial reflector and the reflective polarizer may be disposed on the first quarter wave retarder. In some embodiments, a second quarter wave retarder may be disposed on second major surface 516. In some embodiments, the reflective polarizer is disposed on second major surface 516, the quarter wave retarder is disposed on the reflective polarizer and the partial reflector is disposed on quarter wave retarder. In some embodiments, a second quarter wave retarder is disposed on the partial reflector. In some embodiments, the reflective polarizer is disposed on first major surface 514 and the first quarter wave retarder is disposed on second major surface 516 with the partial reflector and an optional second quarter wave retarder disposed on the first quarter wave retarder. In some embodiments, the first quarter wave retarder is disposed on first major surface 514 with the reflective polarizer disposed on the first quarter wave retarder and the partial reflector is disposed on the second major surface 516 with an optional second quarter wave retarder disposed on the partial reflector.

The image surface 530 has a first maximum lateral dimension and the stop surface 535 has a second maximum lateral dimension. In some embodiments, the first maximum lateral dimension divided by the second maximum lateral dimension may be at least 2, at least 3, at least 4, or at least 5. The image surface 530 and/or the stop surface 635 may be substantially planar or may be curved about one or more axes.

The partial reflector has an average optical reflectance of at least 30% in a desired or pre-determined plurality of wavelengths and may have an average optical transmission of at least 30% in the desired or pre-determined plurality of wavelengths, which may be any of the wavelength ranges described elsewhere herein. The quarter wave retarder(s) included in optical system 500 may be quarter wave retarders at at least one wavelength in the pre-determined or desired plurality of wavelengths. The multilayer reflective polarizer substantially transmits light having a first polarization state (e.g., linearly polarized in a first direction) and substantially reflects light having an orthogonal second polarization state (e.g., linear polarized in a second direction orthogonal to the first direction). As described further elsewhere herein, the multilayer reflective polarizer may be a polymeric multilayer reflective polarizer (e.g., APF) or may be a wire grid polarizer, for example.

Optical system 500 may be centered on folded optical axis 540 which may be defined by the optical path of a central light ray transmitted through image surface 530.

It has been found that using a single integrated optical stack, such as integrated optical stack 510, can provide a high field of view in a compact system. Light ray 537, which is transmitted through an outer edge of image surface 530, is a chief ray that intersects stop surface 535 at the folded optical axis 540 with a view angle of θ, which may be at least 40 degrees, at least 45 degrees, or at least 50 degrees, for example. The field of view at the stop surface 535 is 2θ, which may be at least 80 degrees, at least 90 degrees, or at least 100 degrees, for example.

Figure 6:
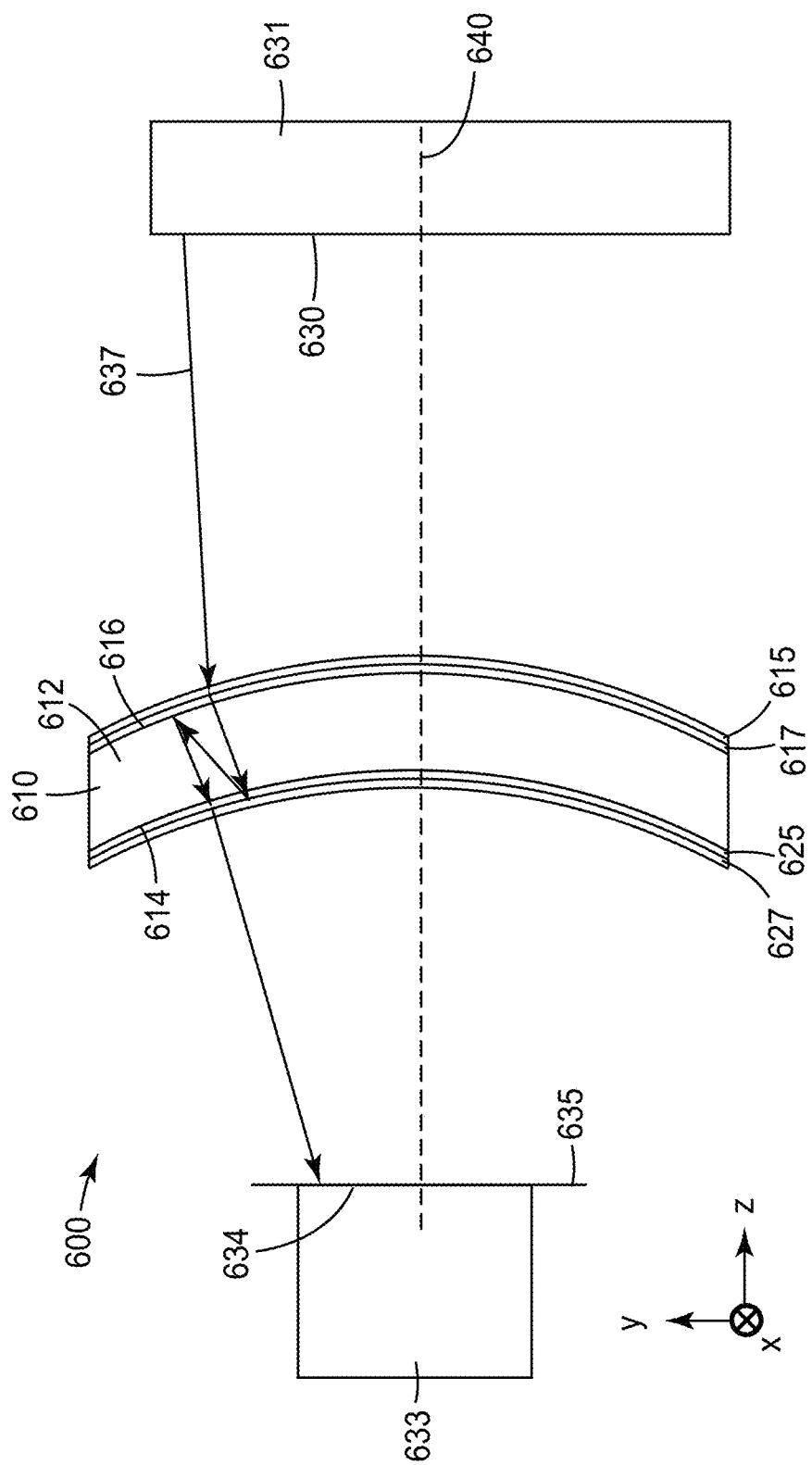

FIG. 6 is a schematic cross-sectional view of optical system 600, which may correspond to optical system 500, including image surface 630, stop surface 635, integral optical stack 610 including optical lens 612 having first and second major surfaces 614 and 616. First quarter wave retarder 625 is disposed on first major surface 614 of optical lens 612 and reflective polarizer 627 is disposed on first quarter wave retarder 625 opposite optical lens 612. Partial reflector 617 is disposed on second major surface 616 of optical lens 612 and second quarter wave retarder 615 is disposed on partial reflector 617 opposite optical lens 612. Optical system 600 may be centered on folded optical axis 640 which may be defined by an optical path of a central light ray transmitted through the image surface 630.

Integral optical stack 610 can be made by first forming reflective polarizer 627 with first quarter wave retarder 625 coated or laminated to reflective polarizer 627 and then thermoforming the resulting film into a desired shape. As described further elsewhere herein, the thermoforming tool may have a shape different than the desired shape so that the film obtains the desired shape after cooling. Partial reflector 617 and second quarter wave retarder 615 may be prepared by coating a quarter wave retarder onto a partial reflector film, by coating a partial reflector coating onto a quarter wave retarder film, by laminating a partial reflector film and a quarter wave retarder film together, or by first forming lens 612 (which may be formed on a film that includes reflective polarizer 627 and first quarter wave retarder 625) in a film insert molding process and then coating the partial reflector 617 on the second major surface 616 and coating the quarter wave retarder 615 on the partial reflector 617. In some embodiments, a first film including reflective polarizer 627 and first quarter wave retarder 625 is provided and a second film including partial reflector 617 and second quarter wave retarder 615 is provided and then integral optical stack 610 is formed by injection molding lens 612 between the first and second thermoformed films in a film insert molding process. The first and second films may be thermoformed prior to the injection molding step. Other optical stacks of the present description may be made similarly by thermoforming an optical film, which may be a coated film or a laminate, and using a film insert molding process to make the optical stack. A second film may be included in the film insert molding process so that the lens formed in the molding process is disposed between the films.

Image source 631 includes the image surface 630 and stop surface 635 is an exit pupil for optical system 600. Image source 631 may be a display panel, for example. In other embodiments, a display panel is not present and, instead, image surface 630 is an aperture adapted to receive light reflected from objects external to optical system 600. A second optical system 633 having an entrance pupil 634 is disposed proximate optical system 600 with stop surface 635 overlapping entrance pupil 634. The second optical system 633 may be a camera, for example, adapted to record images transmitted through image surface 637. In some embodiments, the second optical system is a viewer's eye and entrance pupil 634 is the pupil of the viewer's eye. In such embodiments, the optical system 600 may be adapted for use in a head-mounted display.

The partial reflector 617 has an average optical reflectance of at least 30% in a desired or pre-determined plurality of wavelengths and may have an average optical transmission of at least 30% in the desired or pre-determined plurality of wavelengths, which may be any of the wavelength ranges described elsewhere herein. The first quarter wave retarder 625 and any additional quarter wave retarders included in optical system 600 may be quarter wave retarders at at least one wavelength in the pre-determined or desired plurality of wavelengths. The multilayer reflective polarizer 627 substantially transmits light having a first polarization state (e.g., linearly polarized in a first direction) and substantially reflects light having an orthogonal second polarization state (e.g., linear polarized in a second direction orthogonal to the first direction). As described further elsewhere herein, the multilayer reflective polarizer 627 may be a polymeric multilayer reflective polarizer (e.g., APF) or may be a wire grid polarizer, for example.

Light ray 637 is emitted from the image source 631 and transmitted through the image surface 630 and the stop surface 635. Light ray 637 is transmitted through second quarter wave retarder 615 and partial reflector 617 into and through lens 612. Other light rays (not illustrated) reflect from partial reflector 617 after passing through second quarter wave retarder 615 and are lost from the optical system 600. After making a first pass through lens 612, the light ray passes through first quarter wave retarder 625 and reflects from reflective polarizer 627. Image source 631 may be adapted to emit light having a polarization along the pass axis for reflective polarizer 627 so that after passing through both second quarter wave retarder 615 and first quarter wave retarder 625 it is polarized along the block axis for the reflective polarizer 627 and therefore reflects from the reflective polarizer 627 when it is first incident on it. In some embodiments, a linear polarizer is included between the display panel 631 and the second quarter wave retarder 617 so that light incident on second quarter wave retarder 615 has the desired polarization. After light ray 637 reflects from reflective polarizer 627, it passes back through first quarter wave retarder 625 and lens 612 and is then reflected from partial reflector 617 (other light rays not illustrated are transmitted through partial reflector 617) back through lens 612 and is then again incident on the reflective polarizer 627. After passing through first quarter wave retarder 625, reflecting from partial reflector 617 and passing back through first quarter wave retarder 625, light ray 637 has a polarization along the pass axis for reflective polarizer 627. Light ray 637 is therefore transmitted through reflective polarizer 627 and is then transmitted through stop surface 635 into second optical system 633.

Figure 8:
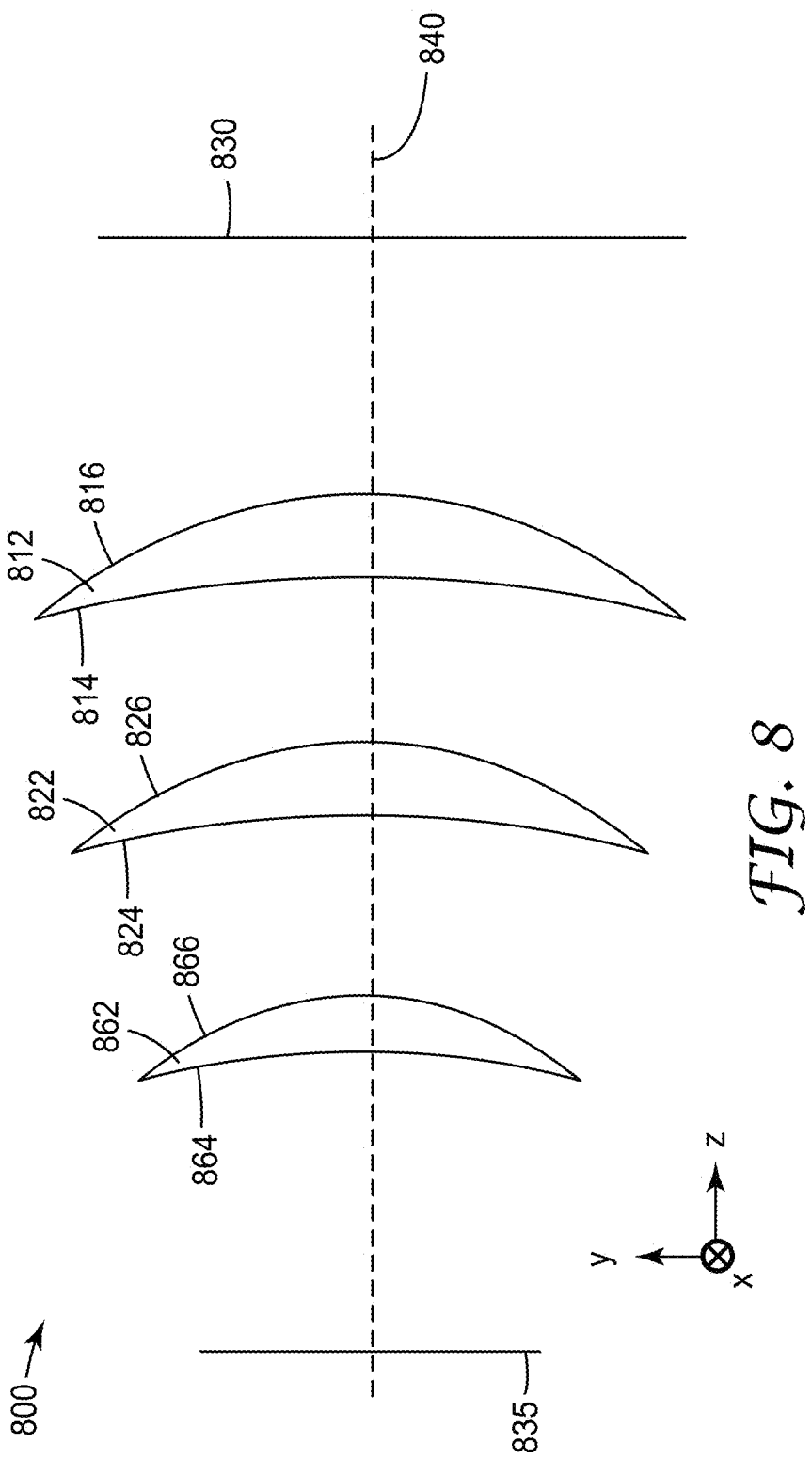

In alternate embodiments, the integrated optical stack 610 is replaced with first and second optical stacks as in FIGS. 1-2 or is replaced with first, second, and third optical stacks as in FIG. 8.

Figure 7:
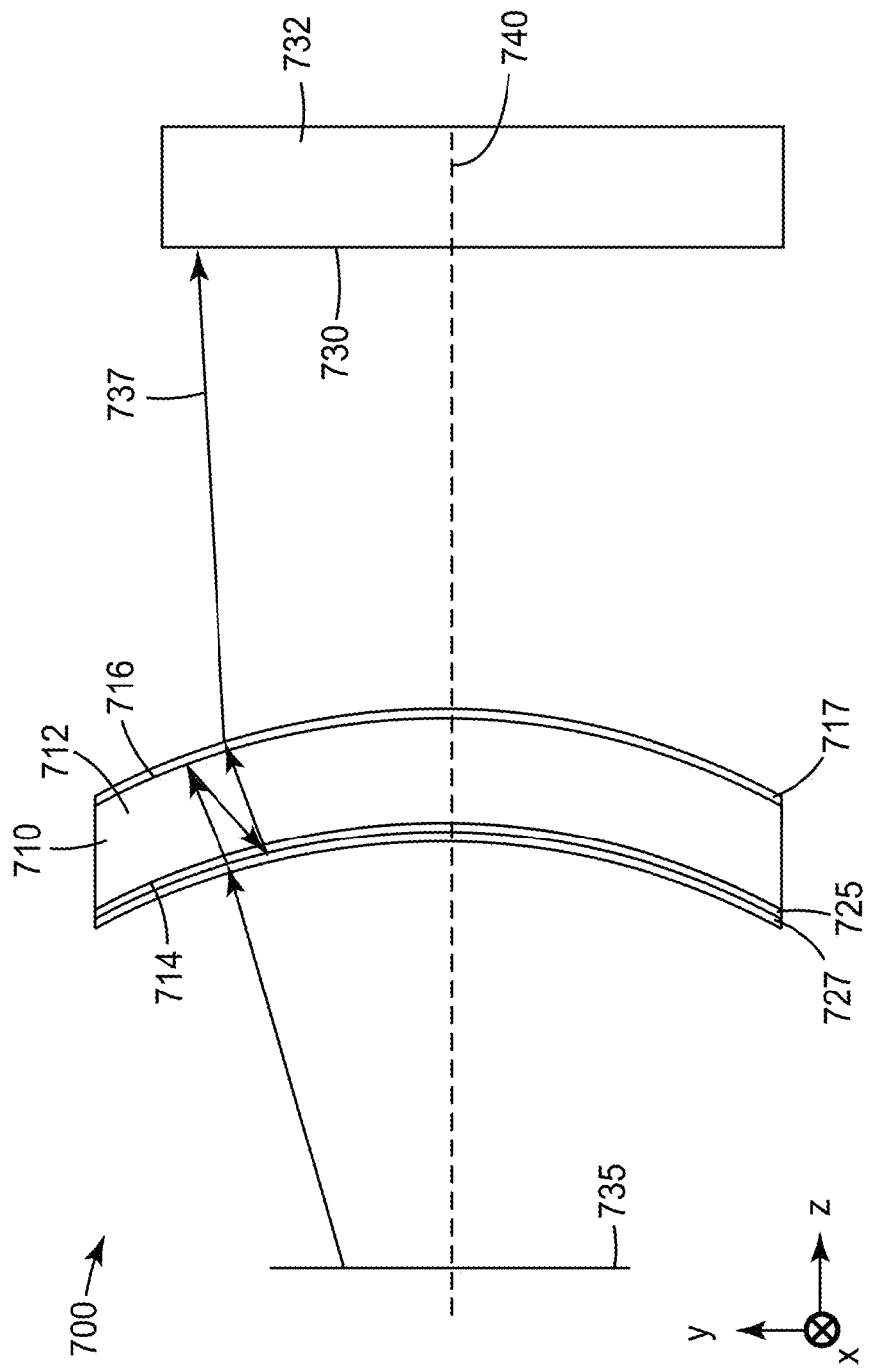

FIG. 7 is a schematic cross-sectional view of optical system 700, which may correspond to optical system 500, including image surface 730, stop surface 735, and integral optical stack 710 including optical lens 712 having first and second major surfaces 714 and 716. First quarter wave retarder 725 is disposed on optical lens 712 and reflective polarizer 727 is disposed on first quarter wave retarder 725. Partial reflector 717 is disposed on second major surface 716. Optical system 700 may be centered on folded optical axis 740 which may be defined by an optical path of a central light ray transmitted through the image surface 730.

Image recorder 732 includes the image surface 730, and stop surface 735 is an entrance pupil for optical system 700.

The stop surface may be an aperture stop of a camera, for example. Image recorder 732 may be a CCD or a CMOS device, for example. Optical system 700 may be a camera or a component of a camera and may be disposed in a cell phone, for example.

The partial reflector 717 has an average optical reflectance of at least 30% in a desired or pre-determined plurality of wavelengths and may have an average optical transmission of at least 30% in the desired or pre-determined plurality of wavelengths, which may be any of the wavelength ranges described elsewhere herein. The first quarter wave retarder 725 and any additional quarter wave retarders included in optical system 700 may be quarter wave retarders at at least one wavelength in the pre-determined or desired plurality of wavelengths. The multilayer reflective polarizer 727 substantially transmits light having a first polarization state (e.g., linearly polarized in a first direction) and substantially reflects light having an orthogonal second polarization state (e.g., linear polarized in a second direction orthogonal to the first direction). As described further elsewhere herein, the multilayer reflective polarizer 727 may be a polymeric multilayer reflective polarizer (e.g., APF) or may be a wire grid polarizer, for example.

Light ray 737 is transmitted through the stop surface 735 and transmitted through the image surface 730 into image recorder 732. Light ray 737 is, in sequence, transmitted through reflective polarizer 727 (other light rays not illustrated may be reflected by reflective polarizer 727), transmitted through quarter wave retarder 725 and optical lens 712, reflected from partial reflector 717 and transmitted back through lens 712 and quarter wave retarder, reflected from reflective polarizer 727 and transmitted through the quarter wave retarder 725, the lens 712 and the partial reflector 717. The light ray 737 is then transmitted through image surface 730 into image recorder 732.

Figure 26:
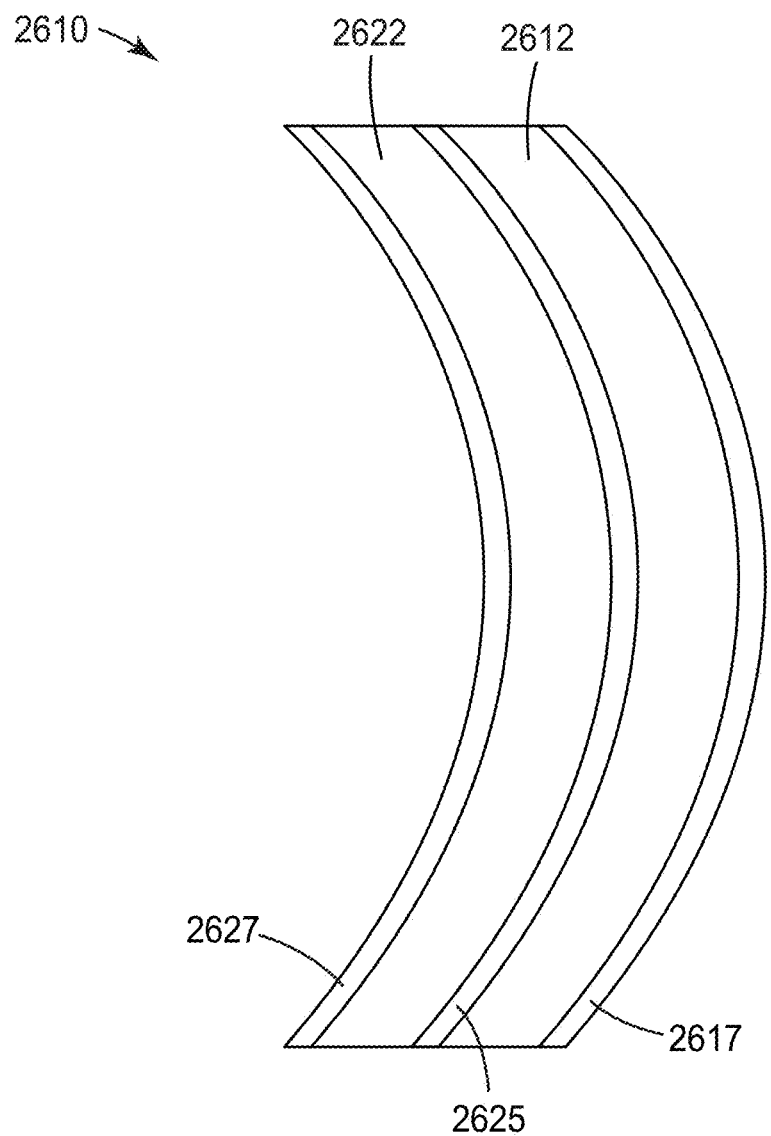
FIG. 26 is a schematic cross-sectional view of an optical stack.

Any of the integral optical stacks 510, 610, and 710 may optionally include a second lens adjacent the first lens with one or more of the reflective polarizer, the quarter wave retarder and the partial reflector disposed between the two lenses. The two lenses may be laminated together using optically clear adhesive. FIG. 26 is a schematic cross-sectional view of integral optical stack 2610, which may be used in place of any of integral optical stacks 510, 610 and 710 in the optical systems 500, 600, and 700, respectively. Integral optical stack 2610 includes first lens 2612, second lens 2622 and a quarter wave retarder 2625 disposed between the first and second lens 2612 and 2622. The quarter wave retarder 2625 may be coated onto a major surface of the second lens 2622, for example, and an optically clear adhesive may be used to attach the quarter wave retarder 2625 to the first lens 2612. Alternatively, the quarter wave retarder 2625 could be coated onto a major surface of the first lens 2612 and an optically clear adhesive could be used to attach the quarter wave retarder 2625 to the second optical lens 2622. In other embodiments, the quarter wave retarder 2625 may be a separate film that is laminated to both of the first and second lenses 2612 and 2622. Optical stack includes reflective polarizer 2627 disposed on a major surface of second lens 2622 opposite first lens 2612 and includes a partial reflector 2617 disposed on a major surface of the first lens 2612 opposite the second lens 2622. The partial reflector 2617, the quarter wave retarder 2625, and the reflective polarizer 2627 may correspond to any of the partial reflectors, the quarter wave retarders and the reflective polarizers, respectively described elsewhere herein.

The first and second lenses 2612 and 2622 may be formed from first and second materials, respectively, that may be the same or different. For example, the material of the lenses 2612 2622 may be a same glass, may be different glasses, may be the same polymer, may be different polymers, or one may be a glass and the other may be a polymer. The material chosen for the lenses will typically exhibit some degree of dispersion (dependence of the refractive index on wavelength). In some cases, the effects of dispersion can be reduced by choosing different materials for the different lenses such that the dispersion in one lens compensates or partially compensates for the dispersion in the other lens. The Abbe number of a material is can be used to quantify the dispersion of a material. The Abbe number is given as $(n_D-1)/(n_F-n_C)$ where $n_D$ is the refractive index at 589.3 nm, $n_F$ is the refractive index of 486.1 nm and $n_C$ is the refractive index at 656.3 nm. In some embodiments, the first and second lenses 2612 and 2622 have differing Abbe numbers. In some embodiments, a difference in the Abbe numbers of the first and second lenses 2612 and 2622 is in a range of 5 to 50. In some embodiments, one of the first and second lenses 2612 and 2622 has an Abbe number greater than 45, or greater than 50, and the other of the first and second lenses 2612 and 2622 has an Abbe number less than 45, or less than 40. This can be achieved, for example, by using a glass for one of the lenses, and using a polymer for the other of the lenses.

Optical system of the present description may include one, two, three or more lenses disposed between an image surface and a stop surface. In some embodiments a plurality of major surfaces is disposed between the image surface and the stop surface with each major surface convex toward the image surface along the first and second axes. In some embodiments, at least six such major surfaces are included. In some embodiments, at least six different major surfaces have at least six different convexities. Including three or more lenses in an optical system may be useful when a small panel having a high resolution is utilized, for example, since having three or more lenses provides six or more major surfaces whose shape can be selected to give desired optical properties (e.g., large field of view) at the stop surface of the optical system.

FIG. 8 is a schematic cross-sectional view of optical system 800 including first optical lens 812 having first and second major surfaces 814 and 816, second optical lens 822 having first and second major surfaces 824 and 826, and third optical lens 862 having first and second major surfaces 864 and 866, each disposed between image surface 830 and stop surface 835. The image surface 830 and/or the stop surface 835 may be substantially planar or may be curved. Any of the first and second optical surfaces may include one or more layers or coatings thereon, as described further elsewhere herein. Optical system 800 includes a partial reflector, a multilayer reflective polarizer and a first quarter wave retarder disposed between the image surface 830 and the stop surface 835. Each of these components may be disposed on one of the major surfaces 864, 866, 824, 826, 814 and 816. In some embodiments, the partial reflector is disposed on the first major surface 824 of the second optical lens 822. In some embodiments, the multilayer reflective polarizer is disposed on the first major surface 864 or on the second major surface 866 of the third optical lens 862. In some embodiments, the first quarter wave retarder is disposed on the multilayer reflective polarizer. In some embodiments, the first quarter wave retarder is disposed on the first major surface 864 of the third optical lens 862 and the multilayer reflective polarizer is disposed on the multilayer reflective polarizer. In some embodiments, a second quarter wave retarder is included in optical system 800. The second quarter wave retarder may be disposed on the second major surface 826 of the second optical lens 822 or may be disposed on one of the first and second major surfaces 814 and 816 of the first optical lens 812.

The image surface 830 has a first maximum lateral dimension and the stop surface 835 has a second maximum lateral dimension. In some embodiments, the first maximum lateral dimension divided by the second maximum lateral dimension may be at least 2, at least 3, at least 4, or at least 5.

Optical system 800 may be centered on folded optical axis 840 which may be defined by an optical path of a central light ray transmitted through the image surface 830.

The partial reflector may have an average optical reflectance of at least 30% in a pre-determined or desired plurality of wavelengths and may have an average optical transmittance of a least 30% in the pre-determined or desired plurality of wavelengths, which may be any of the wavelength ranges described elsewhere herein. The first quarter wave retarder and any additional quarter wave retarders included in optical system 800 may be quarter wave retarders at at least one wavelength in the pre-determined or desired plurality of wavelengths. The multilayer reflective polarizer may substantially transmit light having a first polarization state, which may be a linear polarization state, and substantially reflect light having an orthogonal second polarization state, which may be an orthogonal linear polarization state. As described further elsewhere herein, the multilayer reflective polarizer may be a polymeric multilayer reflective polarizer (e.g., APF) or may be a wire grid polarizer, for example.

In some embodiments, each of the major surfaces major surfaces 864, 866, 824, 826, 814 and 816 have a convexity different from the convexity of each of the remaining major surfaces. In other words, the major surfaces major surfaces 864, 866, 824, 826, 814 and 816 may have six different convexities.

An image source may comprise the image surface 830 and the stop surface 835 may be an exit pupil, which may be adapted to overlap an entrance pupil of a second optical system. The entrance pupil of the second optical system may be an entrance pupil of a viewer's eye, for example. Alternatively, an image recorder may comprise the image surface 830 and the stop surface 835 may be an entrance pupil.

Figure 9:
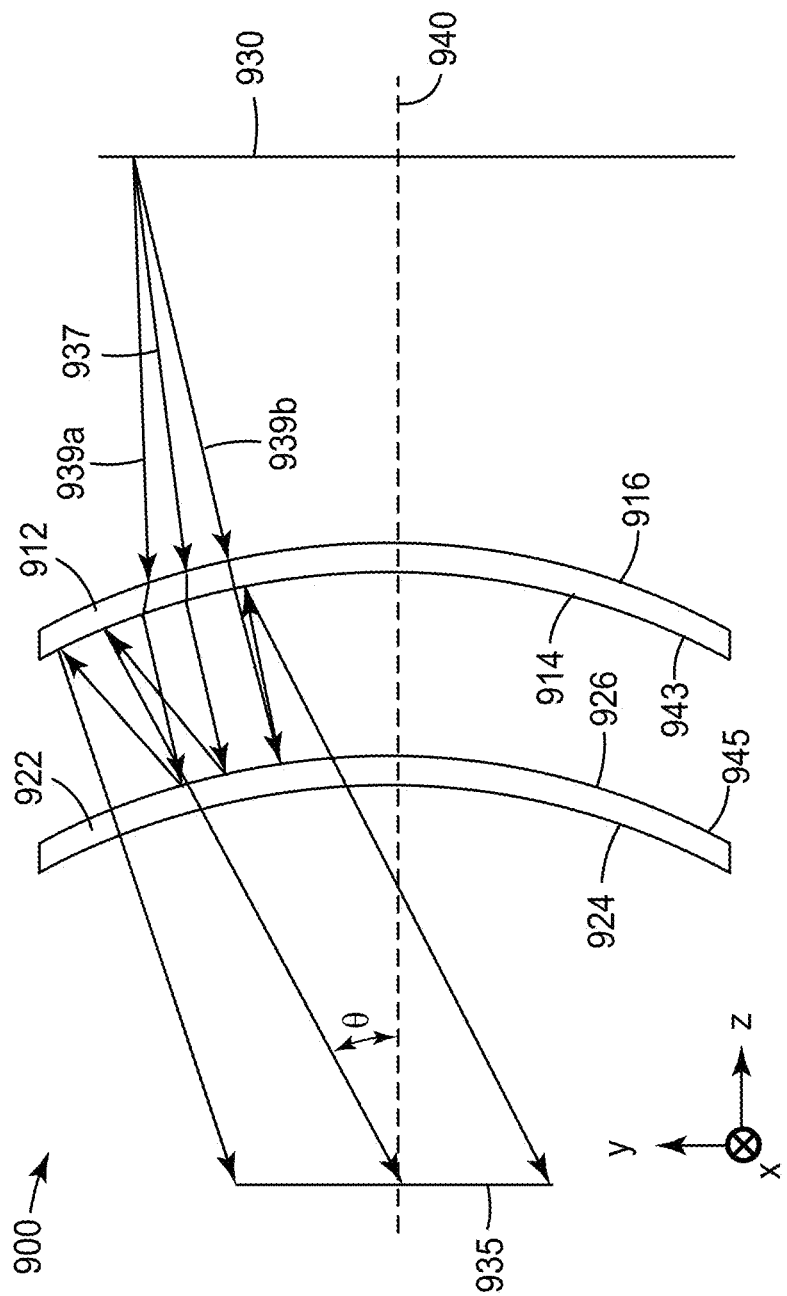

FIG. 9 is a schematic cross-sectional view of optical system 900 including first and second optical lenses 912 and 922 disposed between image surface 930 and stop surface 935. Optical system 900 may correspond to optical systems 100 or 200. As described further elsewhere herein, image surface 930 may be a surface of an image source such as a display panel and stop surface 935 may be an exit pupil. First lens 912 includes first and second major surfaces 914 and 916. First major surface 914 includes one or more layers 914 disposed thereon. Second major surface 916 may also include one or more layers disposed thereon. Second lens 922 includes first and second major surfaces 924 and 926. Second major surface 926 includes one or more layers 945 disposed thereon. In some embodiments, first major surface 924 may also include one or more layers disposed thereon. In the illustrated embodiment, one or more layers 945 includes a reflective polarizer disposed on second major surface 926 and includes a first quarter wave retarder disposed on the reflective polarizer. In the illustrated embodiment, one or more layers 943 includes a partial reflector. In other embodiments, as described further elsewhere herein, the reflective polarizer, the first quarter wave retarder, and the partial reflector are disposed on different surfaces of first and second lenses 912 and 922.

Chief light ray 937 and envelope rays 939a and 939b are transmitted through image surface 930 and through stop surface 935. Chief light ray 937 and envelope rays 939a and 939b propagate from image surface 930 and through stop surface 935. In other embodiments, the directions of the light paths are reversed and image surface 930 may be a surface of an image recorder. Envelope rays 939a and 939b intersect the stop surface 935 at boundaries of the stop surface 935 while chief ray 937 intersect the stop surface 935 at optical axis 940, which may be defined by an optical path of a central light ray transmitted through the image surface 930.

Chief light ray 937 is incident on the stop surface 935 at optical axis 940 at an incidence angle θ. Twice the maximum incidence angle on the stop surface 935 of a chief ray incident on the stop surface 935 along the optical axis 940 is the field of view of optical system 900. In some embodiments, optical system 900 has a low chromatic aberration. For example, in some embodiments, substantially any chief light ray having at least first and second wavelengths at least 150 nm apart in a visible wavelength range (e.g., first and second wavelengths of 486 nm and 656 nm, respectively) and that is transmitted through the image surface 930 and the stop surface 935 has a color separation distance at the stop surface 935 of less than 1.5 percent, or less than 1.2 percent, of a field of view at the stop surface 935. In some embodiments, substantially any chief light ray having at least first and second wavelengths at least 150 nm apart in a visible wavelength range and that is transmitted through the image surface 930 and the stop surface 935 has a color separation distance at the stop surface 935 of less than 20 arc minutes, or less than 10 arc minutes.

Figure 18:
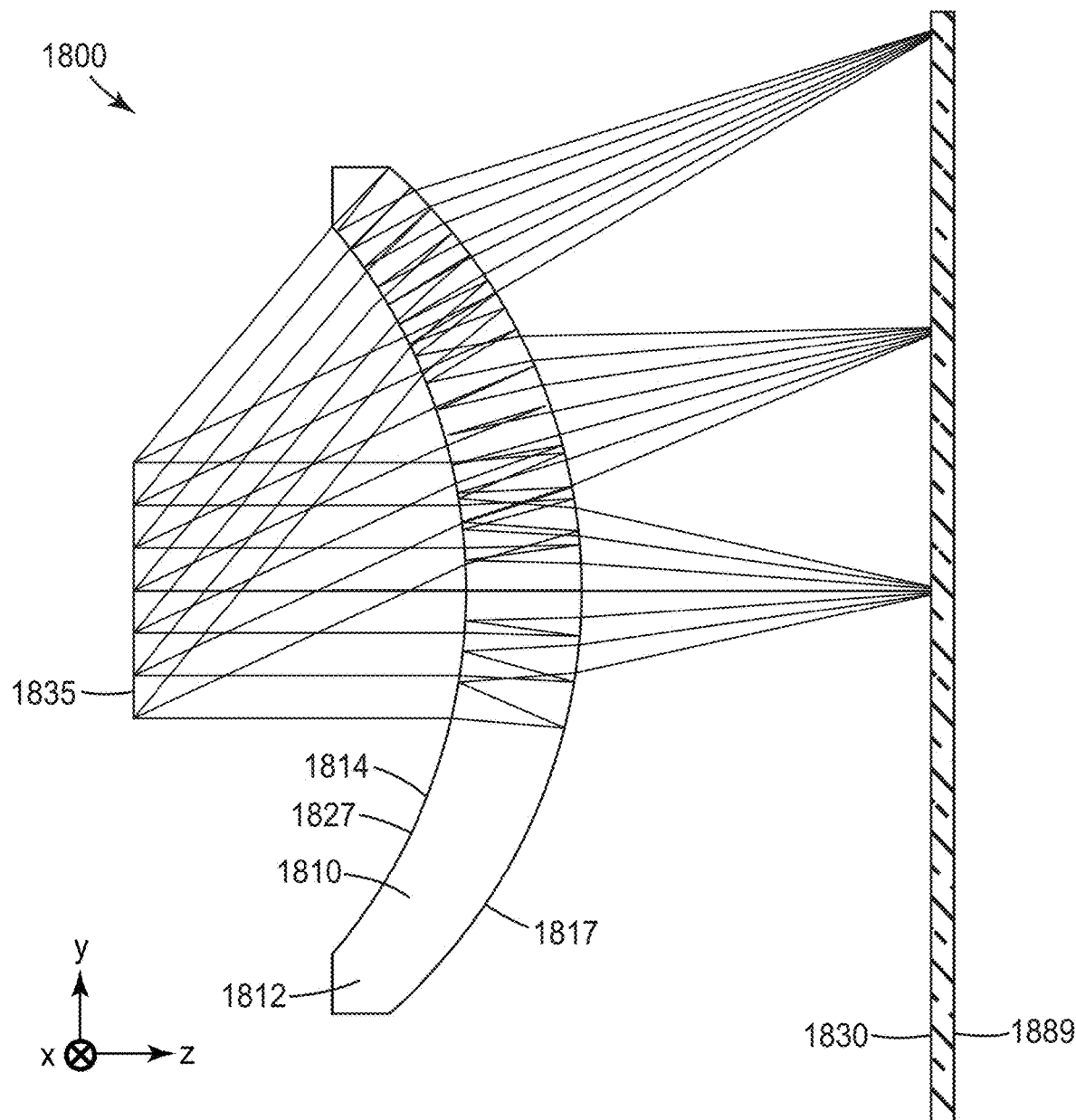
FIGS. 18-23 are cross-sectional views of optical systems.

Additional optical systems of the present description are illustrated in FIGS. 18-23. FIG. 18 is a cross-sectional view of optical system 1800 including an optical stack 1810, an image surface 1830 and a stop surface 1835. Image surface 1830 is a surface of panel 1889. Optical stack 1810 includes a lens 1812, a reflective polarizer 1827 disposed on the major surface of lens 1812 facing stop surface 1835, and a partial reflector 1817 disposed on the major surface of lens 1812 facing the image surface 1830. A quarter wave retarder is included in optical stack 1810 between the reflective polarizer and the lens 1812 or between the partial reflector and the lens 1812. Lens 1812 is convex toward image surface 1830 about orthogonal axes (e.g., x- and y-axes). Three bundles of light rays at three locations on the image surface 1830 are illustrated. The light rays in each bundle are substantially parallel at the stop surface 1835. The light rays may travel predominately from the stop surface 1835 to the image surface 1830 (e.g., in camera applications), or may travel predominately from the image surface 1830 to the stop surface 1835 (e.g., in display applications). Panel 1889 may be a display panel or may be an image recording panel. The reflection aperture of a reflective polarizer may be substantially an entire area of the reflective polarizer or may include the entire area of the reflective polarizer except for a portion near a boundary of the reflective polarizer. In the illustrated embodiment, the reflective polarizer 1827 has a reflection aperture 1814 which substantially coincides with the entire area of the major surface of lens 1812 facing stop surface 1835.

Figure 19:
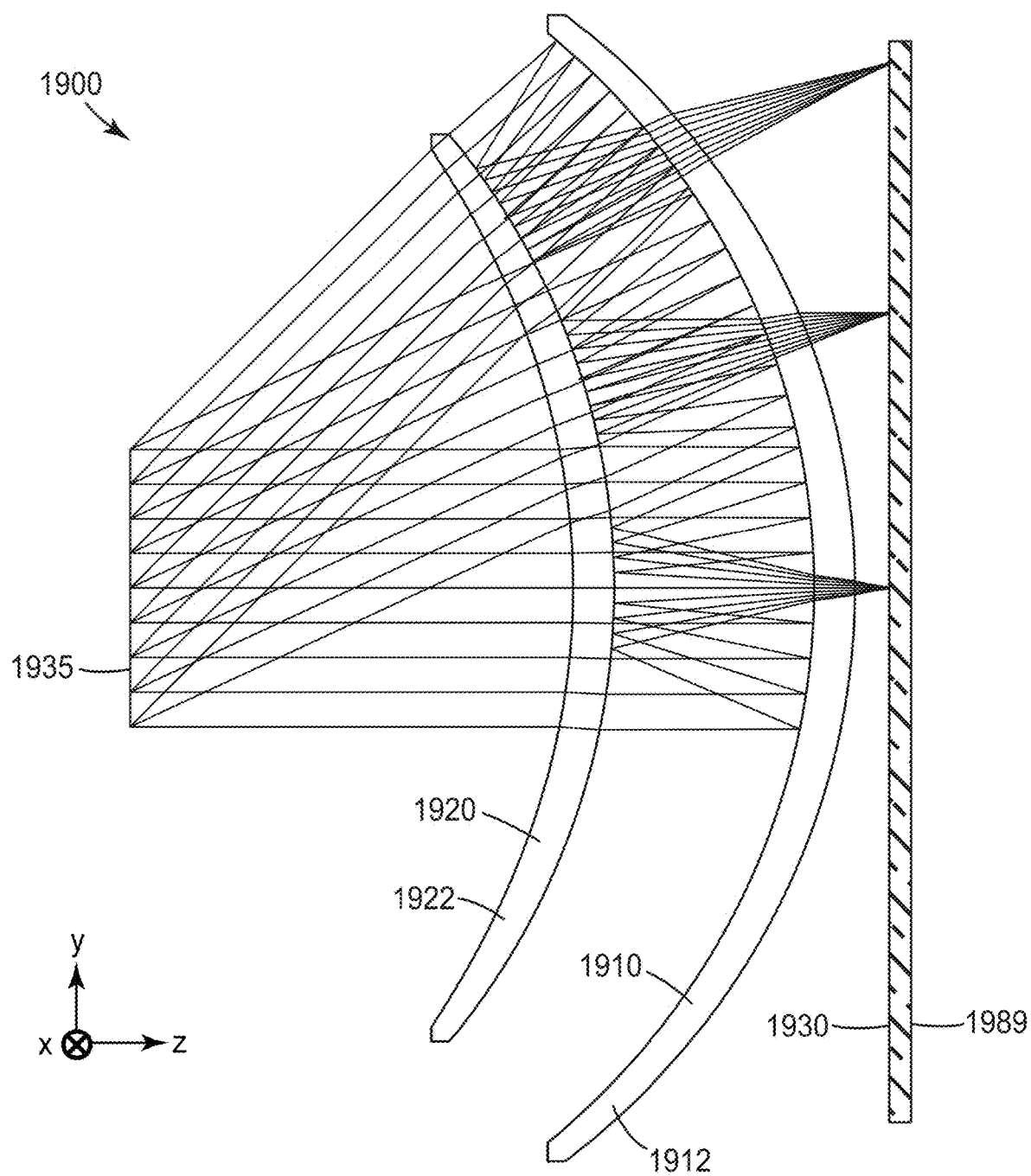

FIG. 19 is a cross-sectional view of optical system 1900 including a first optical stack 1910, a second optical stack 1920, an image surface 1930 and a stop surface 1935. Image surface 1930 is a surface of panel 1989. First optical stack 1910 includes a lens 1912 and a partial reflector disposed on the major surface of lens 1912 facing stop surface 1935. Second optical stack 1920 includes a lens 1922 and includes a reflective polarizer disposed on the major surface of lens 1922 facing the image surface 1930. A quarter wave retarder is included either disposed on the reflective polarizer facing the partial reflector or disposed on the partial reflector facing the reflective polarize. Lens 1912 and lens 1922 are convex toward image surface 1930 about orthogonal axes (e.g., x- and y-axes). Three bundles of light rays at three locations on the image surface 1930 are illustrated. The light rays in each bundle are substantially parallel at the stop surface 1935. The light rays may travel predominately from the stop surface 1935 to the image surface 1930 (e.g., in camera applications), or may travel predominately from the image surface 1930 to the stop surface 1935 (e.g., in display applications). Panel 1989 may be a display panel or may be an image recording panel.

Figure 20:
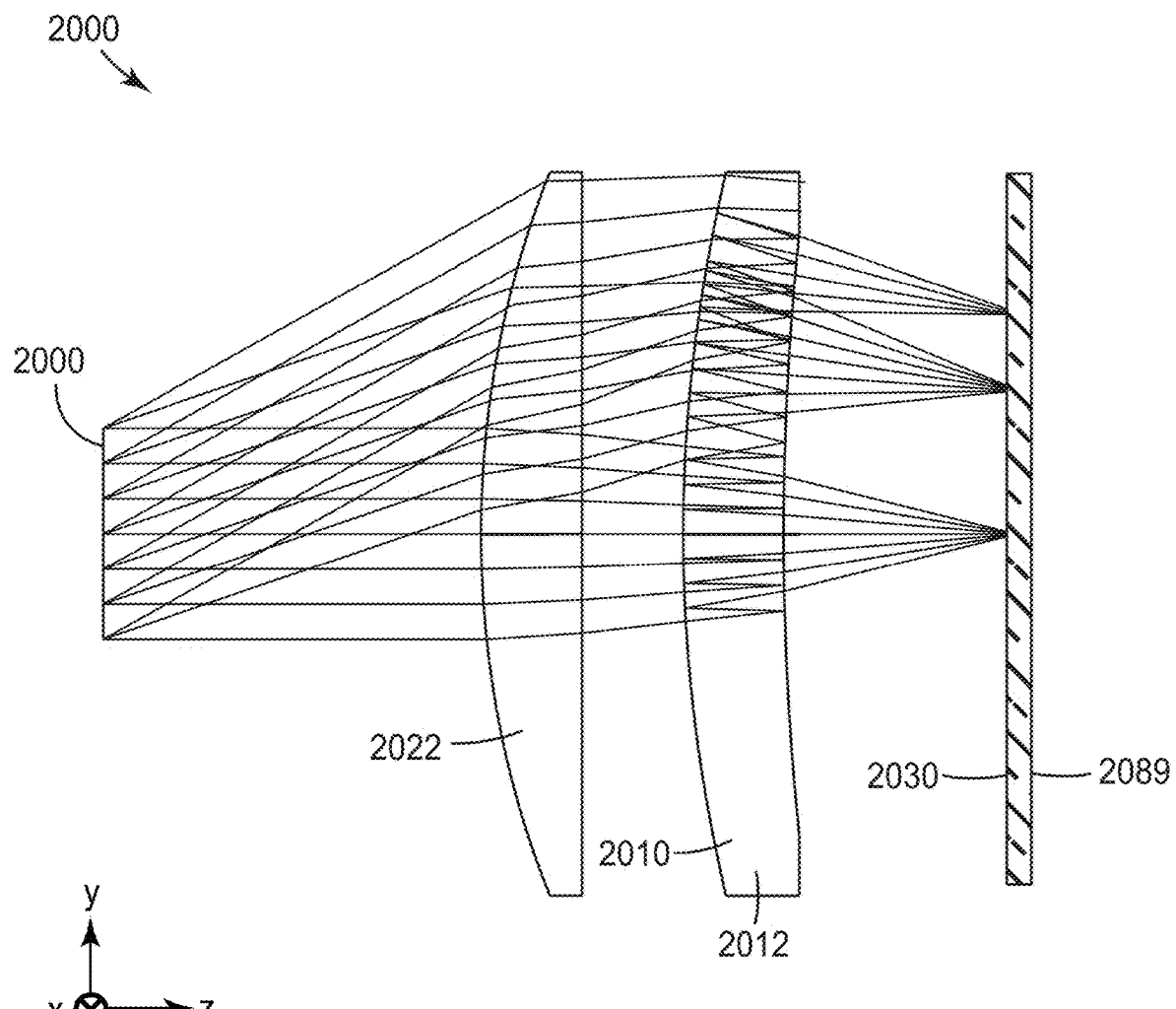

FIG. 20 is a cross-sectional view of optical system 2000 including an optical stack 2010 having a first lens 2012, a second lens 2022, an image surface 2030 and a stop surface 2035. Image surface 2030 is a surface of panel 2089. Optical stack 2010 includes a reflective polarizer disposed on the major surface of first lens 2012 facing stop surface 2035 and includes a partial reflector disposed on the major surface of first lens 2012 facing the image surface 2030. A quarter wave retarder is included in optical stack 2010 between the reflective polarizer and the first lens 2012 or between the partial reflector and the first lens 2012. The reflective polarizer and the partial reflector are convex toward image surface 2030 about orthogonal axes (e.g., x- and y-axes). Three bundles of light rays at three locations on the image surface 2030 are illustrated. The light rays in each bundle are substantially parallel at the stop surface 2035. The light rays may travel predominately from the stop surface 2035 to the image surface 2030 (e.g., in camera applications), or may travel predominately from the image surface 2030 to the stop surface 2035 (e.g., in display applications). Panel 2089 may be a display panel or may be an image recording panel.

Figure 21:
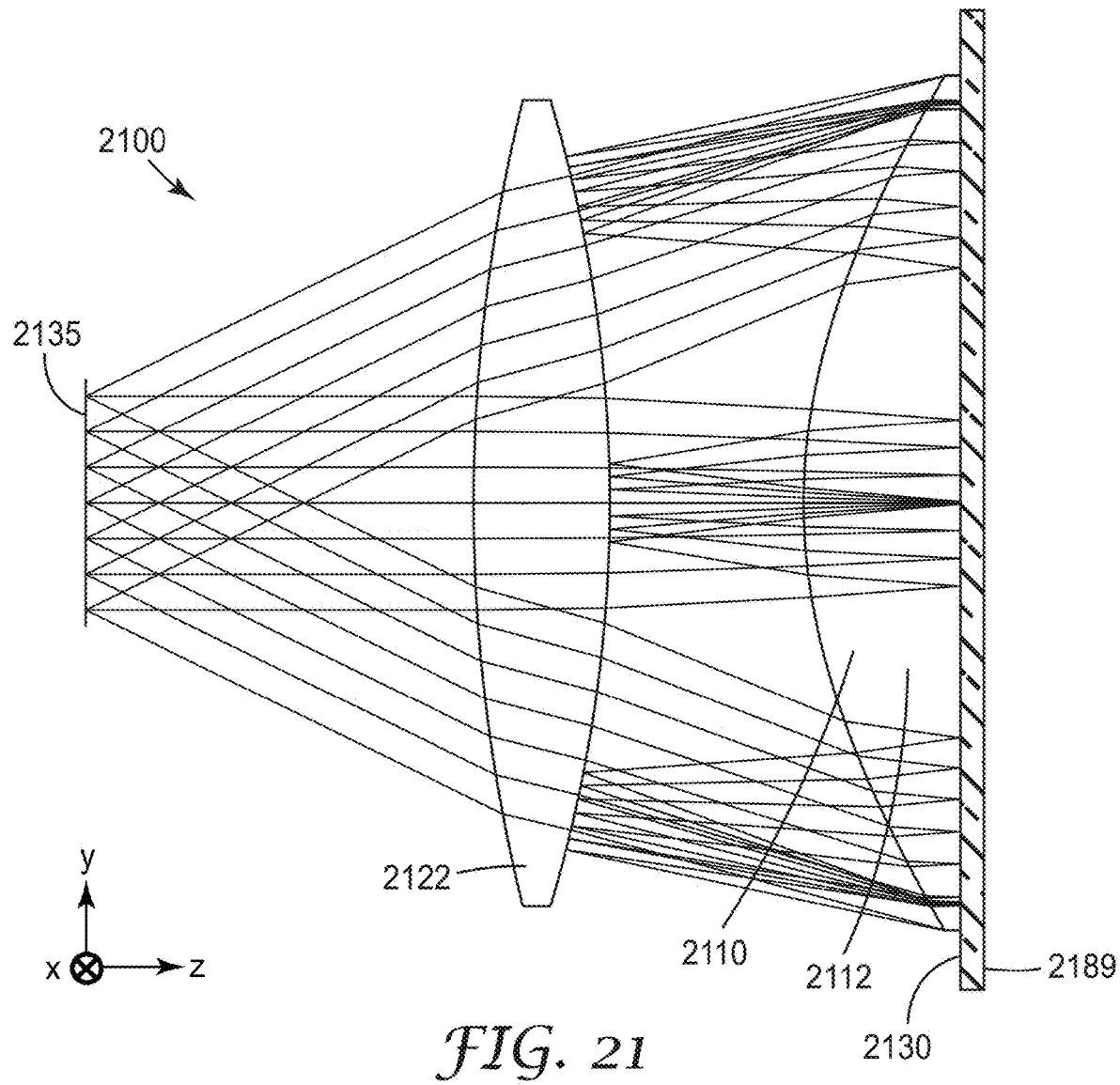

FIG. 21 is a cross-sectional view of optical system 2100 including a first optical stack 2110, a second optical stack 2120, an image surface 2130 and a stop surface 2135. Image surface 2130 is a surface of panel 2189. First optical stack 2110 includes a lens 2112 and a partial reflector disposed on the major surface of lens 2112 facing image surface 2130. Second optical stack 2120 includes a lens 2122 and includes a reflective polarizer disposed on the major surface of lens 2122 facing the image surface 2130. A quarter wave retarder is included either in optical system 2100 disposed on the reflective polarizer facing the partial reflector, or disposed on the partial reflector facing the reflective polarizer, or disposed on the major surface of lens 2112 facing the stop surface 2135. The reflective polarizer is convex toward image surface 2130 about orthogonal axes (e.g., x- and y-axes). The partial reflector may be substantially flat. Three bundles of light rays at three locations on the image surface 2130 are illustrated. The light rays in each bundle are substantially parallel at the stop surface 2135. The light rays may travel predominately from the stop surface 2135 to the image surface 2130 (e.g., in camera applications), or may travel predominately from the image surface 2130 to the stop surface 2135 (e.g., in display applications). Panel 2189 may be a display panel or may be an image recording panel.

Figure 22:
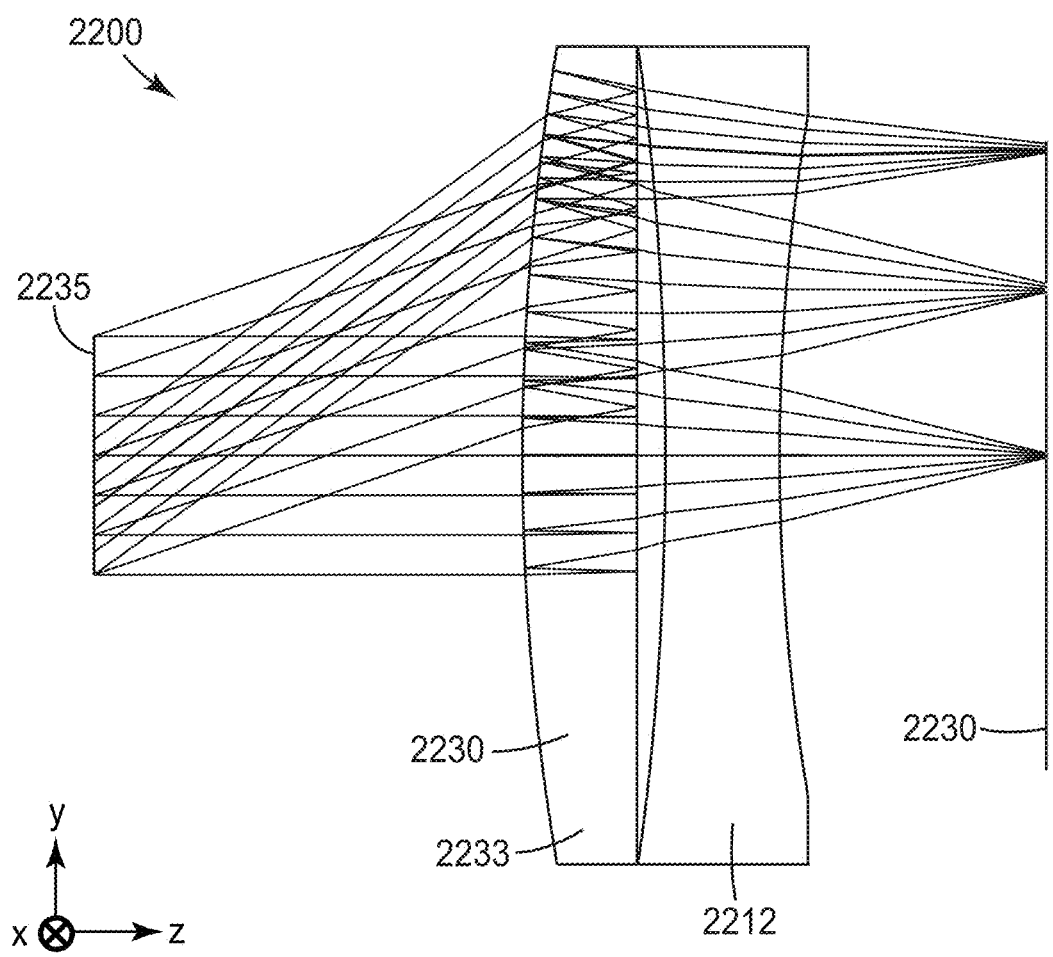

FIG. 22 is a cross-sectional view of optical system 2200 including a first lens 2212, an optical stack 2220 having a second lens 2222, an image surface 2230 and a stop surface 2235. Optical stack 2220 includes a partial reflector disposed on the major surface of lens 2222 facing image surface 2230 and includes a reflective polarizer disposed on the major surface of lens 2222 facing the stop surface 2235. A quarter wave retarder is included either in optical system 2200 disposed on the reflective polarizer facing the partial reflector, or disposed on the partial reflector facing the reflective polarizer. The reflective polarizer is convex toward stop surface 2235 about orthogonal axes (e.g., x- and y-axes). The partial reflector may be substantially flat or may be convex or concave. Three bundles of light rays at three locations on the image surface 2230 are illustrated. The light rays in each bundle are substantially parallel at the stop surface 2235. The light rays may travel predominately from the stop surface 2235 to the image surface 2230 (e.g., in camera applications), or may travel predominately from the image surface 2230 to the stop surface 2235 (e.g., in display applications).

Figure 23:
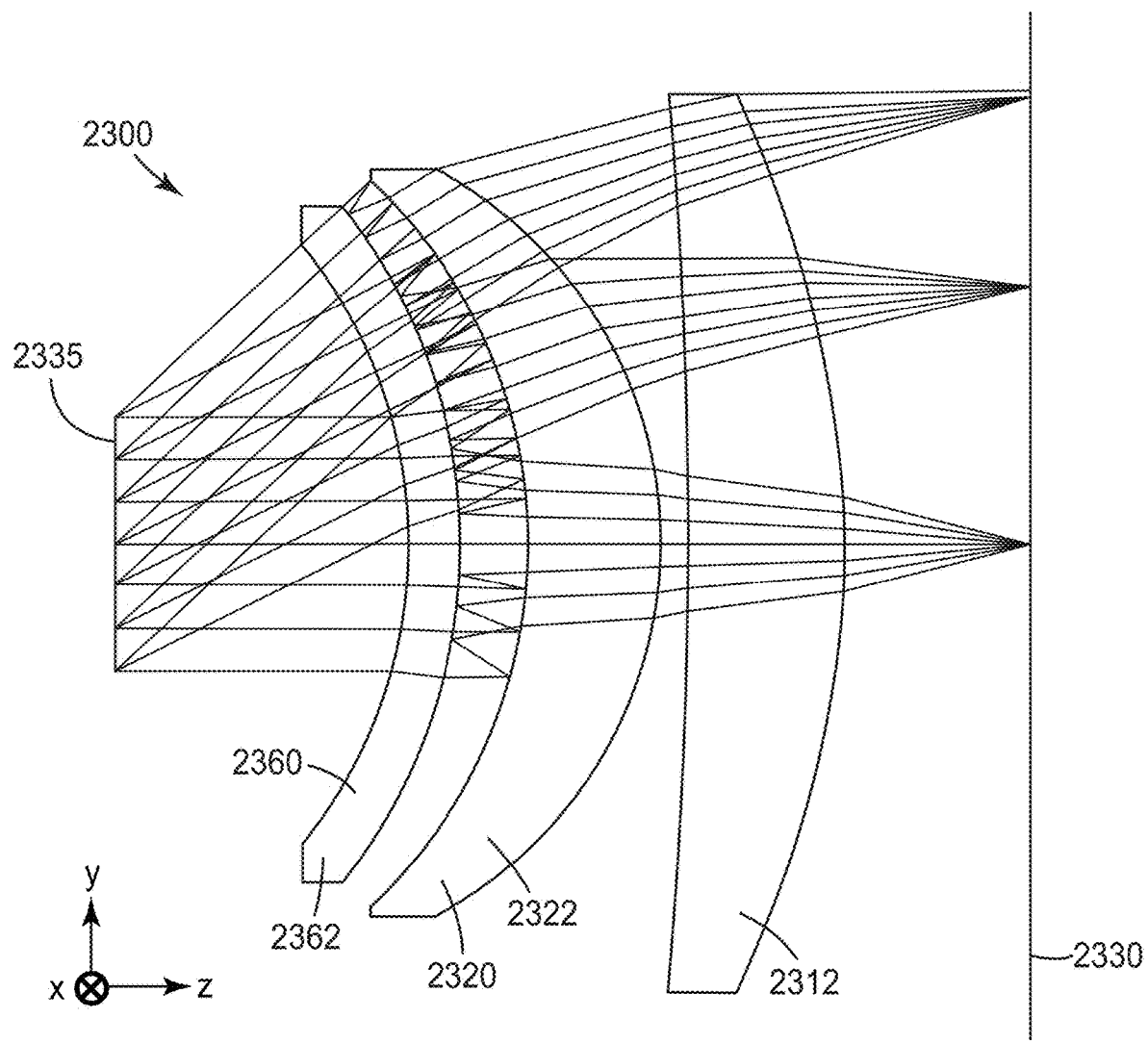

FIG. 23 is a cross-sectional view of optical system 2300 including a first lens 2312, an optical stack 2320 including a second lens 2322, an optical stack 2360 including a third lens 2362, an image surface 2330 and a stop surface 2335. Optical stack 2320 includes a partial reflector disposed on the major surface of second lens 2322 facing stop surface 2335 and includes a reflective polarizer disposed on the major surface of third lens 2362 facing the image surface 2330. A quarter wave retarder is included either in optical system 2300 disposed on the reflective polarizer facing the partial reflector, or disposed on the partial reflector facing the reflective polarizer. The reflective polarizer and the partial reflector are each convex toward image surface 2330 about orthogonal axes (e.g., x- and y-axes). Three bundles of light rays at three locations on the image surface 2330 are illustrated. The light rays in each bundle are substantially parallel at the stop surface 2335. The light rays may travel predominately from the stop surface 2335 to the image surface 2330 (e.g., in camera applications), or may travel predominately from the image surface 2330 to the stop surface 2335 (e.g., in display applications).

FIG. 10 is a cross-sectional view of reflective polarizer 1027 which has apex 1057 and is curved about two orthogonal axes (e.g., the x-axis and the y-axis). The reflective polarizer 1027 has at least one first location 1052 having a radial distance r1 from an optical axis 1040 passing through the apex 1057, and a displacement s1 from a plane 1057 (parallel to the x-y plane) perpendicular to the optical axis 1040 at the apex 1057. The ratio s1/r1 is at least 0.1, or at least 0.2, and may be less than 0.8 or less than 0.6. For example, in some embodiments, s1/r1 is in a range of 0.2 to 0.8 or in a range of 0.3 to 0.6. The reflective polarizer 1027 has at least one second location 1054 having a radial distance r2 from the optical axis 1040 and a displacement s2 from the plane 1047. In some embodiments, s2/r2 is at least 0.3, and may be less than 0.8. The reflective polarizer 1027 has a diameter D and a maximum sag Sm.

In some embodiments, the reflective polarizer is rotationally symmetric or substantially rotationally symmetric about optical axis 1040. A film or component may be said to be substantially rotationally symmetric if the azimuthal variation in the shape of the film or component is no greater than about 10 percent. In the embodiments in FIGS. 10 and 11, azimuthal variation refers to variation with the azimuthal angular coordinate about the optical axis 1040 or 1140 through the apex 1057 or 1157. In some embodiments, the azimuthal variation in s1/r1 is less than 10 percent, or less than 8 percent, or less than 6 percent, or less than 4 percent, or less than 2 percent, or less than 1 percent, or even less than 0.5 percent. The one or more locations 1052 may be a ring of locations having a common radial distance r1 from the optical axis 1040, and similarly the one or more locations 1054 may be a ring of locations having a common radial distance r2 from the optical axis 1040. A film may be said to be rotationally symmetric if the azimuthal variation in the shape of the film is sufficiently small that the film can be molded into a rotationally symmetric lens without wrinkling the film. A film or component may be said to be rotationally symmetric if the azimuthal variation in the shape of the film or component is no greater than about 1 percent, or no greater than about 0.5 percent. The coordinates s1 and r1 define an area A1 of the reflective polarizer 1027 having a radial position from the optical axis 1040 of no more than r1 or having a distance along the optical axis from the apex 1057 of no more than s1.

Figure 11:
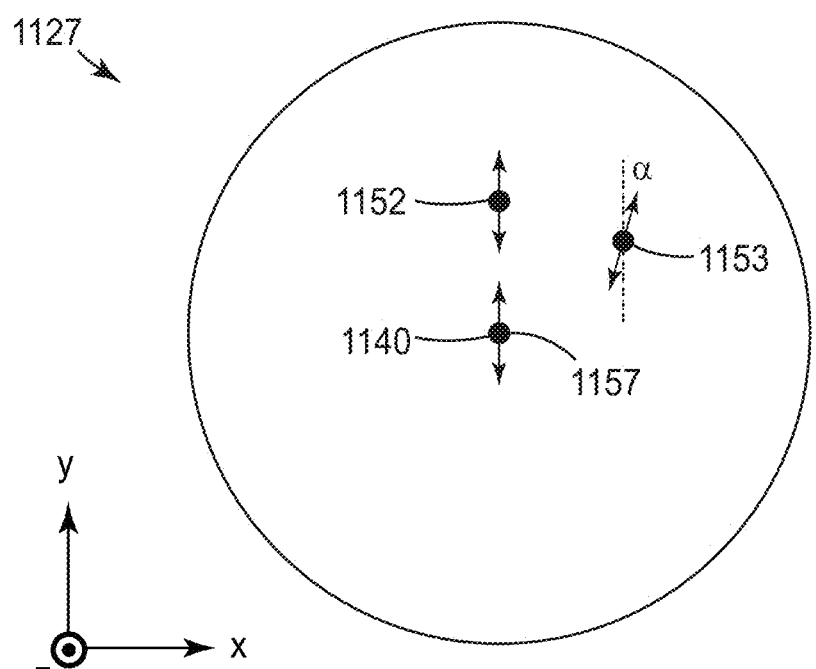
FIG. 11 is a front view of a reflective polarizer.

FIG. 11 is a front view of reflective polarizer 1127, which may correspond to reflective polarizer 1027. Reflective polarizer 1127 is curved about two orthogonal axes (e.g., the x- and y-axes) and has an apex 1157 and an optical axis 1140 (parallel to z-axis) passing through apex 1157. The reflective polarizer 1127 may be a polymeric multilayer reflective polarizer and may have at least one layer that is substantially uniaxailly oriented at the apex 1157. For example, the orientation of the at least one layer may be in the y-direction as indicated by the arrow at apex 1157. This direction may also be a block direction for the reflective polarizer 1127 and the orthogonal direction (x-direction) may be transmission axis for the reflective polarizer. Reflective polarizer 1127 also includes at least one layer that is substantially optically biaxial at at least one first location 1153 on the at least one layer away from the optical axis 1140 and substantially optically uniaxial at at least one second location 1152 away from the optical axis.

A polymeric multilayer optical film may be thermoformed to provide reflective polarizer 1127. The optical film may initially have at least one layer uniaxially oriented with a block axis along the y-direction. During thermoforming the optical film is stretched to conform to the shape of a thermoform tool. The optical film is stretched since the desired shape is curved about two orthogonal axes. In contrast to this, an optical film would not need to be stretched to conform to a shape curved about only one axis. The process of thermoforming can leave the optical film substantially uniaxially oriented at second location 1152 (since the film is stretched along the orientation direction at this location during thermoforming), but result in biaxial orientation at first location 1153 due to the stretching of the optical film as it is thermoformed. The block axes at first and second locations 1153 and 1152 are indicated by the arrows at those locations. The block axis is shifted by a degrees at the first location 1153. The transmission axis may orthogonal to the block axis and may also be shifted by a degrees at the first location 1153. In some embodiments, a maximum variation of a transmission axis (or of a block axis) of the reflective polarizer 1127 is less than about 5 degrees, or less than about 3 degrees, or less than about 2 degrees, or less than about 1.5 degrees, or less than about 1 degree over the entire area of the reflective polarizer or over an area of the reflective polarizer defined by s1 and r1, or over a reflection aperture of the reflective polarizer, where s1 and s2 are as described for reflective polarizer 1027. The reflection aperture refers to the portion of the reflective polarizer that is utilized by the optical system in reflection. The reflection aperture may be substantially the entire area of the reflective polarizer or may exclude a portion of the reflective polarizer near a boundary of the reflective polarizer. The maximum variation of the transmission axis may be determined as the maximum angular difference between the transmission axis and a fixed direction (e.g., the x-direction in FIG. 11) minus the minimum angular difference between the transmission axis and a fixed direction.

Any of the reflective polarizers used in any of the optical systems described herein may be linear reflective polarizers which may be adapted to reflect light having a first linear polarization state and transmit light having a second linear polarization state orthogonal to the first linear polarization state.

Figure 12:
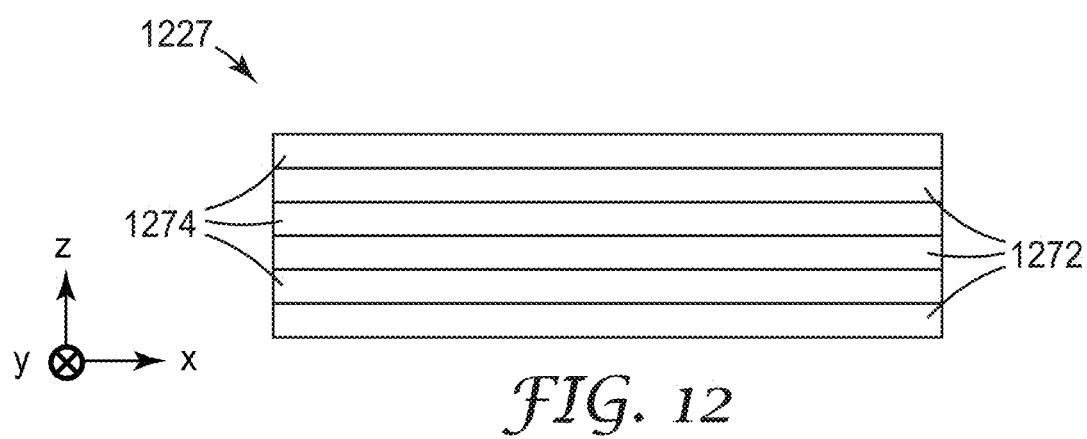
FIG. 12 is a cross-sectional view of a reflective polarizer.

Any of the reflective polarizers used in any of the optical systems of the present description may be a thermoformed reflective polarizer which may be a thermoformed polymeric multilayer optical film. The polymeric multilayer optical film may include a plurality of alternating first and second polymeric layers. This is illustrated in FIG. 12 which is a side view of reflective polarizer 1227 including alternating first polymeric layers 1272 and second polymeric layers 1274. The out-of-plane (thickness) z-direction and orthogonal in-plane x- and y-directions are indicated in the figure. Suitable polymeric multilayer reflective polarizers are described, for example, in U.S. Pat. No. 5,882,774 (Jonza et al.), and U.S. Pat. No. 6,609,795 (Weber et al.).

In some embodiments, at least one layer of the first and second polymeric layers 1272 and 1274 may be substantially uniaxially oriented at some locations in the layer. In some embodiments, the multilayer optical film, prior to thermoforming, has at least one layer having indices of refraction in a length direction (e.g., x-direction) and a thickness direction (e.g., z-direction) that are substantially the same, but substantially different from an index of refraction in a width direction (e.g., y-direction). In some embodiments, the multilayer optical film, prior to thermoforming, is a substantially uniaxially drawn film and has a degree of uniaxial character U of at least 0.7, or at least 0.8, or at least 0.85, where $U=(1/MDDR-1)/(TDDR^{1/2}-1)$ with MDDR defined as the machine direction draw ratio and TDDR defined as the transverse direction draw ratio. Such uniaxially oriented multilayer optical films are described in U.S. Pat. No. 2010/0254002 (Merrill et al.), which is hereby incorporate herein by reference to the extent that it does not contradict the present description. In other embodiments, the multilayer optical film, prior to thermoforming, is not substantially uniaxially drawn.

Uniaxially oriented multilayer reflective polarizers include APF (Advanced Polarizing Film, available from 3M Company). APF includes a plurality of alternating first and second polymeric layers with the first polymeric layers having indices of refraction in a length direction (e.g., x-direction) and a thickness direction (e.g., z-direction) that are substantially the same, but substantially different from an index of refraction in a width direction (e.g., y-direction). For example, the absolute value of the difference in the refractive indices in the x- and z-directions may be less than 0.02 or less than 0.01, and the absolute value of the difference in the refractive indices in the x- and y-directions may be greater than 0.05, or greater than 0.10. APF is a linear reflective polarizer with a block axis along the width direction and a pass axis along the length direction. Any of the reflective polarizers used in any of the optical systems of the present description may be a thermoformed APF. Unless specified differently, refractive index refers to the refractive index at a wavelength of 550 nm.

A reflective polarizer which is not uniaxially oriented is DBEF (Dual Brightness Enhancement Film available from 3M Company, St. Paul, Minn.). DBEF may have first layers with refractive indices in the width, length and thickness directions of about 1.80, 1.62 and 1.50, respectively, while APF may have first layers with refractive indices in the width, length and thickness directions of about 1.80, 1.56 and 1.56, respectively. Both APF and DBEF may have substantially isotropic second layers. In some embodiments, the optical system may use DBEF as the reflective polarizer, and in some embodiments, the optical system may use APF as the reflective polarizer. In still other embodiments, multilayer polymeric reflective polarizer films other than DBEF or APF may be used. APF has unexpectedly been found to offer improvements over DBEF when thermoformed into a shape convex about two orthogonal axes. Such improvements include a higher contrast ratio and reduced off-axis color when used in a display system. Other improvements include a reduced variation in the orientation of the transmission and block axes.

Figure 13A:
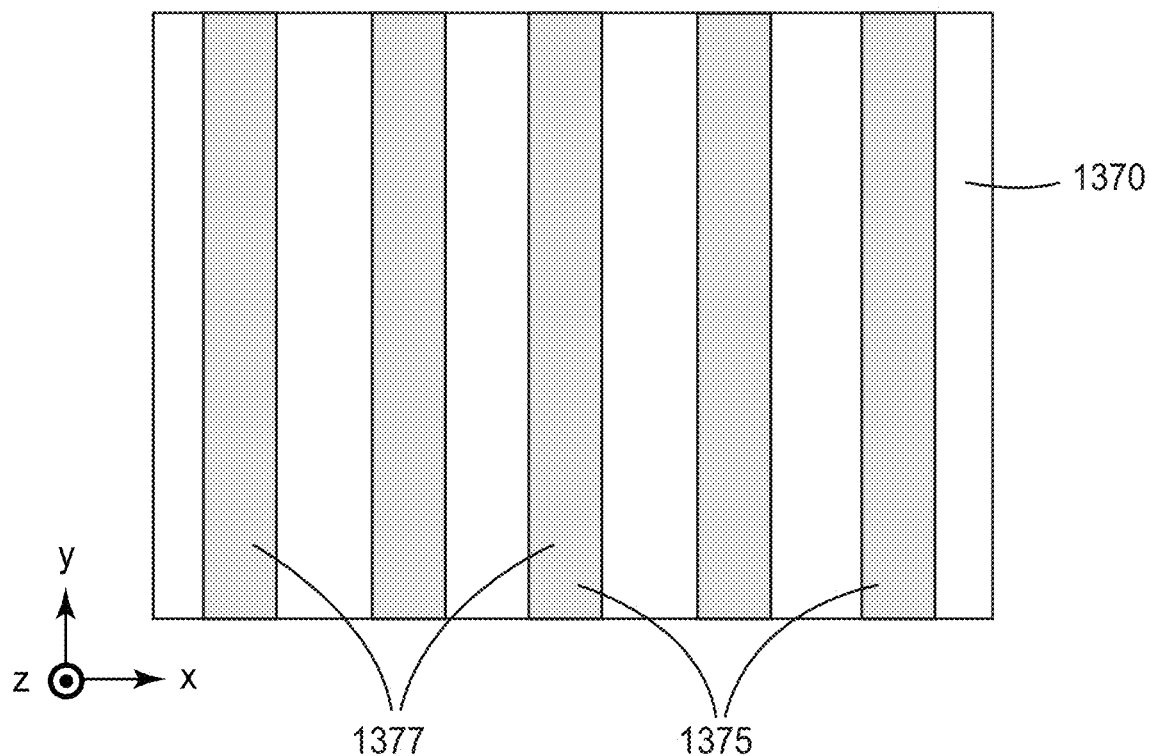
FIG. 13A is a front view of a reflective polarizer.
Figure 13B:
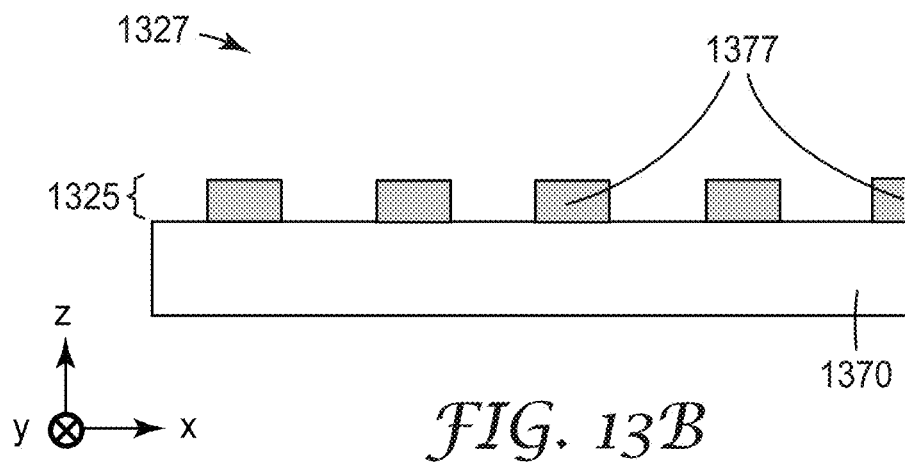
FIG. 13B is a cross-sectional view of the reflective polarizer of FIG. 13A.

Both DBEF and APF are polymeric multilayer reflective polarizers that include alternating polymeric layers. Other reflective polarizers may be used in the optical systems of the present description. In some embodiments, the reflective polarizer is a wire grid polarizer. This is illustrated in FIGS. 13A-13B which are schematic top and side views, respectively, of wire grid polarizer 1327 including a wire grid layer 1375 disposed on a transparent substrate 1370. Such wire grid polarizers can be thermoformed into a shape curved about two orthogonal axes (e.g., the x- and y-axes). The wire grid layer 1375 include a plurality of wires or metallic traces 1377 arranged in parallel rows (prior to thermoforming) extending in a block direction (y-direction) of the reflective polarizer.

In some embodiments, instead of using a wire grid polarizer that includes a wire grid layer on a substrate layer, a wire grid polarizer is formed on a lens surface by depositing metallic traces on the surface of the lens.

In some embodiments, an optical system includes a partial reflector, a reflective polarizer, and a first quarter wave retarder disposed between the reflective polarizer and the partial reflector. The partial reflector and the reflective polarizer may be adjacent to and spaced apart from one another. The optical system may include an image surface and a stop surface with the partial reflector disposed between the image surface and the stop surface, and the reflective polarizer disposed between the stop surface and the partial reflector. An image source may comprise the image surface and the stop surface may be an exit pupil, or an image recorder may comprise the image surface and the stop surface may be an entrance pupil. The image source may include a display panel which may be transparent or semitransparent and the image source may further include a shutter. In some embodiments, the image surface may be adapted to receive light reflected from objects external to optical system. The partial reflector has an average optical reflectance of at least 30% in a desired or pre-determined plurality of wavelengths and may also have an average optical transmittance of at least 30% in the desired or pre-determined plurality of wavelengths. The desired or pre-determined plurality of wavelengths may include one or more continuous wavelength ranges. In some cases, the desired or pre-determined plurality of wavelengths may be the visible wavelength range (e.g., 400 nm to 700 nm). Both the average optical reflectance and the average optical transmittance in the desired or pre-determined plurality of wavelengths may be between 30% and 70%, or between 40% and 60%, for example. The first quarter wave retarder, and any optional additional quarter wave retarders, may be a quarter wave retarder at at least one wavelength in the desired or pre-determined plurality of wavelengths. The quarter wave retarder(s) may be oriented so that the fast axis of the retarder is oriented at 45 degrees relative the transmission or block axis of the reflective polarizer. The reflective polarizer is curved about orthogonal first and second axes. The optical system may include a plurality of surfaces (e.g., the major surfaces of one, two, three, or more optical lenses—see, e.g., FIGS. 1, 2, 5-9) disposed between the image surface and the stop surface and the reflective polarizer, the first quarter wave retarder and the partial reflector may be disposed on one or more surfaces in the plurality of surfaces. Any or all of the surfaces in the plurality of surfaces may have a shape described by an aspheric polynomial sag equation. The optical system may satisfy any one of the following conditions, any combination of any 2, 3, 4, 5, 6 or 7 of the following conditions, or all of the following conditions:

(i) each of the reflective polarizer and the partial reflector are convex toward the image surface along the orthogonal first and second axes;

(ii) the reflective polarizer is a multilayer polymeric reflective polarizer which comprises at least one layer that is substantially optically biaxial at at least one first location on the at least one layer away from an optical axis and substantially optically uniaxial at at least one second location away from the optical axis, and any or substantially any chief light ray that passes through the image surface and the stop surface is incident on each of the first optical stack and the second optical stack with an angle of incidence less than about 30 degrees, or less than about 25 degrees, or less than 20 degrees;

(iii) an image source comprises the image surface, the image source emitting an undistorted image, the partial reflector having a first shape, and the reflective polarizer having a different second shape such that a distortion of the emitted undistorted image transmitted by the stop surface is less than about 10% of a field of view at the stop surface;

(iv) any or substantially any chief light ray having at least first and second wavelengths at least 150 nm apart in a visible wavelength range and transmitted through the image surface and the stop surface has a color separation distance at the stop surface that is less than 1.5 percent, or less than 1.2 percent, of a field of view at the stop surface or less than 20 arc minutes, or less than 10 arc minutes;

(v) the reflective polarizer is a thermoformed multilayer reflective polarizer rotationally symmetric about an optical axis. The reflective polarizer may be APF, or DBEF, or may be a wire grid polarizer, for example;

(vi) the optical system provides an adjustable prescription (dioptric) correction. The prescription correction can be provided by an adjustable distance between the reflective polarizer and the partial reflector and/or an adjustable shape of a lens disposed between the image and stop surfaces;

(vii) the reflective polarizer has at least one first location having a radial distance r1 from an optical axis passing through an apex of the reflective polarizer, and a displacement s1 from a plane perpendicular to the optical axis at the apex. The ratio s1/r1 is at least 0.1, or at least 0.2, and may be less than 0.8 or less than 0.6; and (viii) an image source comprises the image surface, and a contrast ratio at the stop surface is at least 40, or at least 50, or at least 60, or at least 80, or at least 100 over the field of view of the optical system.

Any of the partial reflectors used in any of the optical systems of the present description may have an average optical reflectance of at least 30% in a desired or pre-determined plurality of wavelengths, and/or may have an average optical transmittance of at least 30% in a desired or pre-determined plurality of wavelengths. The desired or pre-determined plurality of wavelengths may be a desired or pre-determined wavelength range or may be a plurality of desired or pre-determined wavelength ranges. Any of the optical systems of the present description may include one or more retarders which are quarter wave retarders at at least one wavelength in the desired or pre-determined plurality of wavelengths. The desired or pre-determined plurality of wavelengths may, for example, be any wavelength range in which the optical system is designed to operate. The pre-determined or desired plurality of wavelengths may be a visible range, and may for example, be the range of wavelengths from 400 nm to 700 nm. In some embodiments, the desired or pre-determined plurality of wavelengths may be an infrared range or may include one or more of infrared, visible and ultraviolet wavelengths. In some embodiments, the desired or pre-determined plurality of wavelengths may be a narrow wavelength band, or a plurality of narrow wavelength bands, and the partial reflector may be a notch reflector. In some embodiments, the desired or pre-determined plurality of wavelengths include at least one continuous wavelength range that has a full width at half maximum of no more than 100 nm, or no more than 50 nm.

In any of the optical systems described herein, unless the context clearly indicates differently, an image source may comprise the image surface and the stop surface may be an exit pupil, which may be adapted to overlap an entrance pupil of a second optical system. The entrance pupil of the second optical system may be an entrance pupil of a viewer's eye, for example. In any of the optical systems described herein, unless the context clearly indicates differently, an image recorder may comprises the image surface and the stop surface may be an entrance pupil.

Any of the optical systems of the present description may have a substantially planar image surface and/or a substantially planar stop surface, or one or both of these surfaces may be curved. The image surface may have a maximum lateral dimension A, and a stop surface may have a maximum lateral dimension B, where A/B is at least 2, or at least 3, or at least 4, or at least 5. In some embodiments, A/B may be in a range of 2 to 20, or 3 to 10, for example.

Any of the optical systems of the present description may have a field of view of at least 80 degrees, of at least 90 degrees, or of at least 100 degrees. Any of the optical systems of the present description may be adapted such that at least one chief light ray transmitted through the stop surface and the image surface may pass through the stop surface at an incident angle of at least 40 degrees, or at least 45 degrees, or at least 50 degrees.

In some aspects of the present description a device is provide that includes any one or more of the optical systems of the present description. The device may be or may include, for example, a display device, such as a head-mounted display or a projection system, an illuminator, which may also be a projector, a beam expander, a camera, or a magnifying device. The magnifying device may be a telescope, binoculars, or a microscope, for example.

In some embodiments, the reflective polarizer is thermoformed. Optical films, such as reflective polarizers, may have anisotropic mechanical properties which make obtaining a desired shape of the thermoformed optical film difficult due to anisotropic contraction of the optical film after removing the film from the thermoform mold. The anisotropic mechanical properties can arise in a multilayer polymeric reflective polarizer due to the anisotropic orientation of the polymeric molecules in at least some layers of the reflective polarizer. Anisotropic mechanical properties in a wire grid polarizer comprising wires on a surface of a polymeric film can arise due to the anisotropy of the wires which may extend in one direction. According to the present description, methods have been found for providing an optical film having a desired shape when the optical film has anisotropic mechanical properties.

Figure 15:
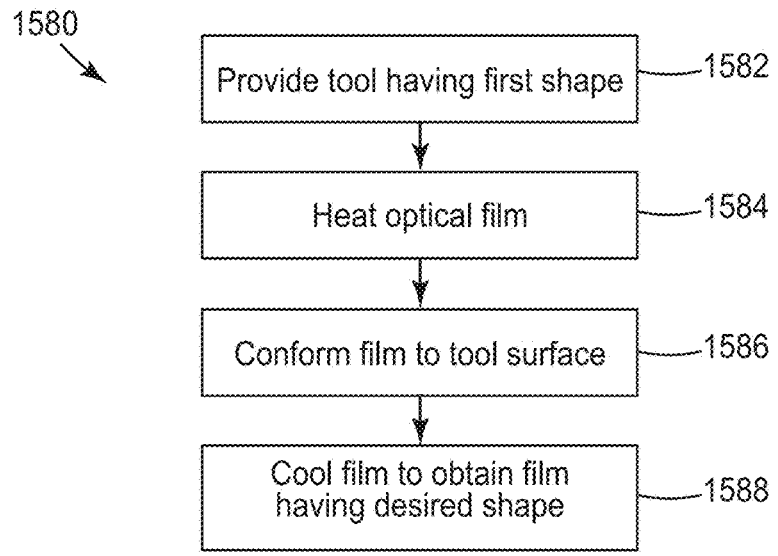
FIG. 15 is a schematic flow chart illustrating a method of making a desired optical film having a desired shape.

FIG. 15 is a schematic flow chart illustrating a method 1580 of making a desired optical film having a desired shape including the steps of (i) (step 1582) providing a thermoform tool having an external surface having a first shape different than the desired shape; (ii) (step 1584) heating an optical film resulting in a softened optical film; (iii) (step 1586) conforming the softened optical film to the external surface having the first shape while stretching the softened film along at least orthogonal first and second directions (e.g., the x- and y-directions of FIG. 16) resulting in a conformed optical film having the first shape; and (iv) (step 1588) cooling the conformed optical film resulting in the desired optical film having the desired shape. The cooling step may include releasing the optical film from the tool. For example, in some embodiments, the optical film is removed from the tool and allowed to cool. In some embodiments, the method further includes the step of molding (e.g., film insert molding) an optical lens on the optical film resulting in an optical stack.

In some embodiments, the desired optical film is any optical film having anisotropic mechanical properties and may be any of the reflective polarizers described herein. In some embodiments, the desired optical film is a reflective polarizer with a quarter wave coating or a laminated reflective polarizer film and quarter wave retarder film. The desired shape may be a shape that is rotationally symmetric about an optical axis (e.g., parallel to the z-axis of FIG. 16) of the optical film. The optical axis of the optical film may coincide with the optical axis of an optical stack that includes the optical film.

Figure 16:
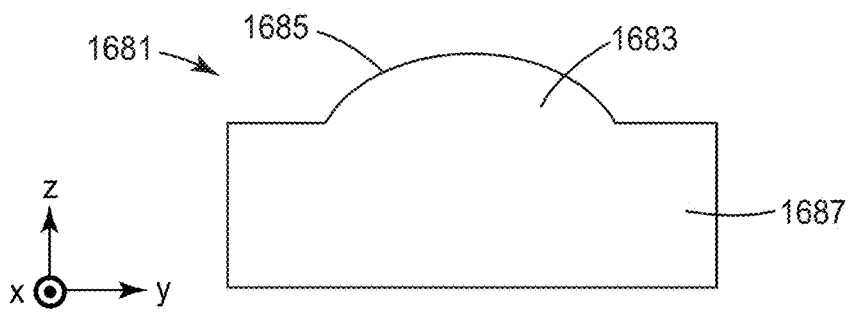
FIG. 16 is a schematic cross-sectional view of a thermoform tool.

FIG. 16 is a schematic cross-sectional view of a thermoform tool 1681 suitable for use in thermoforming optical films. Thermoform tool 1681 includes a dome-like portion 1683 having an external surface 1685 and disposed on a base 1687. The external surface 1685 may have a shape of a portion of an ellipsoid, for example. The ellipsoid may have a major diameter and a minor diameter and a ratio of the major diameter to the minor diameter may be in a range of 1.01 to 1.1, or in a range of 1.01 to 1.05, for example. It has been found that thermoforming a reflective polarizer film on such an ellipsoidal tool according to method 1580, for example, can provide a rotationally symmetric reflective polarizer upon removing the film from the tool and allowing the film to cool.

Any of the reflective polarizers of the present description, which may be included in any of the optical systems of the present description, may be thermoformed according to the process 1580 and/or using the thermoform tool 1681. The reflective polarizer, and other optical films, may be integrated into an optical stack including an optical lens by injection molding a suitable lens material (e.g., polycarbonate) onto the film(s) in a film insert molding process, for example.

Figure 17:
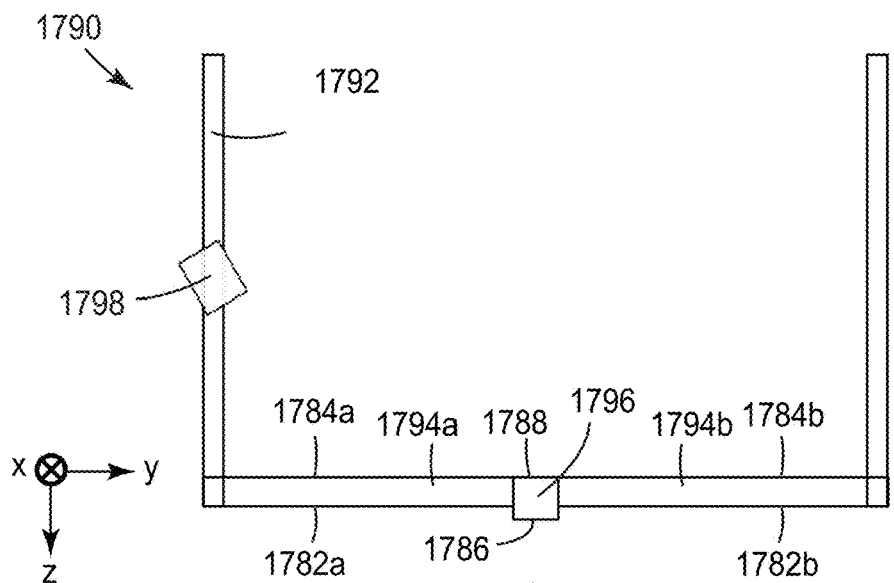
FIG. 17 is a schematic top view of a head-mounted display.

Any of the optical systems of the present description may be used in a device such as a head-mounted display (e.g., a virtual reality display) or a camera (e.g., a camera disposed in a cell phone). FIG. 17 is a schematic top view of head-mounted display 1790 including a frame 1792, first and second display portions 1794a and 1794b, a camera 1796, and an eye-tracking unit 1798. First and second display portions 1794a and 1794b include outer surfaces 1782a and 1782b, respectively, and inner surfaces 1784a and 1784b, respectively. Camera 1796 includes an outer surface 1786 and an inner surface 1788. Each of the first and second display portions 1794a and 1794b may include a display panel comprising the image surface of any of the optical systems of the present description with a stop surface of the optical system being an exit pupil adapted to overlap an entrance pupil of a user. For example, first display portion 1794a (and similarly for second display portion 1794b) may include the image surface 130 and the first and second optical stacks 110 and 120 of optical system 100. Image surface 130 may be disposed adjacent outer surface 1782a and the stop surface 135 may lie outside of first display portion 1794a toward the viewer (in the minus z-direction from inner surface 1784a). In some embodiments, a single display panel spanning portions 1794a and 1794b may be used instead of separate display panels.

The camera 1796, which may optionally be omitted, may include any optical system of the present description with the stop surface an entrance pupil of the optical system and with an image recorder comprising the image surface. For example, camera 1796 may include the first and second optical stacks 110 and 120 of optical system 100. Image surface 130 may be a surface of an image recorder disposed adjacent inner surface 1788 and the stop surface 135 may be disposed adjacent outer surface 1786 or may lie outside of the camera away from the viewer (in the plus z-direction from outer surface 1786).

Head-mounted display 1790 may include three of the optical systems of the present description. In other embodiments, only one or two optical systems of the present description is included in a head-mounted display. For example, in some embodiments a head-mounted display may include a single optical system of the present description to provide images to one eye of a user while the other eye has an unobstructed view of the user's environment. In still other embodiments, more than three optical systems of the present description may be included. For example, two camera units each including an optical system of the present description may be included to provide stereoscopic views or to provide multiple views (e.g., picture in picture) to the user while two display units are utilized as in FIG. 17.

The head-mounted display 1790 may include an eye-tracking system comprising eye-tracking unit 1798, which may optionally be omitted. The system may monitor the diameter and position of a user's pupil utilizing an imaging sensor and processor. Light from a display panel included in first portion 1798 may reflect from the user's pupil and reflect from the reflective polarizer of an optical system disposed in first portion 1798 into eye-tracking unit 1798. Alternatively, eye-tracking unit 1798 may include a light source (e.g., an infrared light source) which emits light toward a reflective component in first portion 1794a which is reflected towards the viewer's eye. This light then reflects from the eye and reflects from the reflective component in first portion 1794a back towards eye-tracking unit 1798.

The attributes of the eye that the eye monitoring system can detect may include one or more of the following: the viewing direction of the eye, diameter and changes in the diameter of the pupil, blinking of the eyelids, the eye tracking objects, and saccade movement. Eye tracking parameters may include velocity of the eye rotation and lag or phase between movement of an object and movement of the eye. Saccade movement may include duration, velocity, and pattern of the movement. The system may quantify fatigue and cognitive processing load of the user of the system based on pupillary response with considerations of ambient light conditions and may be personalized to the user based on historical data.

In some embodiments, the eye-tracking unit includes a camera (e.g., a red-green-blue (RGB) camera or an infrared (IR) camera) which may or may not include an optical system of the present description and that can capture an image of the eye. An IR camera can be used to determined ambient light conditions since the average IR luminance of the eye image is indicative of the ambient light levels.

In some embodiments, the head-mounted display 1790 includes an eye tracking system adapted to detect changes in pupil size and use that information to quantify user fatigue and cognitive processing load. In some embodiments, the head-mounted display 1790 is adapted (e.g., using an algorithm running on an embedded processor) to implement one or more or all of the following steps:

Step 1: Capture a grayscale image of the eye.

Step 2: Filter out noise (e.g. using a Gaussian filter).

Step 3: Calculate gradient magnitude and direction for each pixel in the image of the eye.

Step 4: Identify pixels with higher gradient magnitudes (these are likely to be an edge of an object).

Step 5: Identify edges by, for example, connecting the pixels identified in the previous step according to the Helmholtz Principle of human visual perception.

Step 6: Compare edge line segments to the equation of an ellipse or other shape defined by a polynomial equation. The smallest ellipse-like shape can be identified as the pupil. The area of the iris can also be determined and may be used to improve accuracy. Other elliptical shapes that may be in the image, such as glint, can be eliminated.

Step 7: Calculate the pupil size (e.g., diameter or area) based on the line fitting done previously and the distance between the eye and the camera.

Step 8: Determine and apply an adjustment factor to the calculated pupil size to account for ambient light conditions. Ambient light conditions can be determined using an additional sensor included in the head-mounted system or via luminance analysis of the image captured.

Step 9: Optionally save the adjusted pupil size in a database. The pupil size may be recorded as a function of time and may be stored as a time-series (a sequence of data points made over time).

The head-mounted display 1790 may be adapted to change the light intensity generated by the display panels in first and second portions 1794a and 1794b based on pupil size and/or pupil direction information determined using eye-tracking unit 1798. The eye-tracking system may be configured to detect where in the virtual image that the user is looking and the optical system may be adapted to adjust the virtual image distance to match the depth of the object as presented stereoscopically by adjusting the positions of one or more lenses in the optical system as described elsewhere herein.

In some embodiments, head-mounted display 1790 is configured so that prescription lenses may be attached adjacent inner surfaces 1784a and/or 1784b.

Figure 24A:
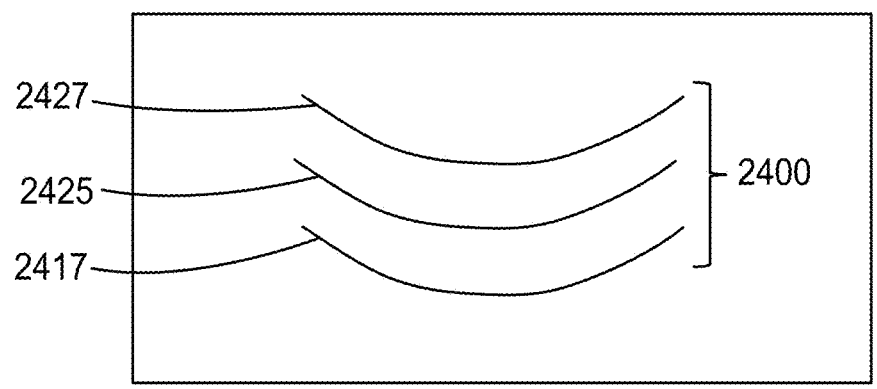

In some aspects of the present description, a device is provided that includes an optical system of the present description. An example of such a device is a head-mounted display such as head-mounted display 1790 that include one or more of the optical systems of the present description. FIG. 24A is a schematic top view of a device 2490 that includes optical system 2400. Optical system 2400 includes a reflective polarizer 2427, a partial reflector 2417, and a first quarter wave retarder 2425 disposed between the reflective polarizer 2427 and the first quarter wave retarder 2425. The reflective polarizer 2427, the partial reflector 2417, and the first quarter wave retarder 2425 may correspond to any of the reflective polarizers, the partial reflectors or the quarter wave retarders described elsewhere herein. For example, in some embodiments the reflective polarizer 2427 is a polymeric multilayer reflective polarizer (e.g., APF) and in some embodiments the reflective polarizer 2427 is a wire grid polarizer. The reflective polarizer 2427 may be curved about orthogonal first and second axes and may be thermoformed into the desired shape. The partial reflector 2417 may be curved about orthogonal first and second axes or may alternatively be flat or curved about only one axis. Similarly, the first quarter wave retarder 2425 may be curved about orthogonal first and second axes or may alternatively be flat or curved about only one axis. The reflective polarizer 2427, the partial reflector 2417, and the first quarter wave retarder 2425 may be disposed on surfaces of one or more lenses as described elsewhere herein.

Device 2490 can be, for example, a display device, a beam expander, a camera, or a magnifying device such as a telescope, a microscope, binoculars or the like. In the case of binoculars or head-mounted displays, more than one optical system 2400 may be included. For example, two of optical systems 2400 (one for each eye) may be included; an example of a device including two optical systems is illustrated in FIG. 24C. In display applications, the optical system 2400 may be oriented with the partial reflector 2417 facing an image forming device (e.g., a display panel) of the display. In camera applications, the optical system 2400 may be oriented with the reflective polarizer 2427 facing an entrance pupil of the camera and with the partial reflector 2417 facing the object or environment to be viewed. A stop surface of the optical system 2400 may be an aperture adapted to receive light reflected from objects external to the optical system 2400, and an image surface of the optical system 2400 may be a surface of an image recorder. In telescope, microscope, and binoculars applications, the optical system 2400 may be used in an objective portion device or may be used in an eyepiece of the device with the reflective polarizer facing the viewer in either case. An image surface of the optical system 2400 may be adapted to receive light reflected from objects external to the optical system 2400, and a stop surface of the optical system 2400 may be an exit pupil adapted to overlap a pupil of the viewer.

Figure 24B:
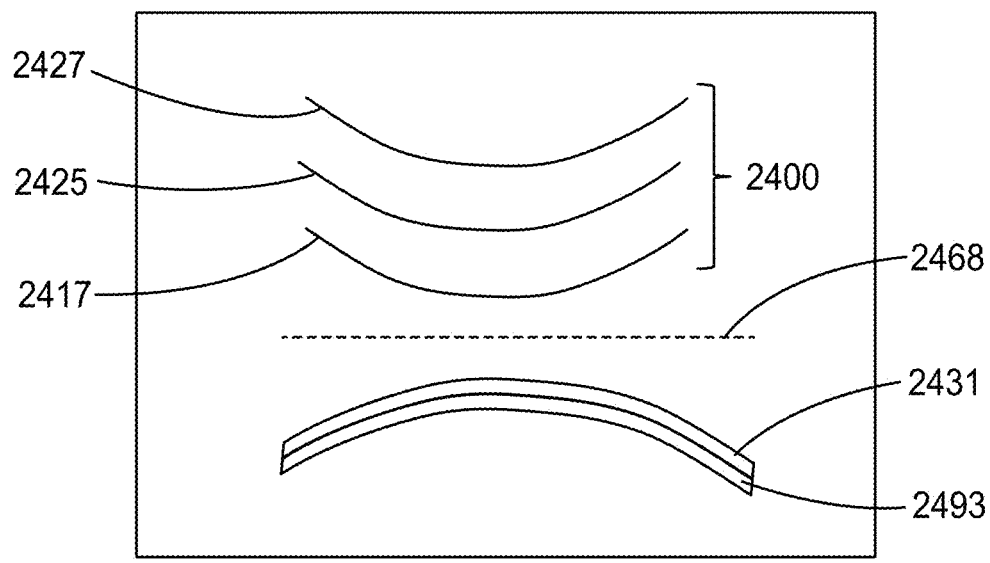

FIG. 24B is a schematic top view of a display device 2490b which includes the optical system 2400 of FIG. 24A. Display device 2490 includes a transparent or semi-transparent display panel 2431 and a shutter 2493. As described elsewhere herein, the transparent or semi-transparent display panel 2431 may be an OLED or an LCD panel, for example, and the shutter 2493 may be a PDLC shutter, for example. The display panel 2431 is illustrated as convex toward the reflective polarizer 2417. In other embodiments, the display panel 2431 may be concave toward the reflective polarizer 2417. In still other embodiments, the display panel 2431 may be flat or substantially flat (and may have a substantially planar image surface). The display panel 2431 (and its image surface) may be curved about two orthogonal axes or may be curved about only one axis. The shutter 2493 may have the same shape or a different shape than the display panel 2431. The shutter 2493 may be curved about two orthogonal axes, or curved about only one axes, or may be substantially flat (substantially planar). The shutter 2493 may be utilized to allow ambient light to enter the optical system 2400 or to block ambient light from entering the optical system 2400. Display device 2490b may include an optional additional polarizer 2468 disposed between the optical system 2400 and the display panel 2431. Optional additional polarizer 2468 may be a linear polarizer and may be a reflective polarizer or an absorbing polarizer. In some embodiments, optional additional polarizer 2468 is not included or may be included as a component of the display panel 2431, for example. The optional additional polarizer 2468 may be substantially flat as illustrated or may be curved about one axis or about two orthogonal axes.

FIG. 24C is a schematic top view of a device 2490c that includes first optical system 2400-1 in an eyepiece portion 2497-1 and includes second optical system 2400-2 in an eyepiece portion 2497-2. Device 2490c may be binoculars or a microscope, for example. First optical system 2400-1 includes a reflective polarizer 2427-1, a partial reflector 2417-1, and a quarter wave retarder 2425-1 disposed between the reflective polarizer 2427-1 and the quarter wave retarder 2425-1. Second optical system 2400-2 includes a reflective polarizer 2427-2, a partial reflector 2417-2, and a quarter wave retarder 2425-2 disposed between the reflective polarizer 2427-2 and the quarter wave retarder 2425-2. The reflective polarizers 2427-1 and 2427-2, the partial reflectors 2417-1 and 2417-2, and the quarter wave retarders 2425-1 and 2425-1 may correspond to any of the reflective polarizers, the partial reflectors or the quarter wave retarders described elsewhere herein. The reflective polarizers 2427-1 and 2427-2 may be curved about orthogonal first and second axes and may be thermoformed into the desired shape. The partial reflectors 2417-1 and 2417-2 may optionally also be curved about orthogonal first and second axes or may be flat as illustrated or curved about only one axis. Similarly, the quarter wave retarders 2425-1 and 2425-2 may be curved about orthogonal first and second axes or may be flat as illustrated or curved about only one axis. The reflective polarizers 2427-1 and 2427-2, the partial reflectors 2417-1 and 2417-2, and the quarter wave retarders 2425-1 and 2425-2 may be disposed on surfaces of one or more lenses as described elsewhere herein.

Device 2490c includes an objective portion 2499-1 and an objective portion 2499-2. The objective portions 2499-1 and 2499-2 are adapted to face an object being viewed and the eyepiece portions are adapted to face a viewer's eyes. An image surface of optical system 2400-1 (and similarly for optical system 2400-2) may be between the partial reflector 2417-1 and the objective portion 2499-1, may be within the objective portion 2499-1 or may be between the eyepiece portion 2497-1 and the objective portion 2499-1. A stop surface of the optical system 2400-1 (and similarly for optical system 2400-2) may be an exit pupil adapted to overlap a pupil of a user.

The objective portion 2499-1 may contain one or more optical lenses 2491-1 and the objective portions 2499-2 may contain one or more optical lenses 2491-2. In alternate embodiments, the eyepiece portion 2497-1 and the objective portion 2499-1 are provided without the eyepiece portion 2497-2 and the objective portion 2499-2 for use as a telescope or microscope.

Figure 25:
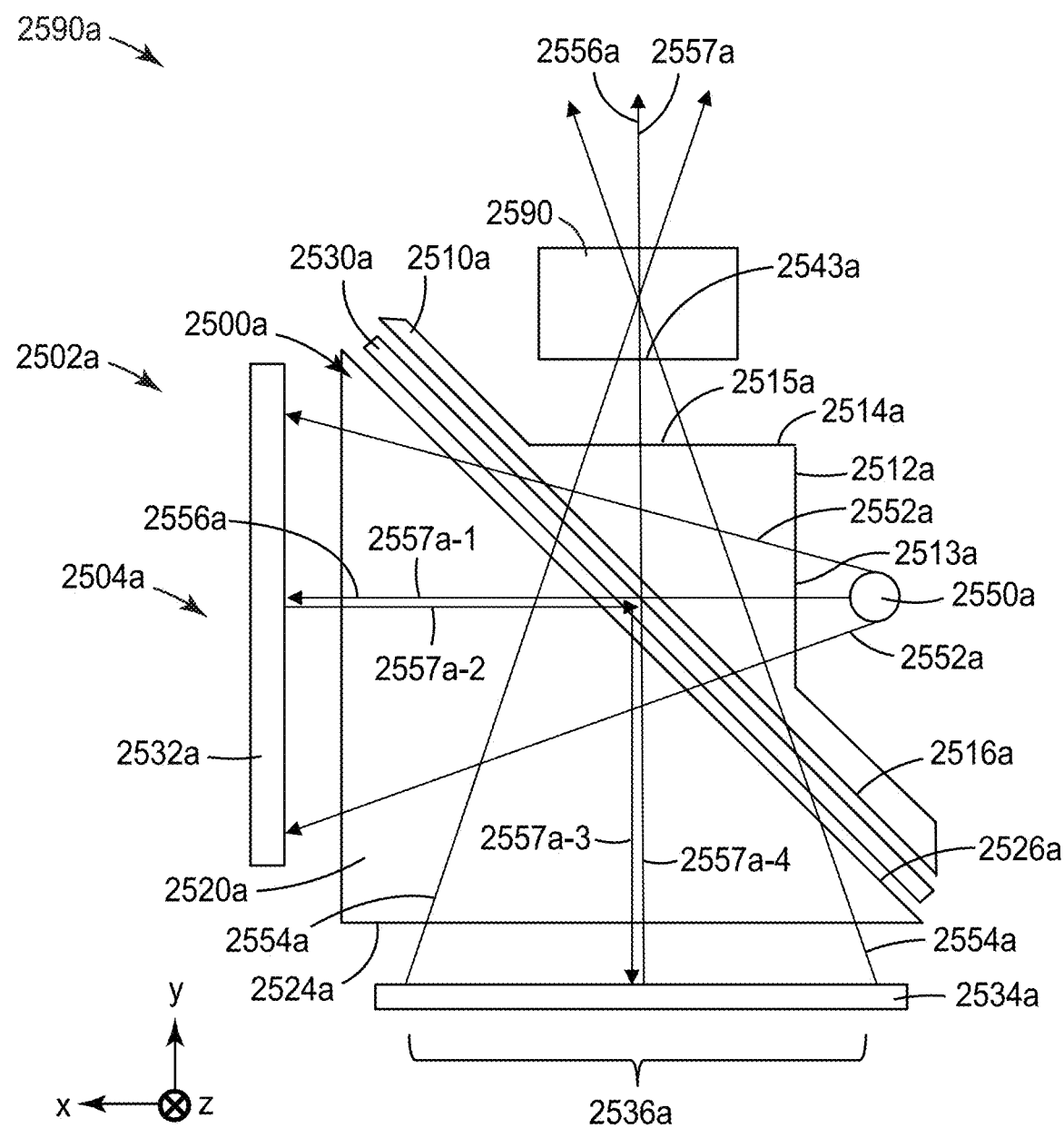
FIG. 25 is a schematic side view of a device including an illuminator and a beam expander.

FIG. 25 is a schematic side view of a device 2590a including device 2590, which may include any of the optical systems described herein, and illuminator 2502a, which includes polarizing beam splitting system 2504a. Device 2590a may be described as an illuminator, for example, and may be a compact projection system, for example. Polarizing beam splitting system 2504a includes polarizing beam splitter 2500a and first and second reflective components 2532a and 2534a. Illuminator 2502a further includes a light source 2550a. Polarizing beam splitter 2500a, which may correspond to polarizing beam splitter 100, includes first and second prisms 2510a and 2520a, and reflective polarizer 2530a. First prism 2510a includes input face 2512a, output face 2514a and first hypotenuse 2516a. Input face 2512a has an input active area 2513a and output face 2514a has an output active area 2515a. Device 2590 has largest acceptance area 2543a. Second prism 2520a has an imager face 2524a and a second hypotenuse 2526a. A reflective polarizer 2530a is disposed between first and second hypotenuses 2516a and 2526a. The light source 2550a produces a light beam having an envelope 2552a and a central light ray 2556a which defines a folded optical axis 2557a having first, second, third and fourth segments, 2557a-1 through 2557a-4. The first reflective component 2532a is disposed adjacent the polarizing beam splitter 2500a opposite light source 2550a and the second reflective component 2534a is disposed adjacent the polarizing beam splitter 2500a opposite device 2590.

In some embodiments, the first prism 2510a has a first volume, the second prism 2520a has a second volume, and the first volume is no greater than about half (or no greater than about 60 percent, or no greater than about 40 percent) of the second volume.

Device 2590 may be a beam expander and may correspond to device 2490. Device 2590 may include a reflective polarizer, a partial reflector and a first quarter wave retarder disposed between the reflective polarizer and the partial reflector. When used as a beam expander, device 2590 may be adapted to receive an input light beam incident on the partial reflector and transmit an expanded output light beam. For example, the input light beam may be converging or collimated and the output light beam may be diverging, or the input light beam may have a first divergence angle and the output light beam may have a greater second divergence angle. The device 2590 may be oriented such that the partial reflector faces the illuminator 2502a. An additional polarizer (e.g., an additional reflective polarizer or an absorbing polarizer) may be disposed between device 2590 and output face 2514a, or may be included in device 2590 proximate the partial reflector opposite the reflective polarizer. Illuminator 2502a may provide a compact illumination system and device 2590 may be used as a beam expander to provide a wider field of view. Other illuminators that can be used with device 2590 are described in U.S. Provisional App. No. 62/186,944 entitled "Illuminator", filed on Jun. 30, 2015, and hereby incorporated herein by reference to the extent that it does not contradict the present description. Device 2590 may be a beam expander including a partial reflector and a reflective polarizer adjacent to and spaced apart from one another, and the beam expander may be adapted to receive converging light incident on the partial reflector and transmit diverging light through the reflective polarizer.

The second reflective component 2534a has a largest active area 2536a. The second reflective component 2534a may be an image forming device and the largest active area 2536a may be a largest image area of the image forming device. Light is emitted (by being reflected, for example) from second reflective component 2534a in envelope 2554a. One or both of the first and second reflective components 2532a and 2534a may have a specular reflectance of greater than 70 percent, or greater than 80 percent, or greater than 90 percent. The first and/or second reflective components 2532a and 2534a may be flat or may be curved in one or more axes.

In some embodiments, second reflective component 2534a is adapted to modulate light incident thereon. For example, second reflective component 2534a may be an image forming device that reflects light having a spatially modulated polarization state. Second reflective component 2534a may be pixelated and may produce a patterned light. Light reflected from second reflective component 2534a in envelope 2554a may be converging patterned light. Suitable image forming devices that can be utilized as second reflective component 2534a include Liquid Crystal on Silicon (LCoS) devices. The LCoS device may be flat or may be curved in one or more axes.

The various components in FIG. 25 are shown spaced apart for clarity of illustration. However, it should be understood that the various components could be in direct contact or attached through an optically clear adhesive, for example. In some embodiments, reflective polarizer 2530a is attached to one or both of first and second prisms 2510a and 2520a using optically clear adhesive layers. In some embodiments, device 2590 is attached to output face 2514a with an optically clear adhesive. In some embodiments, light source 2550a may be immediately adjacent input face 2512a or may be attached to input face 2512a through an optically clear adhesive layer. In some embodiments, first and/or second reflective components 2532a and 2534a may be attached to second prism 2520a with optically clear adhesives. The reflective polarizer 2530a may be any of the reflective polarizers described elsewhere herein. In some embodiments, the reflective polarizer 2530a is a polymeric multilayer reflective polarizer, a wire grid polarizer, a MacNeille reflective polarizer, or a cholesteric reflective polarizer.

Folded optical axis 2557a includes first segment 2557a-1 extending in a first direction (positive x-direction) from the light source 2550a to the first reflective component 2532a, second segment 2557a-2 extending in a second direction (negative x-direction) opposite the first direction, third segment 2557a-3 extending in a third direction (negative y-direction), and fourth segment 2557a-4 extending in a fourth direction (positive y-direction) opposite the third direction. First and second segments 2557a-1 and 2557a-2 are overlapping though they are shown with a small separation in FIG. 25 for ease of illustration. Similarly, third and fourth segments 2557a-3 and 2557a-4 are overlapping though they are shown with a small separation in FIG. 25 for ease of illustration. The first and second directions are substantially orthogonal to the third and fourth directions. The first reflective component 2532a is substantially perpendicular to the first segment 2557a-1 and the second reflective component 2534a is substantially perpendicular to the third segment 2557a-3.

Light source 2550a produces a light beam having envelope 2552a and this defines the input active area 2513a as the area of input face 2512a that is illumined with light from the light source 2550a that is used by the illuminator 2502a. Light source 2550a may either substantially not produce light outside of the envelope 2552a or any light that is produced outside this envelope is at an angle that it escapes from the illuminator without entering device 2590.

At least a portion of the light from light source 2550a is, in sequence, transmitted through the first prism 2510a, transmitted through the reflective polarizer 2530a, transmitted through the second prism 2520a, reflected from the first reflective component 2532a, transmitted back through the second prism 2520a, reflected from the reflective polarizer 2530a, transmitted through the second prism 2520a and is incident on second reflective component 2534a, reflected from second reflective component 2534a, transmitted through second prism 2520a and reflective polarizer 2530a and first prism 2510a, and finally exits the illuminator through device 2590. This is illustrated in FIG. 25 for central light ray 2556a. In some embodiments, first reflective component 2532a includes a polarization rotator, which may be a quarter wave retarder. Light from the light source 2550a that has a polarization along the pass axis of reflective polarizer 2530a will be transmitter through the reflective polarizer 2530a and then reflect from first reflective component 2532a back towards the reflective polarizer 2530a. In embodiments in which first reflective component 2532a includes a quarter wave retarder, such light passes twice through the quarter wave retarder when it reflects back toward the reflective polarizer 2530a. This light then has a polarization substantially orthogonal to the pass axis of the reflective polarizer 2530a and so reflects from the reflective polarizer 2530a toward second reflective component 2534a which may emit (e.g., reflect) spatially modulated light back toward reflective polarizer 2530a. The spatially modulated light may have a polarization that is spatially modulated.

The portion of the spatially modulated light having a polarization along the pass axis of reflective polarizer 2530a will pass through the reflective polarizer 2530a as an imaged light, exit first prism 2510a through output active area 2515a and exit the illuminator through the device 2590.

The illuminator 2502a allows an image to be projected by directing a light beam (in envelope 2552a) through a folded light path illuminator 2502a onto an imaging forming device (second reflective component 2534a), and reflecting a converging patterned light (in envelope 2554a) from the image forming device. The step of directing a light beam through the folded light path illuminator 2502a includes directing light to the first reflective component 2532a through the polarizing beam splitter 2500a, reflecting at least some of the light back towards the polarizing beam splitter 2500a, and reflecting at least some of the light from the polarizing beam splitter 2500a towards the image forming device. At least a portion of the converging patterned light is transmitted through the polarizing beam splitter 2500a and through device 2590.

Light from light source 2550a illuminates a maximum area of second reflective component 2534a after the light is reflected from the first reflective component 2532a and the reflective polarizer 2530a. This maximum area may be equal to the largest active area 2536a. Alternatively, the largest active area 2536a may be a largest area of second reflective component 2534a that is reflective. For example, second reflective component 2534a may be an image forming device that has a largest image area. Any light incident on the image forming device outside the largest image area may not be reflected towards device 2590. In this case, the largest active area 2536a would be the largest image area of the image forming device. The largest active area 2536a defines the output active area 2515a on output face 2514a and largest acceptance area 2543a of device 2590 since light is reflected from the largest active area 2536a towards device 2590 in envelope 2554a which illuminates the output face 2514a substantially only in the output active area 2515a and illuminates the device 2590 substantially only in the largest acceptance area 2543a. Illuminator 2502a is configured such that light in envelope 2554a that is reflected from the second reflective component 2534a and that passes through the device 2590 is convergent between the second reflective component 2534a and the device 2590. This results in a largest active area 2536a that is smaller than the output active area 2515a which is smaller than the largest active area 2536a.

In some embodiments, the input active area 2513a and/or the output active area 2515a are less than about 60 percent, or less than about 50 percent (i.e., less than about half), or less than about 40 percent, or less than about 35 percent of the largest active area 2536a, which may be a largest image area. In some embodiments, the largest surface area of input face 2512a (the total area of input face 2512a) is less than about half the largest image area. In some embodiments, the largest surface area of the output face 2514a (the total area of output face 2514a) is less than about half the largest image area.

Light source 2550a, or any of the light sources of the present description, may include one or more substantially monochromatic light emitting elements. For example, light source 2550a may include red, green and blue light emitting diodes (LEDs). Other colors, such as cyan and yellow may also be included. Alternatively, or in addition, broad spectrum (e.g., white or substantially white) light sources may be utilized. In some embodiments, the light source 2550a includes a blue emitter and a phosphor. In some embodiments, the light source 2550a includes an integrator that may be utilized to combine light from discrete light sources (e.g., the integrator may combine light from red, green and blue LEDs). The light source 2550a may include a polarizing element such that light having substantially a single polarization state is directed into first prism 2510a towards reflective polarizer 2530a. In some embodiments, light source 2550a may be or may include one or more of an LED, an organic light emitting diode (OLED), a laser, a laser diode, an incandescent lighting element, and an arc lamp. Light source 2550a may also include a lens, such as a condenser lens, in addition to lighting emitting element(s) such as LED(s). In some embodiments, the first or second prisms may have one or more curved faces to provide a desired optical power.

The optical systems of the present description may include one or more lenses having a non-uniform edge profile, which may be designed to conform to a face when used as a component of a head-mounted display. The lens(es) may have an edge profile to conform to an average face, to categories of face shapes, or may be designed for individual faces.

Figure 27A:
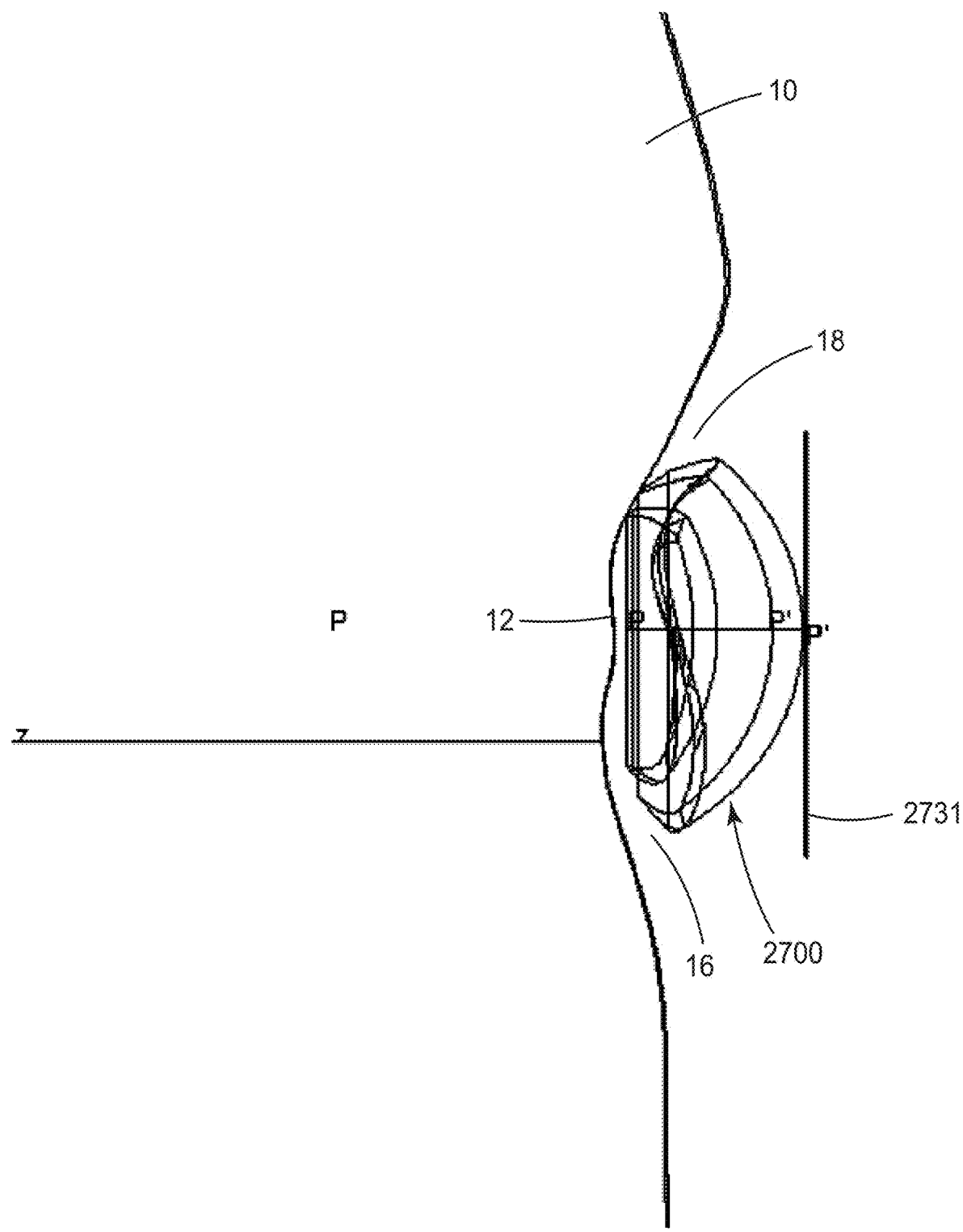
FIG. 27A is a side view of an optical system of a head-mounted display.
Figure 27B:
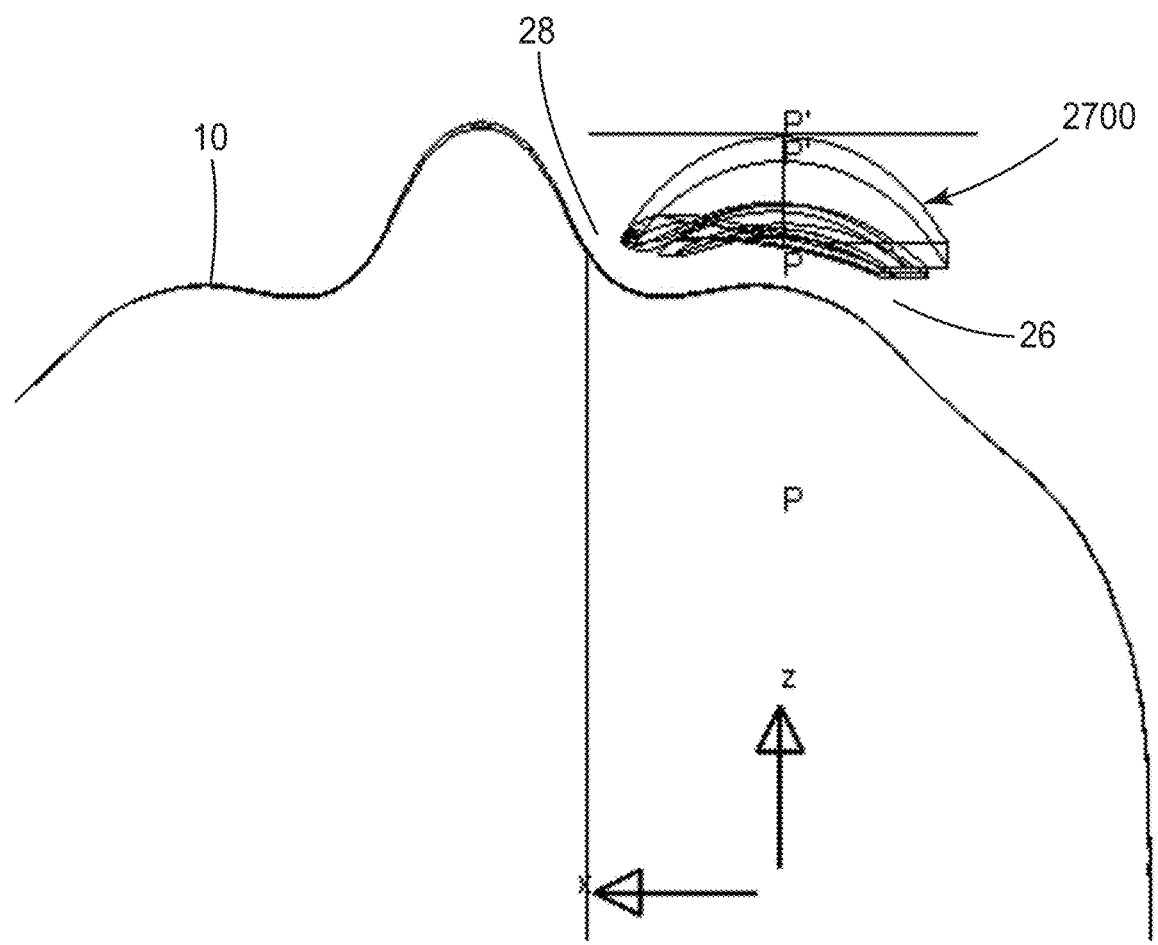
FIGS. 27B-27C are top views of the optical system of FIG. 27A.

FIG. 27A is a perspective view of an optical system 2700 of a head-mounted display positioned on a head 10 with a vertical profile of the head 10 centered on the right eye 12. The lenses of the optical system 2700 providing a gap or relief 18 from the eyebrow and a gap or relief 16 from the cheek. Optical system 2700 includes display panel 2731 and may correspond to any of the optical systems of the present description where a display panel can comprise an image surface of the optical system. FIG. 27B is a top view of the optical system 2700 with the lenses of the optical system 2700 providing a relief 26 from the temple and a relief 28 from the bridge of the nose.

Figure 27C:
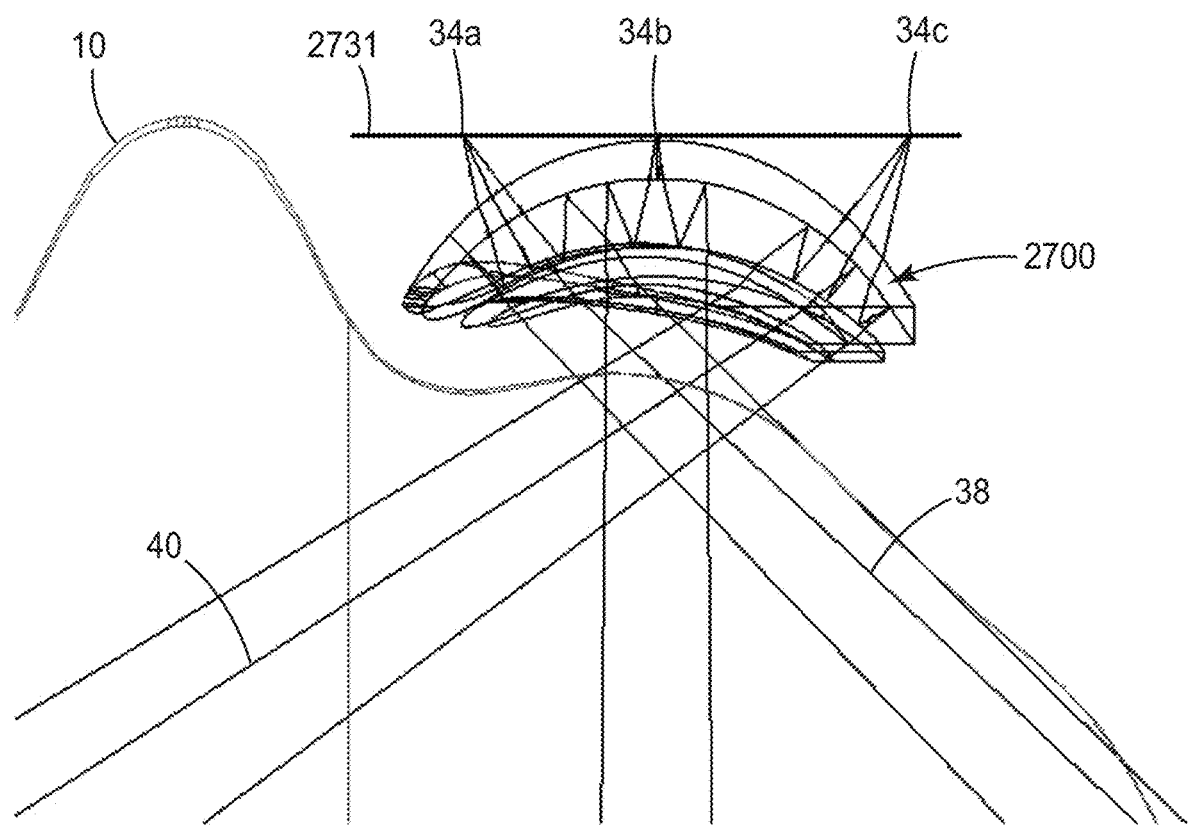

FIG. 27C is another top view of the optical system 2700. A display panel 2731 has pixels 34a, 34b, and 34c emitting light that is focused by the lenses of the optical system into the eye of the head. The chief ray 38 of the light from pixel 34a passes to the eye with an incidence angle of 46 degrees. The greater extent of the relief of the lens assembly 36 from the temple allows the chief ray 40 from pixel 34c to be passed to the eye with a higher incidence angle of 60 degrees.

The reliefs of the lens assembly may be created in the molding of the lenses making up the lens assembly. Alternatively, the lenses may be custom ground for individuals using appropriate measurements of the face. Relief provided for the lens can restrict the area of the display visible to the user. In some embodiments, the relief data is provided to a computer controlling display panel 2731 and the computer may limit the display area to the regions visible to the user in order to reduce power consumption and/or in order to reduce visible artifacts from ghost images, for example.

An advantage of providing a consistent amount of relief of the lens from the face is that ambient light can be effectively blocked with the image while still providing adequate air circulation near the eye. Utilizing extended surfaces of the lens(es) of the optical systems can improve both the field of view and comfort to the user.

EXAMPLES

Example 1

An optical system similar to optical system 200 was modeled. A second quarter wave retarder was disposed on second major surface 216. Each of the surfaces corresponding to surfaces 224, 226, 214 and 216 were taken to be aspheric surfaces described by Equation 1 with each of the polynomial coefficients D, E, F, G, H, I . . . equal to zero. The conic constant k was 0.042435 and the surface radius, $r=1/c$, was −36.82391 mm. Table 1 lists the parameters describing each of these surfaces.

TABLE 1

| Surf. | Type | Radius (mm) | Thickness (mm) | Material | Diameter (mm) | Conic |
|---|---|---|---|---|---|---|
| OBJ | STANDARD | Infinity | Infinity | | 0 | 0 |
| STO | STANDARD | Infinity | 23.8204 | | 15 | 0 |
| 2 | EVENASPH | −36.82391 | 2.19729 | POLYCARB | 46.22652 | 0.04243522 |
| 3 | EVENASPH | −36.82391 | 10.34174 | | 48.50417 | 0.04243522 |
| 4 | EVENASPH | −36.82391 | −10.34174 | MIRROR | 58.17894 | 0.04243522 |
| 5 | EVENASPH | −36.82391 | 10.34174 | MIRROR | 44.64956 | 0.04243522 |
| 6 | EVENASPH | −36.82391 | 2.19729 | E48R | 60 | 0.04243522 |
| 7 | EVENASPH | −36.82391 | 2 | | 62 | 0.04243522 |
| IMA | STANDARD | Infinity | | | 54.72404 | 0 |

The surface numbers in this table count the times that a ray starting from stop surface 235 (Surf. 1) and ending at the image surface 230 (Surf. 8 or IMA) is incident on a surface. Surf. 2 corresponds to first surface 224, Surf. 3 and Surf. 5 correspond to second surface 226, Surf. 4 and Surf 6 correspond to first surface 214, and Surf 7 corresponds to surface 216. The diameter refers to the clear aperture of the surface, EVENASPH refers to even asphere (only even powers of r appear in the expansion in Equation 1), the radius is the inverse of the parameter c in Equation 1, conic is the parameter k in Equation 1, and IMA refers to the image surface 230.

The first optical lens 212 was modeled as Zenon E48R having a refractive index of 1.53 and the second optical lens 222 was modeled as polycarbonate having a refractive index of 1.585. The focal length was 32.26271 mm, the field of view was 90 degrees, the image height was 27.14 mm (the diameter of the image surface 230 was 54.28 mm), the F# was 2.13, the eye relief (distance from stop surface to first lens surface) was 23.8 mm, and the eye box (diameter of the stop surface 235) was 15 mm.

Each chief light ray that was emitted by the image surface and that was transmitted through the stop surface was incident on each of the first optical stack and the second optical stack at an angle of incidence less than about 20 degrees each time the chief light ray was incident on the first or second optical stack.

The optical system had a field of view of 90 degrees at the stop surface. Chief light rays having wavelengths of 486 nm and 656 nm which were transmitted through the image surface and the stop surface had a maximum color separation distance at the stop surface of 3.4 arc minutes which was about 0.12 percent of the field of view at the stop surface.

Example 2

An optical system similar to optical system 200 was modeled. A second quarter wave retarder was disposed on second major surface 216. Each of the surfaces corresponding to surfaces 224, 226, 214 and 216 were taken to be aspheric surfaces described by Equation 1. Tables 2 and 3 list the parameters describing each of these surfaces. The nomenclature in the tables is similar to that in Example 1. The units for the aspheric polynomial coefficients in Table 3 are mm to 1 minus the power of the polynomial.

TABLE 2

| Surf. | Type | Radius (mm) | Thickness (mm) | Material | Diameter (mm) | Conic |
|---|---|---|---|---|---|---|
| OBJ | STANDARD | Infinity | −250 | | 500 | 0 |
| STO | STANDARD | Infinity | 15 | | 6.848 | 0 |
| 2 | EVENASPH | −23.17192 | 2.5 | POLYCARB | 25 | 0 |
| 3 | EVENASPH | −18.85196 | 4.691073 | | 26.56958 | 0.5582269 |
| 4 | EVENASPH | −19.44056 | −4.691073 | MIRROR | 30.63103 | −9.582783 |
| 5 | EVENASPH | −18.85196 | 4.691073 | MIRROR | 24.31869 | 0.5582269 |
| 6 | EVENASPH | −19.44056 | 2 | E48R | 31 | −9.582783 |
| 7 | EVENASPH | −19.44056 | 0.621 | | 31 | −9.582783 |
| 8 | STANDARD | Infinity | 0.281 | PMMA | 28.60935 | 0 |
| 9 | STANDARD | Infinity | 0.01 | | 28.66299 | 0 |
| 10 | STANDARD | Infinity | 0.7 | N-BK7 | 28.66585 | 0 |
| 11 | STANDARD | Infinity | 0 | | 28.79723 | 0 |
| IMA | STANDARD | Infinity | | | 28.79723 | 0 |

TABLE 3

| Polynomial order | Coefficient parameter | Surf. 3, 5 | Surf. 4, 6, 7 |
|---|---|---|---|
| $r^2$ | D | 0.000000E+00 | 0.000000E+00 |
| $r^4$ | E | 1.245489E−05 | −1.462422E−04 |
| $r^6$ | F | 1.393604E−07 | 9.569876E−07 |
| $r^8$ | G | −1.860081E−09 | −6.019644E−09 |
| $r^{10}$ | H | 2.407929E−11 | 2.373262E−11 |
| $r^{12}$ | I | −1.266371E−13 | −5.331213E−14 |
| $r^{14}$ | J | 2.853295E−16 | 4.901801E−17 |

The surface numbers in these tables count the times that a ray starting from stop surface 235 (Surf. 1) and ending at the image surface 230 (Surf. 12 or IMA) is incident on a surface. Surf. 2 corresponds to first surface 224, Surf. 3 and Surf. 5 correspond to second surface 226, Surf. 4 and Surf.

6 correspond to first surface 214, and Surf. 7 corresponds to surface 216. Surfs. 8-11 refer to surface layers disposed on the image surface 230.

The first optical lens 212 was modeled as Zenon E48R having a refractive index of 1.53 and the second optical lens 222 was modeled as polycarbonate having a refractive index of 1.585. The focal length was 17.560 mm, the field of view was 90 degrees, the image height was 14.36 mm (the diameter of the image surface 230 was 28.72 mm), the F# was 2.55, the eye relief was 15 mm, and the eye box (diameter of stop surface 235) was 10.0 mm.

Each chief light ray that was emitted by the image surface and that was transmitted through the stop surface was incident on each of the first optical stack and the second optical stack at an angle of incidence less than about 20 degrees each time the chief light ray was incident on the first or second optical stack.

The optical system had a field of view of 90 degrees at the stop surface. Chief light rays having wavelengths of 486 nm and 656 nm which were transmitted through the image surface and the stop surface had a maximum color separation distance at the stop surface of 10.8 arc minutes which was about 0.38 percent of the field of view at the stop surface.

Example 3

An optical system similar to optical system 600 was modeled. Each of the surfaces corresponding to surfaces 614 and 616 were taken to be aspheric surfaces described by Equation 1. Tables 4 and 5 list the parameters describing each of these surfaces. The nomenclature in the table are similar to that in Examples 1 and 2.

The surface numbers in these tables count the times that a ray starting from stop surface 635 (Surf. 1) and ending at the image surface 630 (Surf. 6 or IMA) is incident on a surface. Surf. 2 and Surf. 4 correspond to first surface 614, and Surf 3 and Surf 5 correspond to second surface 616, The focal length was 35.0 mm, the field of view was 90 degrees, the image height was 33.3 mm (the diameter of the image surface 630 was 66.6 mm), the F# was 2.3, the eye relief was 19.4 mm, and the eye box (diameter of stop surface 635) was 15 mm.

Each chief light ray that was emitted by the image surface and that was transmitted through the stop surface was incident on each of the first optical stack and the second optical stack at an angle of incidence less than about 20 degrees each time the chief light ray was incident on the first or second optical stack.

The optical system had a field of view of 90 degrees at the stop surface. Chief light rays having wavelengths of 486 nm and 656 nm which were transmitted through the image surface and the stop surface had a maximum color separation distance at the stop surface of 29.5 arc minutes which was about 0.9 percent of the field of view at the stop surface.

Example 4

An optical system similar to optical system 800 was modeled. A reflective polarizer was disposed on second major surface 866 of third optical lens 862 and a first quarter wave retarder was disposed on the reflective polarizer. A partial reflector was disposed on first major surface 824 of second optical lens 822 and a second quarter wave retarder was disposed on second major surface 826 of second optical lens 822. Each of the surfaces corresponding to surfaces 864, 866, 824, 826, 814, and 816 were taken to be aspheric surfaces described by Equation 1. Tables 6 and 7 list the parameters describing each of these surfaces. The nomenclature in the tables is similar to that in the previous Examples.

TABLE 4

| Surf. | Type | Radius (mm) | Thickness (mm) | Material | Diameter | Conic |
|---|---|---|---|---|---|---|
| OBJ | STANDARD | Infinity | Infinity | | 0 | 0 |
| STO | STANDARD | Infinity | 19.43519 | | 15 | 0 |
| 2 | EVENASPH | −32.97361 | 6.734839 | POLYCARB | 42.67275 | −0.6680006 |
| 3 | EVENASPH | −32.97361 | −6.734839 | MIRROR | 49.63501 | −0.6680006 |
| 4 | EVENASPH | −32.97361 | 6.734839 | MIRROR | 42.06153 | −0.6680006 |
| 5 | EVENASPH | −32.97361 | 21.79455 | | 46.89222 | −0.6680006 |
| IMA | STANDARD | Infinity | | | 66.72897 | 0 |

TABLE 5

| Polynomial order | Coefficient parameter | Surf. 2, 3, 4, 5 |
|---|---|---|
| r^2 | D | 0 |
| r^4 | E | −2.231952E−06 |
| r^6 | F | −1.907497E−09 |
| r^8 | G | 1.062720E−12 |
| r^10 | H | −5.475949E−15 |
| r^12 | I | 6.686581E−18 |
| r^14 | J | −4.780909E−21 |

TABLE 6

| Surf. | Type | Radius (mm) | Thickness (mm) | Material | Diameter (mm) | Conic |
|---|---|---|---|---|---|---|
| OBJ | STANDARD | Infinity | Infinity | | 0 | 0 |
| STO | STANDARD | Infinity | 11.01475 | | 9 | 0 |
| 2 | EVENASPH | −16.25782 | 2 | POLYCARB | 21.26634 | 0 |
| 3 | EVENASPH | −17.44541 | 2.513635 | | 23.93589 | 0.7369043 |

TABLE 6-continued

| Surf. | Type | Radius (mm) | Thickness (mm) | Material | Diameter (mm) | Conic |
|---|---|---|---|---|---|---|
| 4 | EVENASPH | −16.75009 | −2.513635 | MIRROR | 25.75788 | −0.1016067 |
| 5 | EVENASPH | −17.44541 | 2.513635 | MIRROR | 23.35747 | 0.7369043 |
| 6 | EVENASPH | −16.75009 | 5 | E48R | 24.5425 | −0.1016067 |
| 7 | EVENASPH | −12.77019 | 1 | | 26.71183 | −0.491206 |
| 8 | EVENASPH | −157.2536 | 6 | E48R | 30.82226 | −11.8657 |
| 9 | EVENASPH | −18.4783 | 6.867862 | | 31.77972 | −0.4304748 |
| IMA | STANDARD | Infinity | | | 32.24099 | 0 |

TABLE 7

| Polynomial order | Coefficient parameter | Surf. 3, 5 | Surf. 9 |
|---|---|---|---|
| r^2 | D | 0.000000E+00 | 0.000000E+00 |
| r^4 | E | 3.286842E−05 | 1.398664E−04 |
| r^6 | F | 1.861485E−07 | −5.794668E−07 |
| r^8 | G | −1.944055E−09 | 1.220044E−09 |
| r^10 | H | 1.540250E−11 | −9.383593E−13 |
| r^12 | I | 0.000000E+00 | 0.000000E+00 |
| r^14 | J | 0.000000E+00 | 0.000000E+00 |

The surface numbers in these tables count the times that a ray starting from stop surface 835 (Surf. 1) and ending at the image surface 830 (Surf. 10 or IMA) is incident on a surface. Surf. 2 corresponds to first surface 864, Surf. 3 and Surf. 5 correspond to second surface 866, Surf. 4 and Surf. 6 correspond to first surface 824, Surf. 7 corresponds to surface 266, Surf. 8 corresponds to surface 814, and Surf. 9 corresponds to surface 816.

The focal length was 19.180 mm, the field of view was 82 degrees, the image height was 15.89 mm (the diameter of the image surface 830 was 31.87 mm), the F# was 2.12, the eye relief was 11 mm, and the eye box (diameter of stop surface 835) was 9 mm.

Each chief light ray that was emitted by the image surface and that was transmitted through the stop surface was incident on each of the first optical stack and the second optical stack at an angle of incidence less than about 20 degrees each time the chief light ray was incident on the first or second optical stack.

The optical system had a field of view of 80 degrees at the stop surface. Chief light rays having wavelengths of 486 nm and 656 nm which were transmitted through the image surface and the stop surface had a maximum color separation distance at the stop surface of 14.9 arc minutes which was about 0.52 percent of the field of view at the stop surface.

Example 5

An optical system similar to optical system 200 was modeled. A second quarter wave retarder was disposed on second major surface 216. Each of the surfaces corresponding to surfaces 224, 226, 214 and 216 were taken to be aspheric surfaces described by Equation 1 with each of the polynomial coefficients D, E, F, G, H, I . . . equal to zero. Table 8 lists the parameters describing each of these surfaces with the nomenclature similar to that in previous Examples.

TABLE 8

| Surf. | Type | Radius (mm) | Thickness (mm) | Material | Diameter (mm) | Conic |
|---|---|---|---|---|---|---|
| OBJ | STANDARD | Infinity | Infinity | | 0 | 0 |
| STO | STANDARD | Infinity | 25 | | 15 | 0 |
| 2 | EVENASPH | −40.49115 | 4.85538 | E48R | 49.67147 | 0.7502449 |
| 3 | EVENASPH | −40.49115 | 8.498641 | | 54.28738 | 0.7502449 |
| 4 | EVENASPH | −40.24456 | −8.498641 | MIRROR | 63 | 0.2694101 |
| 5 | EVENASPH | −40.49115 | 8.498641 | MIRROR | 50.62275 | 0.7502449 |
| 6 | EVENASPH | −40.24456 | 5.013904 | POLYCARB | 63 | 0.2694101 |
| 7 | EVENASPH | −31.18185 | 14.48671 | | 67 | −3.575525 |
| IMA | STANDARD | Infinity | | | 102.1176 | 0 |

The surface numbers in this table count the times that a ray starting from stop surface 235 (Surf. 1) and ending at the image surface 230 (Surf. 8 or IMA) is incident on a surface. Surf. 2 corresponds to first surface 224, Surf. 3 and Surf. 5 correspond to second surface 226, Surf. 4 and Surf 6 correspond to first surface 214, and Surf 7 corresponds to surface 216. The diameter refers to the clear aperture of the surface, EVENASPH refers to even asphere (only even powers of r appear in the expansion in Equation 1), the radius is the inverse of the parameter c in Equation 1, conic is the parameter k in Equation 1, and IMA refers to the image surface 230.

The first optical lens 212 was modeled as Zenon E48R having a refractive index of 1.53 and the second optical lens 222 was modeled as polycarbonate having a refractive index of 1.585. The focal length was 42.7 mm, the field of view was 100 degrees, the image height was 50.94 mm (the diameter of the image surface 230 was 101.88 mm), the F# was 3.25, the eye relief was 25 mm, and the eye box (diameter of the stop surface 235) was 15 mm.

Each chief light ray that was emitted by the image surface and that was transmitted through the stop surface was incident on each of the first optical stack and the second optical stack at an angle of incidence less than about 20 degrees each time the chief light ray was incident on the first or second optical stack.

The optical system had a field of view of 100 degrees at the stop surface. Chief light rays having wavelengths of 486 nm and 656 nm which were transmitted through the image surface and the stop surface had a maximum color separation distance at the stop surface of 11.9 arc minutes which was about 0.29 percent of the field of view at the stop surface.

An undistorted image produced at image surface 230 was simulated and the distortion of the image at the stop surface 235 was determined to be less than 1 percent.

Examples 6-8

DBEF (Example 6), APF (Example 7) and APF with a quarter wave retarder coating (Example 8) were thermoformed to give the films a geometry matching to the geometry of an outer surface of a lens. The films were trimmed to fit in an injection molding tool lens cavity and placed on a surface of the lens cavity. The trimmed films had a diameter of 63 mm and a radius of curvature of 87 mm. An injection mold polycarbonate resin was used to form the lens on the film. The films were formed on the side of the lens that would face the stop surface when used in an optical system of the present description. In Example 7, the film was formed on the lens so that when used in an optical system of the present description, the APF would face the stop surface and the quarter wave retarder faced away from the stop surface.

The thermoforming of the films were done in a MAAC sheet feed thermoforming system using vacuum to pull the heated film onto an external surface of a thermoform tool similar to thermoform tool 1681. The external surface was approximately ellipsoidal shaped with the major axis about 1.02 times the minor axis so that the resulting thermoformed film would be rotationally symmetric after cooling and relaxing. The thermoforming process parameters were: Sheet Oven Temperature=320° F.-380° F. (160° C.-193° C.); Forming Time=18 seconds; and Sheet Forming Temperature=330° F.-365° F. (156° C.-185° C.).

Images of the thermoformed DBEF (Example 6) and APF (Example 7) reflective polarizer samples were taken using a non-polarized near-Lambertian light source to emit light through the samples to a camera that included an analyzing polarizer aligned with the block axis of the analyzing polarizer at varying angles from the block axis of the reflective polarizer. At zero degrees both films were substantially transparent and at higher angles, the DBEF showed optical artifacts that were not present in the APF sample. For example, at an angle of 70 degrees, the APF sample was substantially uniformly dark while the DBEF sample showed colored rings. The film insert injection molding process was done in a reciprocating screw horizontal clamp injection molding system built by Krauss-Maffei (Germany). The injection molding tooling used was for a 6 base lens part and a Bayer MAKROLON 3107-550115 polycarbonate resin (available from Bayer MaterialScience LLC, Pittsburgh, Pa.) was used to form the lens. The injection molding process parameters were: Mold Temperature=180° F. (82° C.); Melt Temperature=560° F. (293° C.); Fill Time=1.56 seconds; Hold Time=5.5 seconds; Hold Pressure=11,000 psi (75.8 MPa); Cool Time=15 seconds.

Examples 9-11

Reflective polarizers were thermoformed as generally described in Examples 6-8 into a convex rotationally symmetric shape having a diameter of 50.8 mm and a radius of curvature of 38.6 mm. The reflective polarizers were DBEF (Example 9), APF (Example 10) and a wire grid polarizer (Example 11). The polarizance orientation was measured for each sample using an Axometrics AXOSCAN polarimeter (available from Axometrics, Inc., Huntsville, Ala.). For each sample, an area of the sample centered on the apex of the film and having a 20 mm diameter circular aperture was identified and the maximum variation of a transmission axis of the sample (maximum angular deviation of the transmission axis from a fixed direction minus minimum angular deviation of the transmission axis from the fixed direction) in the aperture was determined. For DBEF, the maximum variation was 1.707 degrees, for APF the maximum variation was 0.751 degrees, and for the wire grid polarizer, the maximum variation was 0.931 degrees. The boundary of the area had a sag of 1.32 mm at a radial distance of 10 mm from a rotational symmetry axis of the samples.

The following is a list of exemplary embodiments.

Embodiment 1 is an optical system, comprising:
an image surface;
a stop surface;
a first optical stack disposed between the image surface and the stop surface and convex toward the image surface along orthogonal first and second axes, the first optical stack comprising:
  a first optical lens; and
  a partial reflector having an average optical reflectance of at least 30% in a desired plurality of wavelengths; and
a second optical stack disposed between the first optical stack and the stop surface and convex toward the image surface along the first and second axes, the second optical stack comprising:
  a second optical lens;
  a multilayer reflective polarizer substantially transmitting light having a first polarization state and substantially reflecting light having an orthogonal second polarization state; and
  a first quarter wave retarder disposed between the reflective polarizer and the first optical stack.

Embodiment 2 is the optical system of embodiment 1, wherein an image source comprises the image surface and the stop surface is an exit pupil.

Embodiment 3 is the optical system of embodiment 2, wherein the image source comprises a display panel.

Embodiment 4 is the optical system of embodiment 3, wherein the display panel is transparent or semi-transparent.

Embodiment 5 is the optical system of any of embodiments 2 to 4, wherein the image source comprises a shutter.

Embodiment 6 is the optical system of embodiment 1, wherein the image source comprises an aperture adapted to receive light reflected from objects external to the optical system.

Embodiment 7 is the optical system of embodiment 1, wherein an image recorder comprises the image surface and the stop surface is an entrance pupil.

Embodiment 8 is the optical system of any of embodiments 1 to 7, wherein the optical system is centered on a folded optical axis defined by an optical path of a central light ray transmitted through the image surface.

Embodiment 9 is the optical system of any of embodiments 1 to 8, wherein the stop surface is adapted to overlap an entrance pupil of a second optical system.

Embodiment 10 is the optical system of embodiment 9, wherein the second optical system is adapted to record images received at the entrance pupil.

Embodiment 11 is the optical system of embodiment 1, wherein the stop surface is adapted to overlap an entrance pupil of a viewer's eye.

Embodiment 12 is the optical system of embodiment 1, wherein an image source comprises the image surface, the image source emitting unpolarized light.

Embodiment 13 is the optical system of any of embodiments 1 to 12, wherein the first optical stack further comprises a second quarter wave retarder disposed between the partial reflector and the image surface.

Embodiment 14 is the optical system of embodiment 1, wherein an image source comprises the image surface, the image source emitting polarized light.

Embodiment 15 is the optical system of embodiment 14, wherein the polarized light is linearly polarized.

Embodiment 16 is the optical system of embodiment 14, wherein the polarized light is circularly polarized.

Embodiment 17 is the optical system of embodiment 14, wherein the polarized light is elliptically polarized.

Embodiment 18 is the optical system of any of embodiments 1 to 17, wherein the partial reflector is a second reflective polarizer.

Embodiment 19 is the optical system of any of embodiments 1 to 18, wherein the partial reflector has an average optical transmittance of at least 30% in the desired plurality of wavelengths.

Embodiment 20 is the optical system of any of embodiments 1 to 19, wherein the desired plurality of wavelengths comprise at least one continuous wavelength range.

Embodiment 21 is the optical system of any of embodiments 1 to 20, wherein the desired plurality of wavelengths comprises a visible range of wavelengths.

Embodiment 22 is the optical system of embodiment 21, wherein the visible range is from 400 nm to 700 nm.

Embodiment 23 is the optical system of any of embodiments 1 to 20, wherein the desired plurality of wavelengths comprises an infrared range of wavelengths.

Embodiment 24 is the optical system of any of embodiments 1 to 20, wherein the desired plurality of wavelengths comprises one or more of infrared, visible and ultraviolet wavelengths.

Embodiment 25 is the optical system of any of embodiments 1 to 21, wherein the partial reflector is a notch reflector.

Embodiment 26 is the optical system of embodiment 25, wherein the desired plurality of wavelengths comprises one or more continuous wavelength ranges, and wherein at least one of the continuous wavelength ranges has a full width at half maximum of no more than 100 nm.

Embodiment 27 is the optical system of embodiment 26, wherein the full width at half maximum is no more than 50 nm.

Embodiment 28 is the optical system of any of embodiments 1 to 27, wherein the multilayer reflective polarizer has at least one first location having a radial distance, r1, from an optical axis passing through an apex of the multilayer reflective polarizer, and a displacement, s1, from a plane perpendicular to the optical axis at the apex, s1/r1 being at least 0.1.

Embodiment 29 is the optical system of embodiment 28, wherein s1/r1 is at least 0.2.

Embodiment 30 is the optical system of embodiment 28, wherein s1/r1 is in a range of 0.2 to 0.8.

Embodiment 31 is the optical system of embodiment 28, wherein s1/r1 is in a range of 0.3 to 0.6.

Embodiment 32 is the optical system of any of embodiments 28 to 31, wherein the multilayer reflective polarizer has a second location having a radial distance, r2, from the optical axis and a displacement, s2, from the plane, s2/r2 being at least 0.3.

Embodiment 33 is the optical system of any of embodiments 1 to 27, wherein the multilayer reflective polarizer has at least one first location having a radial distance, r1, from an optical axis passing through an apex of the multilayer reflective polarizer and a displacement, s1, from a plane perpendicular to the optical axis at the apex, s1/r1 being at least 0.2, and wherein for an area of the reflective polarizer defined by s1 and r1, a maximum variation of a transmission axis of the reflective polarizer is less than about 2 degrees.

Embodiment 34 is the optical system of embodiment 33, wherein the maximum variation of the transmission axis of the reflective polarizer is less than about 1.5 degrees.

Embodiment 35 is the optical system of any of embodiments 1 to 34, wherein a maximum variation of a transmission axis of the reflective polarizer in a reflection aperture of the reflective polarizer is less than about 1.5 degrees.

Embodiment 36 is the optical system of any of embodiments 1 to 34, wherein a maximum variation of a transmission axis of the reflective polarizer in a reflection aperture of the reflective polarizer is less than about 1 degree.

Embodiment 37 is the optical system of any of embodiments 1 to 36, wherein the image surface has a maximum lateral dimension A, the stop surface has a maximum lateral dimension B, and A/B is at least 3.

Embodiment 38 is the optical system of any of embodiments 1 to 37, wherein the first optical lens has a first major surface facing the second optical lens and an opposing second major surface facing the image surface, and the second optical lens has a first major surface facing the stop surface and an opposing second major surface facing the first optical lens.

Embodiment 39 is the optical system of embodiment 38, wherein the partial reflector is disposed on the first or second major surface of the first lens.

Embodiment 40 is the optical system of embodiment 38, wherein the partial reflector is disposed on the first major surface of the first lens and a second quarter wave retarder is disposed on the second major surface of the first lens.

Embodiment 41 is the optical system of embodiment 38, wherein the partial reflector is disposed on the second major surface of the first lens and a second quarter wave retarder is disposed on the partial reflector opposite the second major surface of the first lens.

Embodiment 42 is the optical system of embodiment 38, wherein a second quarter wave retarder is disposed on the first major surface of the first optical lens and the partial reflector is disposed on the second quarter wave retarder opposite the first major surface of the first optical lens.

Embodiment 43 is the optical system of embodiment 38, wherein the first quarter wave retarder is disposed on the second major surface of the second optical lens and the multilayer reflective polarizer is disposed on the first major surface of the second optical lens.

Embodiment 44 is the optical system of embodiment 38, wherein the multilayer reflective polarizer is disposed on the second major surface of the second optical lens and the first quarter wave retarder is disposed on the multilayer reflective polarizer opposite the second major surface of the second optical lens.

Embodiment 45 is the optical system of any of embodiments 1 to 44, wherein the multilayer reflective polarizer comprises at least one layer that is substantially optically biaxial at at least one first location on the at least one layer away from an optical axis of the second optical stack and substantially optically uniaxial at at least one second location away from the optical axis.

Embodiment 46 is the optical system of any of embodiments 1 to 45, wherein the multilayer reflective polarizer is a thermoformed multilayer reflective polarizer substantially rotationally symmetric about an optical axis of the second optical stack.

Embodiment 47 is the optical system of any of embodiments 1 to 46, wherein the multilayer reflective polarizer is a thermoformed multilayer reflective polarizer rotationally symmetric about an optical axis of the second optical stack.

Embodiment 48 is the optical system of any of embodiments 1 to 47, wherein substantially any chief light ray that passes through the image surface and the stop surface is incident on each of the first optical stack and the second optical stack with an angle of incidence less than about 25 degrees.

Embodiment 49 is the optical system of any of embodiments 1 to 48, wherein the first and second optical stacks have a substantially same shape.

Embodiment 50 is the optical system of any of embodiments 1 to 48, wherein the first and second optical stacks have different shapes.

Embodiment 51 is the optical system of any of embodiments 1 to 50, wherein each of the first and second lenses are plano lenses.

Embodiment 52 is the optical system of any of embodiments 1 to 48, wherein the first and second optical lenses have a substantially same shape.

Embodiment 53 is the optical system of any of embodiments 1 to 48, wherein the first and second optical lenses have different shapes.

Embodiment 54 is the optical system of any of embodiments 1 to 53, wherein the image surface is substantially planar.

Embodiment 55 is the optical system of any of embodiments 1 to 53, wherein the image surface is curved.

Embodiment 56 is the optical system of embodiment 1, wherein an image source comprises the image surface, the image source emitting an undistorted image, the partial reflector having a first shape, and the reflective polarizer having a different second shape such that a distortion of the emitted undistorted image transmitted by the stop surface is less than about 10% of a field of view at the stop surface.

Embodiment 57 is the optical system of embodiment 56, wherein the distortion of the emitted undistorted image transmitted by the stop surface is less than 5% of a field of view at the stop surface.

Embodiment 58 is the optical system of embodiment 56, wherein the distortion of the emitted undistorted image transmitted by the stop surface is less than 3% of a field of view at the stop surface.

Embodiment 59 is the optical system of any of embodiments 1 to 58, wherein substantially any chief light ray having at least first and second wavelengths at least 150 nm apart in a visible wavelength range and transmitted through the image surface and the stop surface has a color separation distance at the stop surface of less than 1.5 percent of a field of view at the stop surface.

Embodiment 60 is the optical system of embodiment 59, wherein the color separation distance at the stop surface is less than 1.2 percent of the field of view at the stop surface.

Embodiment 61 is the optical system of any of embodiments 1 to 60, wherein substantially any chief light ray having at least first and second wavelengths at least 150 nm apart in a visible wavelength range and transmitted through the image surface and the stop surface has a color separation distance at the stop surface of less than 20 arc minutes.

Embodiment 62 is the optical system of embodiment 61, wherein the color separation distance at the stop surface is less than 10 arc minutes.

Embodiment 63 is the optical system of any of embodiments 1 to 62, wherein the partial reflector has a first shape, the multilayer reflective polarizer has a second shape, and one or both of the first and second shapes is described by an aspheric polynomial sag equation.

Embodiment 64 is the optical system of any of embodiments 1 to 63, wherein the multilayer reflective polarizer comprises alternating polymeric layers.

Embodiment 65 is the optical system of any of embodiments 1 to 64, wherein the multilayer reflective polarizer is APF.

Embodiment 66 is the optical system of any of embodiments 1 to 64, wherein the multilayer reflective polarizer is thermoformed APF.

Embodiment 67 is the optical system of any of embodiments 1 to 64, wherein the multilayer reflective polarizer comprises a wire grid polarizer.

Embodiment 68 is the optical system of any of embodiments 1 to 67, wherein the multilayer reflective polarizer is rotationally symmetric.

Embodiment 69 is the optical system of any of embodiments 1 to 68, wherein at least one of the first and second optical stacks have an adjustable position relative to the stop and image surfaces.

Embodiment 70 is the optical system of any of embodiments 1 to 69, wherein at least one of the first and second optical stacks have an adjustable shape.

Embodiment 71 is an optical system, comprising:
an image surface;
a stop surface;
a first optical stack disposed between the image surface and the stop surface and comprising:
    a first optical lens;
    a partial reflector having an average optical reflectance of at least 30% in a desired plurality of wavelengths; and
a second optical stack disposed between the first optical stack and the stop surface and comprising:
    a second optical lens;
    a multilayer reflective polarizer comprising at least one layer substantially optically biaxial at at least one first location on the at least one layer away from an optical axis of the second optical stack and substantially optically uniaxial at at least one second location away from the optical axis; and
    a first quarter wave retarder disposed between the reflective polarizer and the first optical stack,
wherein substantially any chief light ray that passes through the image surface and the stop surface is incident on each of the first optical stack and the second optical stack with an angle of incidence less than about 30 degrees.

Embodiment 72 is the optical system of embodiment 71, wherein an image source comprises the image surface and the stop surface is an exit pupil.

Embodiment 73 is the optical system of embodiment 72 wherein the image source comprises a display panel.

Embodiment 74 is the optical system of embodiment 73, wherein the display panel is transparent or semi-transparent.

Embodiment 75 is the optical system of any of embodiments 72 to 74, wherein the image source comprises a shutter.

Embodiment 76 is the optical system of embodiment 71, wherein the image source comprises an aperture adapted to receive light reflected from objects external to the optical system.

Embodiment 77 is the optical system of embodiment 71, wherein an image recorder comprises the image surface and the stop surface is an entrance pupil.

Embodiment 78 is the optical system of any of embodiments 71 to 77, wherein the optical system is centered on a folded optical axis defined by an optical path of a central light ray transmitted through the image surface.

Embodiment 79 is the optical system of any of embodiments 71 to 78, wherein the stop surface is adapted to overlap an entrance pupil of a second optical system.

Embodiment 80 is the optical system of embodiment 79, wherein the second optical system is adapted to record images received at the entrance pupil.

Embodiment 81 is the optical system of embodiment 71, wherein the stop surface is adapted to overlap an entrance pupil of a viewer's eye.

Embodiment 82 is the optical system of embodiment 71, wherein an image source comprises the image surface, the image source emitting unpolarized light.

Embodiment 83 is the optical system of any of embodiments 71 to 82, wherein the first optical stack further comprises a second quarter wave retarder disposed between the partial reflector and the image surface.

Embodiment 84 is the optical system of embodiment 71, wherein an image source comprises the image surface, the image source emitting polarized light.

Embodiment 85 is the optical system of embodiment 84, wherein the polarized light is linearly polarized.

Embodiment 86 is the optical system of embodiment 84, wherein the polarized light is circularly polarized.

Embodiment 87 is the optical system of embodiment 84, wherein the polarized light is elliptically polarized.

Embodiment 88 is the optical system of any of embodiments 71 to 87, wherein the partial reflector is a second reflective polarizer.

Embodiment 89 is the optical system of any of embodiments 71 to 88, wherein the partial reflector has an average optical transmittance of at least 30% in the desired plurality of wavelengths.

Embodiment 90 is the optical system of any of embodiments 71 to 89, wherein the desired plurality of wavelengths comprise at least one continuous wavelength range.

Embodiment 91 is the optical system of any of embodiments 71 to 90, wherein the desired plurality of wavelengths comprises a visible range of wavelengths.

Embodiment 92 is the optical system of embodiment 91, wherein the visible range is from 400 nm to 700 nm.

Embodiment 93 is the optical system of any of embodiments 71 to 92, wherein the desired plurality of wavelengths comprises an infrared range of wavelengths.

Embodiment 94 is the optical system of any of embodiments 71 to 93, wherein the desired plurality of wavelengths comprises one or more of infrared, visible and ultraviolet wavelengths.

Embodiment 95 is the optical system of any of embodiments 71 to 91, wherein the partial reflector is a notch reflector.

Embodiment 96 is the optical system of embodiment 95, wherein the desired plurality of wavelengths comprises one or more continuous wavelength ranges, and wherein at least one of the continuous wavelength ranges has a full width at half maximum of no more than 100 nm.

Embodiment 97 is the optical system of embodiment 96, wherein the full width at half maximum is no more than 50 nm.

Embodiment 98 is the optical system of any of embodiments 71 to 97, wherein the multilayer reflective polarizer has at least one first location having a radial distance, r1, from an optical axis passing through an apex of the multilayer reflective polarizer, and a displacement, s1, from a plane perpendicular to the optical axis at the apex, s1/r1 being at least 0.1.

Embodiment 99 is the optical system of embodiment 98, wherein s1/r1 is at least 0.2.

Embodiment 100 is the optical system of embodiment 98, wherein s1/r1 is in a range of 0.2 to 0.8.

Embodiment 101 is the optical system of embodiment 98, wherein s1/r1 is in a range of 0.3 to 0.6.

Embodiment 102 is the optical system of any of embodiments 98 to 101, wherein the multilayer reflective polarizer has a second location having a radial distance, r2, from the optical axis and a displacement, s2, from the plane, s2/r2 being at least 0.3.

Embodiment 103 is the optical system of any of embodiments 71 to 97, wherein the multilayer reflective polarizer has at least one first location on the film having a radial distance, r1, from an optical axis passing through an apex of the multilayer reflective polarizer and a displacement, s1, from a plane perpendicular to the optical axis at the apex, s1/r1 being at least 0.2, and wherein for an area of the reflective polarizer defined by s1 and r1, a maximum variation of a transmission axis of the reflective polarizer is less than about 2 degrees.

Embodiment 104 is the optical system of embodiment 103, wherein the maximum variation of the transmission axis of the reflective polarizer is less than about 1.5 degrees.

Embodiment 105 is the optical system of any of embodiments 71 to 104, wherein a maximum variation of a transmission axis of the reflective polarizer in a reflection aperture of the reflective polarizer is less than about 1.5 degrees.

Embodiment 106 is the optical system of any of embodiments 71 to 104, wherein a maximum variation of a transmission axis of the reflective polarizer in a reflection aperture of the reflective polarizer is less than about 1 degree.

Embodiment 107 is the optical system of any of embodiments 71 to 106, wherein the first optical lens has a first major surface facing the second optical lens and an opposing second major surface facing the image surface, and the second optical lens has a first major surface facing the stop surface and an opposing second major surface facing the first optical lens.

Embodiment 108 is the optical system of embodiment 107, wherein the partial reflector is disposed on the first or second major surface of the first lens.

Embodiment 109 is the optical system of embodiment 108, wherein the partial reflector is disposed on the first major surface of the first lens and a second quarter wave retarder is disposed on the second major surface of the first lens.

Embodiment 110 is the optical system of embodiment 108, wherein the partial reflector is disposed on the second major surface of the first lens and a second quarter wave retarder is disposed on the partial reflector opposite the second major surface of the first lens.

Embodiment 111 is the optical system of embodiment 107, wherein a second quarter wave retarder is disposed on the first major surface of the first optical lens and the partial reflector is disposed on the second quarter wave retarder opposite the first major surface of the first optical lens.

Embodiment 112 is the optical system of embodiment 107, wherein the first quarter wave retarder is disposed on the second major surface of the second optical lens and the multilayer reflective polarizer is disposed on the first major surface of the second optical lens.

Embodiment 113 is the optical system of embodiment 107, wherein the multilayer reflective polarizer is disposed on the second major surface of the second optical lens and the first quarter wave retarder is disposed on the multilayer reflective polarizer opposite the second major surface of the second optical lens.

Embodiment 114 is the optical system of any of embodiments 71 to 113, wherein the image surface has a maximum lateral dimension A, the stop surface has a maximum lateral dimension B, and A/B is at least 3.

Embodiment 115 is the optical system of any of embodiments 71 to 114, wherein the multilayer reflective polarizer is a thermoformed multilayer reflective polarizer substantially rotationally symmetric about an optical axis of the second optical stack.

Embodiment 116 is the optical system of any of embodiments 71 to 115, wherein the multilayer reflective polarizer is a thermoformed multilayer reflective polarizer rotationally symmetric about an optical axis of the second optical stack.

Embodiment 117 is the optical system of any of embodiments 71 to 116, wherein one or both of the first and second optical stacks is convex toward the image surface along orthogonal first and second axes.

Embodiment 118 is the optical system of embodiment 117, wherein both the first and second optical stacks are convex toward the image surface along the first and second axes.

Embodiment 119 is the optical system of any of embodiments 71 to 118, wherein the multilayer reflective polarizer is convex toward the image surface along orthogonal first and second axes.

Embodiment 120 is the optical system of any of embodiments 71 to 119, wherein the first and second optical stacks have a substantially same shape.

Embodiment 121 is the optical system of any of embodiments 71 to 119, wherein the first and second optical stacks have different shapes.

Embodiment 122 is the optical system of any of embodiments 71 to 121, wherein each of the first and second lenses are plano lenses.

Embodiment 123 is the optical system of any of embodiments 71 to 119, wherein the first and second optical lenses have a substantially same shape.

Embodiment 124 is the optical system of any of embodiments 71 to 119, wherein the first and second optical lenses have different shapes.

Embodiment 125 is the optical system of any of embodiments 71 to 124, wherein the image surface is substantially planar.

Embodiment 126 is the optical system of any of embodiments 71 to 124, wherein the image surface is curved.

Embodiment 127 is the optical system of any of embodiments 71 to 126, wherein substantially any chief light ray that passes through the image surface and the stop surface is incident on each of the first optical stack and the second optical stack with an angle of incidence less than about 25 degrees.

Embodiment 128 is the optical system of embodiment 71, wherein an image source comprises the image surface, the image source emitting an undistorted image, the partial reflector having a first shape, and the reflective polarizer having a different second shape such that a distortion of the emitted undistorted image transmitted by the stop surface is less than about 10% of a field of view at the stop surface.

Embodiment 129 is the optical system of embodiment 128, wherein the distortion of the emitted undistorted image transmitted by the stop surface is less than 5% of a field of view at the stop surface.

Embodiment 130 is the optical system of embodiment 128, wherein the distortion of the emitted undistorted image transmitted by the stop surface is less than 3% of a field of view at the stop surface.

Embodiment 131 is the optical system of any of embodiments 71 to 130, wherein substantially any chief light ray having at least first and second wavelengths at least 150 nm apart in a visible wavelength range and transmitted through the image surface and the stop surface has a color separation distance at the stop surface of less than 1.5 percent of a field of view at the stop surface.

Embodiment 132 is the optical system of embodiment 131, wherein the color separation distance at the stop surface is less than 1.2 percent of the field of view at the stop surface.

Embodiment 133 is the optical system of any of embodiments 71 to 132, wherein substantially any chief light ray having at least first and second wavelengths at least 150 nm apart in a visible wavelength range and transmitted through the image surface and the stop surface has a color separation distance at the stop surface of less than 20 arc minutes.

Embodiment 134 is the optical system of embodiment 133, wherein the color separation distance at the stop surface is less than 10 arc minutes.

Embodiment 135 is the optical system of any of embodiments 71 to 134, wherein the partial reflector has a first shape, the multilayer reflective polarizer has a second shape, and one or both of the first and second shapes is described by an aspheric polynomial sag equation.

Embodiment 136 is the optical system of any of embodiments 71 to 135, wherein the multilayer reflective polarizer comprises alternating polymeric layers.

Embodiment 137 is the optical system of any of embodiments 71 to 136, wherein the multilayer reflective polarizer is thermoformed APF.

Embodiment 138 is the optical system of any of embodiments 71 to 136, wherein the multilayer reflective polarizer comprises a wire grid polarizer.

Embodiment 139 is the optical system of any of embodiments 71 to 138, wherein the multilayer reflective polarizer is rotationally symmetric.

Embodiment 140 is the optical system of any of embodiments 71 to 139, wherein at least one of the first and second optical stacks have a user-adjustable position relative to the stop and image surfaces.

Embodiment 141 is the optical system of any of embodiments 71 to 140, wherein at least one of the first and second optical stacks have a user-adjustable shape.

Embodiment 142 is an optical system, comprising:
an image source emitting an undistorted image;
an exit pupil;
a partial reflector having a first shape convex toward the image source along orthogonal first and second axes and having an average optical reflectance of at least 30% in a pre-determined plurality of wavelengths; and
a reflective polarizer having a different second shape convex toward the image source along the first and second axes, such that a distortion of the emitted undistorted image transmitted by the exit pupil is less than about 10%.

Embodiment 143 is the optical system of embodiment 142, wherein the distortion of the emitted undistorted image transmitted by the exit pupil is less than about 5%.

Embodiment 144 is the optical system of embodiment 142, wherein the distortion of the emitted undistorted image transmitted by the exit pupil is less than about 3%.

Embodiment 145 is the optical system of any of embodiments 142 to 144, wherein an integral optical stack disposed between the image source and the exit pupil comprises a first optical lens, a first quarter wave retarder, the partial reflector and the reflective polarizer.

Embodiment 146 is the optical system of embodiment 145, wherein the first quarter wave retarder is disposed on a first major surface of the first optical lens facing the image source, and the partial reflector is disposed on the quarter wave retarder opposite the first optical lens.

Embodiment 147 is the optical system of embodiment 145, wherein the partial reflector is disposed on a first major surface of the first optical lens facing the image source.

Embodiment 148 is the optical system of embodiment 147, wherein the first quarter wave retarder is disposed on a second major surface of the first optical lens opposite the first major surface.

Embodiment 149 is the optical system of embodiment 147, wherein the reflective polarizer is disposed on the first quarter wave retarder opposite the first optical lens.

Embodiment 150 is the optical system of any of embodiments 145 to 149, wherein the integral optical stack further comprises a second quarter wave retarder.

Embodiment 151 is the optical system of embodiment 150, wherein the second quarter wave retarder is disposed on a major surface of the partial reflector facing the image source.

Embodiment 152 is the optical system of any of embodiments 142 to 151, wherein substantially any chief light ray having at least first and second wavelengths at least 150 nm apart in the pre-determined plurality of wavelengths and emitted by the image source and transmitted by the exit pupil has a color separation distance at the exit pupil of less than 1.5 percent of a field of view at the exit pupil.

Embodiment 153 is the optical system of any of embodiments 142 to 152, wherein substantially any chief light ray having at least first and second wavelengths at least 150 nm apart in the pre-determined plurality of wavelengths and emitted by the image source and transmitted by the exit pupil has a color separation distance at the exit pupil of less than 20 arc minutes.

Embodiment 154 is an optical system, comprising:
an image source;
an exit pupil;
a first optical stack disposed between the image source and the exit pupil and comprising:
  a first optical lens;
  a partial reflector having an average optical reflectance of at least 30% in a pre-determined plurality of wavelengths; and
a second optical stack disposed between the first optical stack and the exit pupil and comprising:
  a second optical lens;
  a multilayer reflective polarizer; and
  a first quarter wave retarder disposed between the reflective polarizer and the first optical stack,
wherein substantially any chief light ray having at least first and second wavelengths at least 150 nm apart in the pre-determined plurality of wavelengths and emitted by the image source and transmitted by the exit pupil has a color separation distance at the exit pupil of less than 1.5 percent of a field of view at the exit pupil, and wherein the multilayer reflective polarizer is convex about two orthogonal axes.

Embodiment 155 is the optical system of embodiment 154, wherein the color separation distance at the exit pupil is less than 1.2 percent of the field of view at the exit pupil.

Embodiment 156 is the optical system of embodiment 154 or 155, wherein the color separation distance at the exit pupil is less than 20 arc minutes.

Embodiment 157 is the optical system of any of embodiments 154 to 155, wherein the color separation distance at the exit pupil is less than 10 arc minutes.

Embodiment 158 is an optical system, comprising:
an image source;
an exit pupil;
a first optical stack disposed between the image source and the exit pupil and comprising:
  a first optical lens;
  a partial reflector having an average optical reflectance of at least 30% in a pre-determined plurality of wavelengths; and
a second optical stack disposed between the first optical stack and the exit pupil and comprising:
  a second optical lens;
  a multilayer reflective polarizer; and
  a first quarter wave retarder disposed between the reflective polarizer and the first optical stack,
wherein substantially any chief light ray having at least first and second wavelengths at least 150 nm apart in the pre-determined plurality of wavelengths and emitted by the image source and transmitted by the exit pupil has a color separation distance at the exit pupil of less than 20 arc minutes, and wherein the multilayer reflective polarizer is convex about two orthogonal axes.

Embodiment 159 is the optical system of embodiment 158, wherein the color separation distance at the exit pupil is less than 10 arc minutes.

Embodiment 160 is the optical system of embodiment 158 or 159, wherein the color separation distance at the exit pupil is less than 1.5 percent of a field of view at the exit pupil.

Embodiment 161 is the optical system of any of embodiments 158 to 160, wherein the color separation distance at the exit pupil is less than 1.2 percent of a field of view at the exit pupil.

Embodiment 162 is the optical system of any of embodiments 154 to 160, wherein at least one of the first and second optical stacks have an adjustable position relative to the stop and image surfaces.

Embodiment 163 is the optical system of any of embodiments 154 to 162, wherein at least one of the first and second optical stacks have an adjustable shape.

Embodiment 164 is the optical system of any of embodiments 154 to 163, wherein the first optical stack in convex toward the image source along orthogonal first and second axes.

Embodiment 165 is the optical system of any of embodiments 154 to 164, wherein the second optical stack in convex toward the image source along orthogonal first and second axes.

Embodiment 166 is the optical system of any of embodiments 142 to 165, wherein the image source has a maximum lateral dimension A, the exit pupil has a maximum lateral dimension B, and A/B is at least 3.

Embodiment 167 is the optical system of any of embodiments 142 to 166, wherein at least one chief light ray from the image source passes through the exit pupil at an incident angle of at least 40 degrees.

Embodiment 168 is the optical system of any of embodiments 142 to 167, wherein the optical system is centered on a folded optical axis defined by an optical path of a central light emitted by the image source.

Embodiment 169 is the optical system of any of embodiments 142 to 168, wherein the exit pupil is adapted to overlap an entrance pupil of a second optical system.

Embodiment 170 is the optical system of embodiment 169, wherein the second optical system is adapted to record images received at the entrance pupil.

Embodiment 171 is the optical system of any of embodiments 142 to 169, wherein the exit pupil is adapted to overlap an entrance pupil of a viewer's eye.

Embodiment 172 is the optical system any of embodiments 142 to 171, wherein the image source emits unpolarized light.

Embodiment 173 is the optical system of any of embodiments 142 to 171, wherein the image source emits polarized light.

Embodiment 174 is the optical system of embodiment 173, wherein the polarized light is linearly polarized.

Embodiment 175 is the optical system of embodiment 173, wherein the polarized light is circularly polarized.

Embodiment 176 is the optical system of embodiment 173, wherein the polarized light is elliptically polarized.

Embodiment 177 is the optical system of any of embodiments 142 to 176, wherein the partial reflector is a second reflective polarizer.

Embodiment 178 is the optical system of any of embodiments 142 to 177, wherein the partial reflector has an average optical transmittance of at least 30% in the pre-determined plurality of wavelengths.

Embodiment 179 is the optical system of any of embodiments 142 to 178, wherein the pre-determined plurality of wavelengths comprise one or more pre-determined wavelength ranges.

Embodiment 180 is the optical system of any of embodiments 142 to 179, wherein the wherein the pre-determined plurality of wavelengths comprise a visible range.

Embodiment 181 is the optical system of embodiment 180, wherein the visible range is from 400 nm to 700 nm.

Embodiment 182 is the optical system of any of embodiments 142 to 179, wherein the pre-determined plurality of wavelengths comprise an infrared range.

Embodiment 183 is the optical system of any of embodiments 142 to 179, wherein the pre-determined plurality of wavelengths comprises one or more of infrared, visible and ultraviolet wavelengths.

Embodiment 184 is the optical system of any of embodiments 142 to 180, wherein the partial reflector is a notch reflector.

Embodiment 185 is the optical system of embodiment 184, wherein the pre-determined plurality of wavelengths comprises at least one wavelength range having a full width at half maximum of no more than 100 nm.

Embodiment 186 is the optical system of embodiment 184, wherein the pre-determined plurality of wavelengths comprises at least one wavelength range having a full width at half maximum of no more than 50 nm.

Embodiment 187 is the optical system any of embodiments 142 to 186, wherein the reflective polarizer has at least one first location having a radial distance, r1, from an optical axis passing through an apex of the multilayer reflective polarizer, and a displacement, s1, from a plane perpendicular to the optical axis at the apex, s1/r1 being at least 0.1.

Embodiment 188 is the optical system of embodiment 187, wherein s1/r1 is at least 0.2.

Embodiment 189 is the optical system of embodiment 187, wherein s1/r1 is in a range of 0.2 to 0.8.

Embodiment 190 is the optical system of embodiment 187, wherein s1/r1 is in a range of 0.3 to 0.6.

Embodiment 191 is the optical system of any of embodiments 187 to 190, wherein the multilayer reflective polarizer has a second location having a radial distance, r2, from the optical axis and a displacement, s2, from the plane, s2/r2 being at least 0.3.

Embodiment 192 is the optical system of any of embodiments 142 to 186, wherein the multilayer reflective polarizer has at least one first location having a radial distance, r1, from an optical axis passing through an apex of the reflective polarizer and a displacement, s1, from a plane perpendicular to the optical axis at the apex, s1/r1 being at least 0.2, and wherein for an area of the reflective polarizer defined by s1 and r1, a maximum variation of a transmission axis of the reflective polarizer is less than about 2 degrees.

Embodiment 193 is the optical system of embodiment 192, wherein the maximum variation of the transmission axis of the reflective polarizer is less than about 1.5 degrees.

Embodiment 194 is the optical system of any of embodiments 142 to 193, wherein a maximum variation of a transmission axis of the reflective polarizer in a reflection aperture of the reflective polarizer is less than about 1.5 degrees.

Embodiment 195 is the optical system of any of embodiments 142 to 193, wherein a maximum variation of a transmission axis of the reflective polarizer in a reflection aperture of the reflective polarizer is less than about 1 degree.

Embodiment 196 is the optical system of any of embodiments 142 to 195, wherein the reflective polarizer comprises at least one layer that is substantially optically biaxial at at least one first location on the at least one layer away from an optical axis of the second optical stack and substantially optically uniaxial at at least one second location away from the optical axis.

Embodiment 197 is the optical system of any of embodiments 142 to 196, wherein the reflective polarizer is a thermoformed multilayer reflective polarizer substantially rotationally symmetric about an optical axis of the reflective polarizer.

Embodiment 198 is the optical system of any of embodiments 142 to 197, wherein the reflective polarizer is a thermoformed multilayer reflective polarizer rotationally symmetric about an optical axis of the reflective polarizer.

Embodiment 199 is the optical system of any of embodiments 142 to 198, wherein substantially any chief light ray that is emitted by the image source and that is transmitted through the exit pupil is incident on each of the reflective polarizer and the partial reflector with an angle of incidence less than about 25 degrees.

Embodiment 200 is the optical system of any of embodiments 142 to 202, wherein the partial reflector has a first shape, the reflective polarizer has a second shape, and one or both of the first and second shapes is described by an aspheric polynomial sag equation.

Embodiment 201 is the optical system of any of embodiments 142 to 200, wherein the reflective polarizer comprises alternating polymeric layers.

Embodiment 202 is the optical system of any of embodiments 142 to 201, wherein the reflective polarizer is thermoformed APF.

Embodiment 203 is the optical system of any of embodiments 142 to 201, wherein the reflective polarizer comprises a wire grid polarizer.

Embodiment 204 is the optical system of any of embodiments 142 to 203, wherein the reflective polarizer is rotationally symmetric.

Embodiment 205 is the optical system of any of embodiments 142 to 204, wherein the image source comprises a display panel.

Embodiment 206 is the optical system of embodiment 205, wherein the display panel is transparent or semi-transparent.

Embodiment 207 is the optical system of embodiment 204 or 205, wherein the image source comprises a shutter.

Embodiment 208 is an optical system, comprising:
an image surface having a maximum lateral dimension A;
a stop surface having a maximum lateral dimension B, A/B being at least 3;
an integral optical stack disposed between the image surface and the stop surface and comprising:
  a first optical lens;
  a partial reflector having an average optical reflectance of at least 30% in a pre-determined plurality of wavelengths;
  a multilayer reflective polarizer substantially transmitting light having a first polarization state and substantially reflecting light having an orthogonal second polarization state; and
  a first quarter wave retarder at at least one wavelength in the pre-determined plurality of wavelengths, wherein at least one chief light ray transmitted through the stop surface and the image surface passes through the stop surface at an incident angle of at least 40 degrees.

Embodiment 209 is the optical system of embodiment 208, wherein the integral optical stack is convex toward the image surface along orthogonal first and second axes.

Embodiment 210 is the optical system of any of embodiments 208 to 209, wherein substantially any chief light ray having at least first and second wavelengths at least 150 nm apart in a visible wavelength range and transmitted through the image surface and the stop surface has a color separation distance at the stop surface of less than 1.5 percent of a field of view at the stop surface.

Embodiment 211 is the optical system of any of embodiments 208 to 210, wherein the color separation distance at the stop surface is less than 1.2 percent of the field of view at the stop surface.

Embodiment 212 is the optical system of any of embodiments 208 to 211, wherein substantially any chief light ray having at least first and second wavelengths at least 150 nm apart in a visible wavelength range and transmitted through the image surface and the stop surface has a color separation distance at the stop surface of less than 20 arc minutes.

Embodiment 213 is the optical system of any of embodiments 208 to 212, wherein the color separation distance at the stop surface is less than 10 arc minutes.

Embodiment 214 is the optical system of any of embodiments 208 to 213, wherein an image source comprises the image surface and the stop surface is an exit pupil.

Embodiment 215 is the optical system of embodiment 214, wherein the image source comprises a display panel.

Embodiment 216 is the optical system of embodiment 215, wherein the display panel is transparent or semi-transparent.

Embodiment 217 is the optical system of any of embodiments 214 to 216, wherein the image source comprises a shutter.

Embodiment 218 is the optical system of embodiment 208, wherein the image source comprises an aperture adapted to receive light reflected from objects external to the optical system.

Embodiment 219 is the optical system of any of embodiments 208 to 213, wherein an image recorder comprises the image surface and the stop surface is an entrance pupil.

Embodiment 220 is the optical system of any of embodiments 208 to 219, wherein the optical system is centered on a folded optical axis defined by an optical path of a central light ray transmitted through the image surface.

Embodiment 221 is the optical system of embodiment 208, wherein the stop surface is adapted to overlap an entrance pupil of a second optical system.

Embodiment 222 is the optical system of embodiment 221, wherein the second optical system is adapted to record images received at the entrance pupil.

Embodiment 223 is the optical system of embodiment 208, wherein the stop surface is adapted to overlap an entrance pupil of a viewer's eye.

Embodiment 224 is the optical system of embodiment 208, wherein an image source comprises the image surface, the image source emitting unpolarized light.

Embodiment 225 is the optical system of any of embodiments 208 to 224 further comprising a second quarter wave retarder at at least one wavelength in the pre-determined plurality of wavelengths, the second quarter wave retarder disposed between the partial reflector and the image surface, the first quarter wave retarder disposed between the multilayer reflective polarizer and the partial reflector.

Embodiment 226 is the optical system of embodiment 208, wherein an image source comprises the image surface, the image source emitting polarized light.

Embodiment 227 is the optical system of embodiment 226, wherein the polarized light is linearly polarized.

Embodiment 228 is the optical system of embodiment 226, wherein the polarized light is circularly polarized.

Embodiment 229 is the optical system of embodiment 226, wherein the polarized light is elliptically polarized.

Embodiment 230 is the optical system of any of embodiments 208 to 229, wherein the partial reflector is a second reflective polarizer.

Embodiment 231 is the optical system of any of embodiments 208 to 230, wherein the partial reflector has an average optical transmittance of at least 30% in the pre-determined plurality of wavelengths.

Embodiment 232 is the optical system of any of embodiments 208 to 231, wherein the pre-determined plurality of wavelengths comprise at least one continuous wavelength range.

Embodiment 233 is the optical system of any of embodiments 208 to 232, wherein the pre-determined plurality of wavelengths comprises a visible range of wavelengths.

Embodiment 234 is the optical system of embodiment 233, wherein the visible range is from 400 nm to 700 nm.

Embodiment 235 is the optical system of any of embodiments 208 to 234, wherein the pre-determined plurality of wavelengths comprises an infrared range of wavelengths.

Embodiment 236 is the optical system of any of embodiments 208 to 235, wherein the pre-determined plurality of wavelengths comprises one or more of infrared, visible and ultraviolet wavelengths.

Embodiment 237 is the optical system of any of embodiments 208 to 236, wherein the partial reflector is a notch reflector.

Embodiment 238 is the optical system of embodiment 237, wherein the pre-determined plurality of wavelengths comprises one or more continuous wavelength ranges, and wherein at least one of the continuous wavelength ranges has a full width at half maximum of no more than 100 nm.

Embodiment 239 is the optical system of embodiment 238, wherein the full width at half maximum is no more than 50 nm.

Embodiment 240 is the optical system of any of embodiments 208 to 239, wherein the multilayer reflective polarizer has at least one first location having a radial distance, r1, from an optical axis passing through an apex of the multilayer reflective polarizer, and a displacement, s1, from a plane perpendicular to the optical axis at the apex, s1/r1 being at least 0.1.

Embodiment 241 is the optical system of embodiment 240, wherein s1/r1 is at least 0.2.

Embodiment 242 is the optical system of embodiment 240, wherein s1/r1 is in a range of 0.2 to 0.8.

Embodiment 243 is the optical system of embodiment 240, wherein s1/r1 is in a range of 0.3 to 0.6.

Embodiment 244 is the optical system of embodiment 240, wherein the multilayer reflective polarizer has a second location having a radial distance, r2, from the optical axis and a displacement, s2, from the plane, s2/r2 being at least 0.3.

Embodiment 245 is the optical system of any of embodiments 208 to 244, wherein the multilayer reflective polarizer has at least one first location having a radial distance, r1, from an optical axis passing through an apex of the multilayer reflective polarizer and a displacement, s1, from a plane perpendicular to the optical axis at the apex, s1/r1 being at least 0.2, and wherein for an area of the reflective polarizer defined by s1 and r1, a maximum variation of a transmission axis of the reflective polarizer is less than about 2 degrees.

Embodiment 246 is the optical system of embodiment 245, wherein the maximum variation of the transmission axis of the reflective polarizer is less than about 1.5 degrees.

Embodiment 247 is the optical system of any of embodiments 208 to 246, wherein a maximum variation of a transmission axis of the reflective polarizer in a reflection aperture of the reflective polarizer is less than about 1.5 degrees.

Embodiment 248 is the optical system of any of embodiments 209 to 246, wherein a maximum variation of a transmission axis of the reflective polarizer in a reflection aperture of the reflective polarizer is less than about 1 degree.

Embodiment 249 is the optical system of any of embodiments 208 to 248, wherein the multilayer reflective polarizer comprises at least one layer that is substantially optically biaxial at at least one first location on the at least one layer away from an optical axis of the second optical stack and substantially optically uniaxial at at least one second location away from the optical axis.

Embodiment 250 is the optical system of any of embodiments 208 to 249, wherein the multilayer reflective polarizer is a thermoformed multilayer reflective polarizer substantially rotationally symmetric about an optical axis of the second optical stack.

Embodiment 251 is the optical system of any of embodiments 208 to 250, wherein the multilayer reflective polarizer is a thermoformed multilayer reflective polarizer rotationally symmetric about an optical axis of the second optical stack.

Embodiment 252 is the optical system of any of embodiments 208 to 251, wherein substantially any chief light ray that passes through the image surface and the stop surface is incident on each of the partial reflector, the multilayer reflective polarizer, and the first quarter wave retarder with an angle of incidence less than about 25 degrees.

Embodiment 253 is the optical system of embodiment 208, wherein an image source comprises the image surface, the image source emitting an undistorted image, the partial reflector having a first shape, and the reflective polarizer having a different second shape such that a distortion of the emitted undistorted image transmitted by the stop surface is less than about 10% of a field of view at the stop surface.

Embodiment 254 is the optical system of embodiment 253, wherein the distortion of the emitted undistorted image transmitted by the stop surface is less than about 5% of a field of view at the stop surface.

Embodiment 255 is the optical system of embodiment 253, wherein the distortion of the emitted undistorted image transmitted by the stop surface is less than about 3% of a field of view at the stop surface.

Embodiment 256 is the optical system of any of embodiments 208 to 255, wherein the partial reflector has a first shape, the multilayer reflective polarizer has a second shape, and one or both of the first and second shapes is described by an aspheric polynomial sag equation.

Embodiment 257 is the optical system of any of embodiments 208 to 256, wherein the multilayer reflective polarizer comprises alternating polymeric layers.

Embodiment 258 is the optical system of any of embodiments 208 to 257, wherein the multilayer reflective polarizer is thermoformed APF.

Embodiment 259 is the optical system of any of embodiments 208 to 257, wherein the multilayer reflective polarizer comprises a wire grid polarizer.

Embodiment 260 is the optical system of any of embodiments 208 to 259, wherein the multilayer reflective polarizer is rotationally symmetric.

Embodiment 261 is the optical system of any of embodiments 208 to 260, wherein the integral optical stack comprises a second optical lens.

Embodiment 262 is the optical system of embodiment 261, wherein the first quarter wave retarder is disposed between the first and second optical lenses.

Embodiment 263 is the optical system of embodiment 261 or 262, wherein the multilayer reflective polarizer is disposed on a major surface of second optical lens facing the stop surface and the partial reflector is disposed on a major surface of the first optical lens facing the image surface.

Embodiment 264 is an optical system, comprising:
an image surface;
a substantially planar stop surface; and
disposed between the image surface and the stop surface:
first, second and third optical lenses;
a partial reflector having an average optical reflectance of at least 30% in a pre-determined plurality of wavelengths;
a multilayer reflective polarizer substantially transmitting light having a first polarization state and substantially reflecting light having an orthogonal second polarization state; and
a first quarter wave retarder at at least one wavelength in the pre-determined plurality of wavelengths,
wherein the optical system comprises a plurality of major surfaces disposed between the image surface and the stop surface, each major surface convex toward the image surface along orthogonal first and second axes, wherein at least six different major surfaces have six different convexities.

Embodiment 265 is the optical system of embodiment 264, wherein the plurality of major surfaces includes opposing first and second major surfaces of the first optical lens, opposing first and second major surfaces of the second optical lens, and opposing first and second major surfaces of the third optical lens, each first major surface facing the stop surface and each second major surface facing the image surface.

Embodiment 266 is the optical system of embodiment 265, wherein the second optical lens is disposed between the first and third optical lenses, and the third optical lens is disposed between the stop surface and the first optical lens.

Embodiment 267 is the optical system of embodiment 266, wherein the partial reflector is disposed on the first major surface of the second optical lens.

Embodiment 268 is the optical system of embodiment 266 or 267, wherein the multilayer reflective polarizer is disposed on the second major surface of the third optical lens.

Embodiment 269 is the optical system of embodiment 268, wherein the first quarter wave retarder is disposed on the multilayer reflective polarizer.

Embodiment 270 is the optical system of any of embodiments 266 to 269, further comprising a second quarter wave retarder at at least one wavelength in the pre-determined plurality of wavelengths, the second quarter wave retarder disposed on the second major surface of the second optical lens.

Embodiment 271 is the optical system of embodiment 265, wherein the reflective polarizer is disposed on the first major surface of the third optical lens and the first quarter wave retarder is disposed on the second major surface of the third optical lens.

Embodiment 272 is the optical system of embodiment 271, wherein the partial reflector is disposed on the first or second major surface of the second optical lens.

Embodiment 273 is the optical system of any of embodiments 264 to 272, wherein an image source comprises the image surface and the stop surface is an exit pupil.

Embodiment 274 is the optical system of embodiment 273, wherein the image source comprises a display panel.

Embodiment 275 is the optical system of embodiment 274, wherein the display panel is substantially transparent.

Embodiment 276 is the optical system of any of embodiments 273 to 275, wherein the image source comprises a shutter.

Embodiment 277 is the optical system of any of embodiments 264 to 272, wherein an image recorder comprises the image surface and the stop surface is an entrance pupil.

Embodiment 278 is the optical system of any of embodiments 264 to 277, wherein the optical system is centered on a folded optical axis defined by an optical path of a central light ray transmitted through the image surface.

Embodiment 279 is the optical system of any of embodiments 264 to 278, wherein the stop surface is adapted to overlap an entrance pupil of a second optical system.

Embodiment 280 is the optical system of embodiment 279, wherein the second optical system is adapted to record images received at the entrance pupil.

Embodiment 281 is the optical system of any of embodiments 264 to 272, wherein the stop surface is adapted to overlap an entrance pupil of a viewer's eye.

Embodiment 282 is the optical system of any of embodiments 264 to 272, wherein an image source comprises the image surface, the image source emitting unpolarized light.

Embodiment 283 is the optical system of any of embodiments 264 to 269, wherein the optical stack system further comprises a second quarter wave retarder at at least one wavelength in the pre-determined plurality of wavelengths, the second quarter wave retarder disposed between the partial reflector and the image surface, the first quarter wave retarder disposed between the multilayer reflective polarizer and the partial reflector.

Embodiment 284 is the optical system of any of embodiments 264 to 272, wherein an image source comprises the image surface, the image source emitting polarized light.

Embodiment 285 is the optical system of embodiment 284, wherein the polarized light is linearly polarized.

Embodiment 286 is the optical system of embodiment 284, wherein the polarized light is circularly polarized.

Embodiment 287 is the optical system of embodiment 284, wherein the polarized light is elliptically polarized.

Embodiment 288 is the optical system of any of embodiments 264 to 287, wherein the partial reflector is a second reflective polarizer.

Embodiment 289 is the optical system of any of embodiments 264 to 288, wherein the partial reflector has an average optical transmittance of at least 30% in the pre-determined plurality of wavelengths.

Embodiment 290 is the optical system of any of embodiments 264 to 289, wherein the pre-determined plurality of wavelengths comprise at least one continuous wavelength range.

Embodiment 291 is the optical system of any of embodiments 264 to 290, wherein the pre-determined plurality of wavelengths comprises a visible range of wavelengths.

Embodiment 292 is the optical system of embodiment 291, wherein the visible range is from 400 nm to 700 nm.

Embodiment 293 is the optical system of any of embodiments 264 to 292, wherein the pre-determined plurality of wavelengths comprises an infrared range of wavelengths.

Embodiment 294 is the optical system of any of embodiments 264 to 293, wherein the pre-determined plurality of wavelengths comprises one or more of infrared, visible and ultraviolet wavelengths.

Embodiment 295 is the optical system of any of embodiments 264 to 294, wherein the partial reflector is a notch reflector.

Embodiment 296 is the optical system of embodiment 295, wherein the pre-determined plurality of wavelengths comprises one or more continuous wavelength ranges, and wherein at least one of the continuous wavelength ranges has a full width at half maximum of no more than 100 nm.

Embodiment 297 is the optical system of embodiment 296, wherein the full width at half maximum is no more than 50 nm.

Embodiment 298 is the optical system of any of embodiments 264 to 297, wherein the multilayer reflective polarizer has at least one first location having a radial distance, r1, from an optical axis passing through an apex of the multilayer reflective polarizer, and a displacement, s1, from a plane perpendicular to the optical axis at the apex, s1/r1 being at least 0.1.

Embodiment 299 is the optical system of embodiment 298, wherein s1/r1 is at least 0.2.

Embodiment 300 is the optical system of embodiment 298, wherein s1/r1 is in a range of 0.2 to 0.8.

Embodiment 301 is the optical system of embodiment 298, wherein s1/r1 is in a range of 0.3 to 0.6.

Embodiment 302 is the optical system of any of embodiments 298 to 301, wherein the multilayer reflective polarizer has a second location having a radial distance, r2, from the optical axis and a displacement, s2, from the plane, s2/r2 being at least 0.3.

Embodiment 303 is the optical system of any of embodiments 264 to 297, wherein the multilayer reflective polarizer has at least one first location having a radial distance, r1, from an optical axis passing through an apex of the multilayer reflective polarizer and a displacement, s1, from a plane perpendicular to the optical axis at the apex, s1/r1 being at least 0.2, and wherein for an area of the reflective polarizer defined by s1 and r1, a maximum variation of a transmission axis of the reflective polarizer is less than about 2 degrees.

Embodiment 304 is the optical system of embodiment 303, wherein the maximum variation of the transmission axis of the reflective polarizer is less than about 1.5 degrees.

Embodiment 305 is the optical system of any of embodiments 264 to 304, wherein a maximum variation of a transmission axis of the reflective polarizer in a reflection aperture of the reflective polarizer is less than about 1.5 degrees.

Embodiment 306 is the optical system of any of embodiments 264 to 304, wherein a maximum variation of a transmission axis of the reflective polarizer in a reflection aperture of the reflective polarizer is less than about 1 degree.

Embodiment 307 is the optical system of any of embodiments 264 to 306, wherein the multilayer reflective polarizer comprises at least one layer that is substantially optically biaxial at at least one first location on the at least one layer away from an optical axis of the second optical stack and substantially optically uniaxial at at least one second location away from the optical axis.

Embodiment 308 is the optical system of any of embodiments 264 to 307, wherein the multilayer reflective polarizer is a thermoformed multilayer reflective polarizer substantially rotationally symmetric about an optical axis of the second optical stack.

Embodiment 309 is the optical system of any of embodiments 264 to 308, wherein the multilayer reflective polarizer is a thermoformed multilayer reflective polarizer rotationally symmetric about an optical axis of the second optical stack.

Embodiment 310 is the optical system of any of embodiments 264 to 309, wherein substantially any chief light ray that passes through the image surface and the stop surface is incident on each of the partial reflector, the multilayer reflective polarizer, and the first quarter wave retarder with an angle of incidence less than about 25 degrees.

Embodiment 311 is the optical system of any of embodiments 264 to 272, wherein an image source comprises the image surface, the image source emitting an undistorted image, the partial reflector having a first shape, and the reflective polarizer having a different second shape such that a distortion of the emitted undistorted image transmitted by the stop surface is less than about 10% of a field of view at the stop surface.

Embodiment 312 is the optical system of embodiment 311, wherein the distortion of the emitted undistorted image transmitted by the stop surface is less than about 5% of a field of view at the stop surface.

Embodiment 313 is the optical system of embodiment 311, wherein the distortion of the emitted undistorted image transmitted by the stop surface is less than about 3% of a field of view at the stop surface.

Embodiment 314 is the optical system of any of embodiments 264 to 313, wherein substantially any chief light ray having at least first and second wavelengths at least 150 nm apart in a visible wavelength range and emitted by the image surface and transmitted by the stop surface has a color separation distance at the stop surface of less than 1.5 percent of a field of view at the stop surface.

Embodiment 315 is the optical system of embodiment 314, wherein the color separation distance at the stop surface is less than 1.2 percent of the field of view at the stop surface.

Embodiment 316 is the optical system of any of embodiments 264 to 315, wherein substantially any chief light ray having at least first and second wavelengths at least 150 nm apart in a visible wavelength range and transmitted through the image surface and the stop surface has a color separation distance at the stop surface of less than 20 arc minutes.

Embodiment 317 is the optical system of embodiment 316, wherein the color separation distance at the stop surface is less than 10 arc minutes.

Embodiment 318 is the optical system of any of embodiments 264 to 249, wherein the partial reflector has a first shape, the multilayer reflective polarizer has a second shape, and one or both of the first and second shapes is described by an aspheric polynomial sag equation.

Embodiment 319 is the optical system of any of embodiments 264 to 318, wherein the multilayer reflective polarizer comprises alternating polymeric layers.

Embodiment 320 is the optical system of any of embodiments 264 to 319, wherein the multilayer reflective polarizer is thermoformed APF.

Embodiment 321 is the optical system of any of embodiments 264 to 319, wherein the multilayer reflective polarizer comprises a wire grid polarizer.

Embodiment 322 is the optical system of any of embodiments 264 to 321, wherein the multilayer reflective polarizer is rotationally symmetric.

Embodiment 323 is the optical system of any of embodiments 264 to 322, wherein at least one of the first, second and third optical lenses have a user-adjustable position relative to the stop and image surfaces.

Embodiment 324 is the optical system of any of embodiments 264 to 323, wherein at least one of the first, second and third optical lenses have a user-adjustable shape.

Embodiment 325 is the optical system of any of embodiments 264 to 324 wherein the image surface is substantially planar.

Embodiment 326 is the optical system of any of embodiments 264 to 324, wherein the image surface is curved.

Embodiment 327 is the optical system of any of embodiments 1 to 326, having a contrast ratio at the stop surface of at least 40 over a field of view of the optical system.

Embodiment 328 is the optical system of any of embodiments 1 to 327, having a contrast ratio at the stop surface of at least 50 over a field of view of the optical system.

Embodiment 329 is the optical system of any of embodiments 1 to 328, having a contrast ratio at the stop surface of at least 60 over a field of view of the optical system.

Embodiment 330 is the optical system of any of embodiments 1 to 329, having a contrast ratio at the stop surface of at least 80 over a field of view of the optical system.

Embodiment 331 is the optical system of any of embodiments 1 to 330, having a contrast ratio at the stop surface of at least 100 over a field of view of the optical system.

Embodiment 332 is the optical system of any of embodiments 1 to 333, wherein at least one lens has a non-uniform edge profile.

Embodiment 333 is the optical system of embodiment 332, wherein the edge profile comprises a shape adapted to conform to a face when the optical system is used in a head-mounted display.

Embodiment 334 is a thermoformed multilayer reflective polarizer substantially rotationally symmetric about an optical axis passing thorough an apex of the thermoformed multilayer reflective polarizer and convex along orthogonal first and second axes orthogonal to the optical axis, the thermoformed multilayer reflective polarizer having:

at least one inner layer substantially optically uniaxial at at least one first location away from the apex; and at least one first location on the reflective polarizer having a radial distance, r1, from the optical axis and a displacement, s1, from a plane perpendicular to the optical axis at the apex, s1/r1 being at least 0.2.

Embodiment 335 is the thermoformed multilayer reflective polarizer of embodiment 334, wherein for an area of the reflective polarizer defined by s1 and r1, a maximum variation of a transmission axis of the reflective polarizer is less than about 2 degrees.

Embodiment 336 is the optical system of embodiment 335, wherein the maximum variation of the transmission axis of the reflective polarizer is less than about 1.5 degrees.

Embodiment 337 is the optical system of any of embodiments 334 to 336, wherein a maximum variation of a transmission axis of the reflective polarizer in a reflection aperture of the reflective polarizer is less than about 1.5 degrees.

Embodiment 338 is the optical system of any of embodiments 334 to 336, wherein a maximum variation of a transmission axis of the reflective polarizer in a reflection aperture of the reflective polarizer is less than about 1 degree.

Embodiment 339 is the thermoformed multilayer reflective polarizer of any of embodiments 334 to 338, wherein the at least one inner layer is substantially optically biaxial at at least one second location on the at least one layer away from the apex.

Embodiment 340 is a thermoformed multilayer reflective polarizer substantially rotationally symmetric about an optical axis passing thorough an apex of the thermoformed multilayer reflective polarizer and convex along orthogonal first and second axes orthogonal to the optical axis, the thermoformed multilayer reflective polarizer having:

at least one first location on the reflective polarizer having a radial distance, r1, from the optical axis and a displacement, s1, from a plane perpendicular to the optical axis at the apex, s1/r1 being at least 0.2, wherein for an area of the reflective polarizer defined by s1 and r1, a maximum variation of a transmission axis of the reflective polarizer is less than about 2 degrees.

Embodiment 341 is the thermoformed multilayer reflective polarizer of embodiment 340, wherein the maximum variation of the transmission axis of the reflective polarizer is less than about 1.5 degrees.

Embodiment 342 is the thermoformed multilayer reflective polarizer of embodiment 340 or 341 comprising at least one layer that is substantially optically biaxial at at least one first location on the at least one layer away from an optical axis of the reflective polarizer and substantially optically uniaxial at at least one second location away from the optical axis.

Embodiment 343 is the thermoformed multilayer reflective polarizer of any of embodiments 334 to 342, wherein s1/r1 is less than about 0.8.

Embodiment 344 is the thermoformed multilayer reflective polarizer of any of embodiments 334 to 343, wherein the reflective polarizer has a second location having a radial distance, r2, from the optical axis and a displacement, s2, from the plane, s2/r2 being at least 0.3.

Embodiment 345 is the thermoformed multilayer reflective polarizer of any of embodiments 334 to 344, wherein an azimuthal variation in s1/r1 is less than 10 percent.

Embodiment 346 is the thermoformed multilayer reflective polarizer of any of embodiments 334 to 344, wherein an azimuthal variation in s1/r1 is less than 8 percent.

Embodiment 347 is the thermoformed multilayer reflective polarizer of any of embodiments 334 to 344, wherein an azimuthal variation in s1/r1 is less than 6 percent.

Embodiment 348 is the thermoformed multilayer reflective polarizer of any of embodiments 334 to 344, wherein an azimuthal variation in s1/r1 is less than 4 percent.

Embodiment 349 is the thermoformed multilayer reflective polarizer of any of embodiments 334 to 344, wherein an azimuthal variation in s1/r1 is less than 2 percent.

Embodiment 350 is the thermoformed multilayer reflective polarizer of any of embodiments 334 to 344, wherein an azimuthal variation in s1/r1 is less than 1 percent.

Embodiment 351 is the thermoformed multilayer reflective polarizer of any of embodiments 334 to 350 comprising alternating polymeric layers.

Embodiment 352 is the thermoformed multilayer reflective polarizer of any of embodiments 334 to 351 being thermoformed APF.

Embodiment 353 is the thermoformed multilayer reflective polarizer of any of embodiments 334 to 351 comprising a wire grid polarizer.

Embodiment 354 is a lens having a surface curved about two orthogonal directions, and comprising the thermoformed multilayer reflective polarizer of any of embodiments 334 to 353 disposed on the surface.

Embodiment 355 is an optical stack comprising:
a first lens;
a second lens adjacent the first lens;
a quarter wave retarder disposed between the first and second lenses;
a reflective polarizer disposed on the second lens opposite the first lens; and
a partial reflector disposed on the first lens opposite the second lens,
wherein the reflective polarizer is curved about two orthogonal axes, and wherein the optical stack is an integral optical stack.

Embodiment 356 is the optical sack of embodiment 355, wherein the first lens comprises a first material and the second lens comprises a second material.

Embodiment 357 is the optical stack of embodiment 356, wherein the first and second materials are the same.

Embodiment 358 is the optical stack of embodiment 356, wherein the first and second materials are different.

Embodiment 359 is the optical stack of embodiment 355, wherein at least one of the first and second materials is a polymer.

Embodiment 360 is the optical stack of embodiment 359, wherein the first material is a first polymer and the second material is a second polymer.

Embodiment 361 is the optical stack of embodiment 360, wherein the first and second polymers are different.

Embodiment 362 is the optical stack of any one of embodiments 355, or 356, or 358 to 361, wherein the first and second lenses have different Abbe numbers.

Embodiment 363 is the optical stack of embodiment 362, wherein a difference in the Abbe numbers of the first and second lenses is in a range of 5 to 50.

Embodiment 364 is the optical stack of any of embodiments 355 to 363, wherein one of the first and second lenses has an Abbe number greater than 45 and the other of the first and second lenses has an Abbe number less than 45.

Embodiment 365 is the optical stack of any of embodiments 355 to 364, wherein one of the first and second lenses has an Abbe number greater than 50 and the other of the first and second lenses has an Abbe number less than 40.

Embodiment 366 is the optical stack of any of embodiments 355 to 365, wherein the reflective polarizer is the thermoformed multilayer reflective polarizer of any of embodiments 334 to 353.

Embodiment 367 is the optical stack of any of embodiments 355 to 366, wherein the partial reflector has an average an average optical reflectance of at least 30% in a desired plurality of wavelengths.

Embodiment 368 is the optical stack of any of embodiments 355 to 367, wherein the partial reflector has an average an average optical transmittance of at least 30% in a desired plurality of wavelengths.

Embodiment 369 is the optical stack of any of embodiments 355 to 368, wherein the partial reflector is a reflective polarizer.

Embodiment 370 is the optical stack of any of embodiments 355 to 369, wherein the desired plurality of wavelengths comprise at least one continuous wavelength range.

Embodiment 371 is the optical stack of any of embodiments 355 to 370, wherein the desired plurality of wavelengths comprises a visible range of wavelengths.

Embodiment 372 is the optical stack of embodiment 371, wherein the visible range is from 400 nm to 700 nm.

Embodiment 373 is the optical stack of any of embodiments 355 to 372, wherein the desired plurality of wavelengths comprises an infrared range of wavelengths.

Embodiment 374 is the optical stack of any of embodiments 355 to 373, wherein the desired plurality of wavelengths comprises one or more of infrared, visible and ultraviolet wavelengths.

Embodiment 375 is the optical stack of any of embodiments 355 to 374, wherein the partial reflector is a notch reflector.

Embodiment 376 is the optical stack of any of embodiments 355 to 375, wherein the desired plurality of wavelengths comprises one or more continuous wavelength ranges, and wherein at least one of the continuous wavelength ranges has a full width at half maximum of no more than 100 nm.

Embodiment 377 is the optical stack of any of embodiments 355 to 376, wherein the full width at half maximum is no more than 50 nm.

Embodiment 378 is an optical system comprising an image surface, a stop surface, and the optical stack of any of embodiments 355 to 376 disposed between the image surface and the stop surface.

Embodiment 379 is an optical system comprising an image surface, a stop surface, and the thermoformed multilayer reflective polarizer of any of embodiments 334 to 353 disposed between the image surface and the stop surface.

Embodiment 380 is the optical system of embodiment 379 further comprising:
a quarter wave retarder disposed between the image surface and the reflective polarizer; and a partial reflector disposed between the image surface and the quarter wave retarder.

Embodiment 381 is the optical system of any of embodiments 1 to 333, wherein the reflective polarizer is a thermoformed multilayer reflective polarizer according to any of embodiments 334 to 353.

Embodiment 382 is a method of making an optical stack, comprising:
providing a thermoform tool centered on a tool axis and having an external surface rotationally asymmetric about the tool axis;
heating an optical film resulting in a softened optical film;
conforming the softened optical film to the external surface while stretching the softened film along at least orthogonal first and second directions away from the tool axis resulting in a conformed optical film rotationally asymmetric about an optical axis of the conformed film, the optical axis coincident with the tool axis;
cooling the conformed optical film resulting in a symmetric optical film rotationally symmetric about the optical axis; and
molding an optical lens on the symmetric optical film resulting in the optical stack.

Embodiment 383 is the method of embodiment 382, wherein the cooling step further comprises releasing the optical film from the tool.

Embodiment 384 is the method of embodiment 382 or 383, wherein the molding an optical lens step includes molding a second film onto the optical lens opposite the optical film.

Embodiment 385 is the method of embodiment 384, wherein the second film comprises a partial reflector.

Embodiment 386 is the method of any of embodiments 382 to 385, wherein the optical film comprises a reflective polarizer.

Embodiment 387 is the method of embodiment 386, wherein the optical film further comprises a quarter wave retarder.

Embodiment 388 is the method of embodiment 386 or 387, wherein the reflective polarizer is a multilayer polymeric reflective polarizer.

Embodiment 389 is the method of embodiment 388, wherein the reflective polarizer is APF.

Embodiment 390 is the method of embodiment 386 or 387, wherein the reflective polarizer is a wire grid polarizer.

Embodiment 391 is a method of making a desired optical film having a desired shape, comprising: providing a thermoform tool having an external surface having a first shape different than the desired shape;
heating an optical film resulting in a softened optical film;
conforming the softened optical film to the external surface having the first shape while stretching the softened film along at least orthogonal first and second directions resulting in a conformed optical film having the first shape; and
cooling the conformed optical film resulting in the desired optical film having the desired shape.

Embodiment 392 is the method of embodiment 391, wherein the cooling step further comprises releasing the conformed optical film from the tool.

Embodiment 393 is the method of any of embodiments 391 or 392, wherein the desired shape is rotationally symmetric about an optical axis of the desired optical film.

Embodiment 394 is the method of any of embodiments 391 to 393, wherein the thermoform tool is centered on a tool axis and the external surface is rotationally asymmetric about the tool axis.

Embodiment 395 is the method of any of embodiments 391 to 393, further comprising molding an optical lens on the desired optical film resulting in an optical stack.

Embodiment 396 is the method of embodiment 395, wherein the molding an optical lens step includes molding a second film on the optical lens opposite the desired optical film.

Embodiment 397 is the method of embodiment 396, wherein the second film comprises a partial reflector.

Embodiment 398 is the method of any of embodiments 391 to 397, wherein the desired optical film comprises a reflective polarizer.

Embodiment 399 is the method of embodiment 398, wherein the desired optical film further comprises a quarter wave retarder.

Embodiment 400 is the method of embodiment 398 or 399, wherein the reflective polarizer is a multilayer polymeric reflective polarizer.

Embodiment 401 is the method of embodiment 400, wherein the reflective polarizer is APF.

Embodiment 402 is the method of embodiment 398 or 399, wherein the reflective polarizer is a wire grid polarizer.

Embodiment 403 is an optical system, comprising:
an image surface;
a stop surface;
a first optical stack disposed between the image surface and the stop surface and comprising:
   a first optical lens;
   a partial reflector having an average optical reflectance of at least 30% in a desired plurality of wavelengths; and
a second optical stack disposed between the first optical stack and the stop surface and comprising:
   a second optical lens;
   a thermoformed multilayer reflective polarizer rotationally symmetric about an optical axis of the second optical stack and convex toward the image surface along orthogonal first and second axes orthogonal to the optical axis, the thermoformed multilayer reflective polarizer having at least one first location having a radial distance, r1, from an optical axis passing through an apex of the thermoformed multilayer reflective polarizer, and a displacement, s1, from a plane perpendicular to the optical axis at the apex, s1/r1 being at least 0.1; and
   a first quarter wave retarder disposed between the reflective polarizer and the first optical stack.

Embodiment 404 is the optical system of embodiment 403, wherein an image source comprises the image surface and the stop surface is an exit pupil.

Embodiment 405 is the optical system of embodiment 404, wherein the image source comprises a display panel.

Embodiment 406 is the optical system of embodiment 405, wherein the display panel is transparent or semi-transparent.

Embodiment 407 is the optical system of any of embodiments 404 to 406, wherein the image source comprises a shutter.

Embodiment 408 is the optical system of embodiment 403, wherein the image source comprises an aperture adapted to receive light reflected from objects external to the optical system.

Embodiment 409 is the optical system of embodiment 403, wherein an image recorder comprises the image surface and the stop surface is an entrance pupil.

Embodiment 410 is the optical system of any of embodiments 403 to 409, wherein the optical system is centered on a folded optical axis defined by an optical path of a central light ray transmitted through the image surface.

Embodiment 411 is the optical system of any of embodiments 403 to 410, wherein the stop surface is adapted to overlap an entrance pupil of a second optical system.

Embodiment 412 is the optical system of embodiment 411, wherein the second optical system is adapted to record images received at the entrance pupil.

Embodiment 413 is the optical system of embodiment 403, wherein the stop surface is adapted to overlap an entrance pupil of a viewer's eye.

Embodiment 414 is the optical system of embodiment 403, wherein an image source comprises the image surface, the image source emitting unpolarized light.

Embodiment 415 is the optical system of any of embodiments 403 to 414, wherein the first optical stack further comprises a second quarter wave retarder disposed between the partial reflector and the image surface.

Embodiment 416 is the optical system of embodiment 403, wherein an image source comprises the image surface, the image source emitting polarized light.

Embodiment 417 is the optical system of embodiment 416, wherein the polarized light is linearly polarized.

Embodiment 418 is the optical system of embodiment 416, wherein the polarized light is circularly polarized.

Embodiment 419 is the optical system of embodiment 416, wherein the polarized light is elliptically polarized.

Embodiment 420 is the optical system of any of embodiments 403 to 419, wherein the partial reflector is a second reflective polarizer.

Embodiment 421 is the optical system of any of embodiments 403 to 420, wherein the partial reflector has an average optical transmittance of at least 30% in the desired plurality of wavelengths.

Embodiment 422 is the optical system of any of embodiments 403 to 421, wherein the desired plurality of wavelengths comprise at least one continuous wavelength range.

Embodiment 423 is the optical system of any of embodiments 403 to 422, wherein the desired plurality of wavelengths comprises a visible range of wavelengths.

Embodiment 424 is the optical system of embodiment 423, wherein the visible range is from 400 nm to 700 nm.

Embodiment 425 is the optical system of any of embodiments 403 to 424, wherein the desired plurality of wavelengths comprises an infrared range of wavelengths.

Embodiment 426 is the optical system of any of embodiments 403 to 425, wherein the desired plurality of wavelengths comprises one or more of infrared, visible and ultraviolet wavelengths.

Embodiment 427 is the optical system of any of embodiments 403 to 426, wherein the partial reflector is a notch reflector.

Embodiment 428 is the optical system of embodiment 427, wherein the desired plurality of wavelengths comprises one or more continuous wavelength ranges, and wherein at least one of the continuous wavelength ranges has a full width at half maximum of no more than 100 nm.

Embodiment 429 is the optical system of embodiment 428, wherein the full width at half maximum is no more than 50 nm.

Embodiment 430 is the optical system of any of embodiments 403 to 429, wherein s1/r1 is at least 0.2.

Embodiment 431 is the optical system of any of embodiments 403 to 430, wherein s1/r1 is in a range of 0.2 to 0.8.

Embodiment 432 is the optical system any of embodiments 403 to 431, wherein s1/r1 is in a range of 0.3 to 0.6.

Embodiment 433 is the optical system of any of embodiments 424 to 432, wherein the multilayer reflective polarizer has a second location having a radial distance, r2, from the optical axis and a displacement, s2, from the plane, s2/r2 being at least 0.3.

Embodiment 434 is the optical system of any of embodiments 403 to 433, wherein for an area of the reflective polarizer defined by s1 and r1, a maximum variation of a transmission axis of the reflective polarizer is less than about 2 degrees.

Embodiment 435 is the optical system of any of embodiments 403 to 433, wherein for an area of the reflective polarizer defined by s1 and r1, a maximum variation of a transmission axis of the reflective polarizer is less than about 1.5 degrees.

Embodiment 436 is the optical system of any of embodiments 403 to 433, wherein for an area of the reflective polarizer defined by s1 and r1, a maximum variation of a transmission axis of the reflective polarizer is less than about 1 degree.

Embodiment 437 is the optical system of any of embodiments 403 to 436, wherein the first optical lens has a first major surface facing the second optical lens and an opposing second major surface facing the image surface, and the second optical lens has a first major surface facing the stop surface and an opposing second major surface facing the first optical lens.

Embodiment 438 is the optical system of embodiment 437, wherein the partial reflector is disposed on the first or second major surface of the first lens.

Embodiment 439 is the optical system of embodiment 437, wherein the partial reflector is disposed on the first major surface of the first lens and a second quarter wave retarder is disposed on the second major surface of the first lens.

Embodiment 440 is the optical system of embodiment 437, wherein the partial reflector is disposed on the second major surface of the first lens and a second quarter wave retarder is disposed on the partial reflector opposite the second major surface of the first lens.

Embodiment 441 is the optical system of embodiment 437, wherein a second quarter wave retarder is disposed on the first major surface of the first optical lens and the partial reflector is disposed on the second quarter wave retarder opposite the first major surface of the first optical lens.

Embodiment 442 is the optical system of embodiment 437, wherein the first quarter wave retarder is disposed on the second major surface of the second optical lens and the multilayer reflective polarizer is disposed on the first major surface of the second optical lens.

Embodiment 443 is the optical system of embodiment 437, wherein the multilayer reflective polarizer is disposed on the second major surface of the second optical lens and the first quarter wave retarder is disposed on the multilayer reflective polarizer opposite the second major surface of the second optical lens.

Embodiment 444 is the optical system of any of embodiments 403 to 443, wherein the multilayer reflective polarizer comprises at least one layer that is substantially optically biaxial at at least one first location on the at least one layer away from an optical axis of the second optical stack and substantially optically uniaxial at at least one second location away from the optical axis.

Embodiment 445 is the optical system of any of embodiments 403 to 444, wherein substantially any chief light ray that passes through the image surface and the stop surface is incident on each of the first optical stack and the second optical stack with an angle of incidence less than about 25 degrees.

Embodiment 446 is the optical system of any of embodiments 403 to 445, wherein the first and second optical stacks have a substantially same shape.

Embodiment 447 is the optical system of any of embodiments 403 to 445, wherein the first and second optical stacks have different shapes.

Embodiment 448 is the optical system of any of embodiments 403 to 447, wherein each of the first and second lenses are plano lenses.

Embodiment 449 is the optical system of any of embodiments 403 to 448, wherein the first and second optical lenses have a substantially same shape.

Embodiment 450 is the optical system of any of embodiments 403 to 448, wherein the first and second optical lenses have different shapes.

Embodiment 451 is the optical system of any of embodiments 403 to 450, wherein the image surface is substantially planar.

Embodiment 452 is the optical system of any of embodiments 403 to 450, wherein the image surface is substantially curved.

Embodiment 453 is the optical system of embodiment 403, wherein an image source comprises the image surface, the image source emitting an undistorted image, the partial reflector having a first shape, and the reflective polarizer having a different second shape such that a distortion of the emitted undistorted image transmitted by the stop surface is less than about 10% of a field of view at the stop surface.

Embodiment 454 is the optical system of embodiment 453, wherein the distortion of the emitted undistorted image transmitted by the stop surface is less than about 5% of a field of view at the stop surface.

Embodiment 455 is the optical system of embodiment 453, wherein the distortion of the emitted undistorted image transmitted by the stop surface is less than about 3% of a field of view at the stop surface.

Embodiment 456 is the optical system of any of embodiments 403 to 455, wherein substantially any chief light ray having at least first and second wavelengths at least 150 nm apart in a visible wavelength range and transmitted through the image surface and the stop surface has a color separation distance at the stop surface of less than 1.5 percent of a field of view at the stop surface.

Embodiment 457 is the optical system of embodiment 456, wherein the color separation distance at the stop surface is less than 1.2 percent of the field of view at the stop surface.

Embodiment 458 is the optical system of any of embodiments 403 to 457, wherein substantially any chief light ray having at least first and second wavelengths at least 150 nm apart in a visible wavelength range and transmitted through the image surface and the stop surface has a color separation distance at the stop surface of less than 20 arc minutes.

Embodiment 459 is the optical system of embodiment 458, wherein the color separation distance at the stop surface is less than 10 arc minutes.

Embodiment 460 is the optical system of any of embodiments 403 to 459, wherein the partial reflector has a first shape, the multilayer reflective polarizer has a second shape, and one or both of the first and second shapes is described by an aspheric polynomial sag equation.

Embodiment 461 is the optical system of any of embodiments 403 to 460, wherein the multilayer reflective polarizer comprises alternating polymeric layers.

Embodiment 462 is the optical system of any of embodiments 403 to 461, wherein the multilayer reflective polarizer is thermoformed APF.

Embodiment 463 is the optical system of any of embodiments 403 to 461, wherein the multilayer reflective polarizer comprises a wire grid polarizer.

Embodiment 464 is the optical system of any of embodiments 403 to 463, wherein at least one of the first and second optical stacks have an adjustable position relative to the stop and image surfaces.

Embodiment 465 is the optical system of any of embodiments 403 to 464, wherein the first optical stack has an adjustable shape.

Embodiment 466 is an optical system, comprising:
a partial reflector having an average optical reflectance of at least 30% in a desired plurality of wavelengths; and
a multilayer reflective polarizer substantially transmitting light having a first polarization state and substantially reflecting light having an orthogonal second polarization state, the multilayer reflective polarizer convex along orthogonal first and second axes, at least one first location on the multilayer reflective polarizer having a radial distance r1 from an optical axis of the multilayer reflective polarizer and a displacement s1 from a plane perpendicular to the optical axis at an apex of the multilayer reflective polarizer, s1/r1 being at least 0.1; and a first quarter wave retarder disposed between the partial reflector and the multilayer reflective polarizer,
wherein the multilayer reflective polarizer comprises at least one layer substantially optically biaxial at at least one first location on the at least one layer away from the optical axis and substantially optically uniaxial at at least one second location away from the optical axis.

Embodiment 467 is the optical system of embodiment 466, wherein the multilayer reflective polarizer is disposed adjacent to and spaced apart from the partial reflector.

Embodiment 468 is the optical system of embodiment 466 or embodiment 467, wherein a first optical stack comprises a first optical lens and the partial reflector.

Embodiment 469 is the optical system of any of embodiments 466 to 468, where a second optical stack comprises a second optical lens and the multilayer reflective polarizer.

Embodiment 470 is an optical system, comprising:
a first optical stack, the first optical stack comprising:
    a first optical lens; and
    a partial reflector having an average optical reflectance of at least 30% in a desired plurality of wavelengths; and
a second optical stack disposed adjacent to the first optical stack and convex along orthogonal first and second axes, the second optical stack comprising:
    a second optical lens;
    a multilayer reflective polarizer substantially transmitting light having a first polarization state and substantially reflecting light having an orthogonal second polarization state, at least one first location on the multilayer reflective polarizer having a radial distance r1 from an optical axis of the second optical stack and a displacement s1 from a plane perpendicular to the optical axis at an apex of the multilayer reflective polarizer, s1/r1 being at least 0.1; and
a first quarter wave retarder disposed between the second optical stack and the first optical stack, wherein the multilayer reflective polarizer comprises at least one layer substantially optically biaxial at at least one first location on the at least one layer away from the optical axis and substantially optically uniaxial at at least one second location away from the optical axis.

Embodiment 471 is an optical system, comprising:
a first optical stack, the first optical stack comprising:
    a first optical lens; and
    a partial reflector having an average optical reflectance of at least 30% in a desired plurality of wavelengths; and
a second optical stack disposed adjacent to the first optical stack and convex along orthogonal first and second axes, the second optical stack comprising:
    a second optical lens;
    a reflective polarizer substantially transmitting light having a first polarization state and substantially reflecting light having an orthogonal second polarization state, at least one first location on the reflective polarizer having a radial distance r1 from an optical axis of the second optical stack and a displacement s1 from a plane perpendicular to the optical axis at an apex of the reflective polarizer, s1/r1 being at least 0.1; and
a first quarter wave retarder disposed between the second optical stack and the first optical stack, wherein the optical system has a contrast ratio of at least 50 over a field of view of the optical system.

Embodiment 472 is the optical system of embodiment 471, wherein the contrast ratio is at least 60.

Embodiment 473 is the optical system of embodiment 471, wherein the contrast ratio is at least 80.

Embodiment 474 is the optical system of embodiment 471, wherein the contrast ratio is at least 100.

Embodiment 475 is the optical system of any of embodiments 469 to 474, wherein the second optical stack is spaced apart from the first optical stack.

Embodiment 476 is an optical system, comprising:
a first optical stack, the first optical stack comprising:
    a first optical lens; and
    a partial reflector having an average optical reflectance of at least 30% in a desired plurality of wavelengths; and
a second optical stack disposed adjacent to the first optical stack and convex along orthogonal first and second axes, the second optical stack comprising:
    a second optical lens;
    a reflective polarizer substantially transmitting light having a first polarization state and substantially reflecting light having an orthogonal second polarization state, at least one first location on the reflective polarizer having a radial distance r1 from an optical axis of the second optical stack and a displacement s1 from a plane perpendicular to the optical axis at an apex of the reflective polarizer, s being at least 0.1; and
a first quarter wave retarder disposed between the second optical stack and the first optical stack, wherein the optical system is adapted to provide an adjustable dioptric correction.

Embodiment 477 is the optical system of any of embodiments 466 to 476, wherein the reflective polarizer comprises at least one layer substantially optically biaxial at at least one first location on the at least one layer away from the optical axis and substantially optically uniaxial at at least one second location away from the optical axis.

Embodiment 478 is the optical system of any of embodiments 466 to 476, wherein the reflective polarizer is a wire grid polarizer.

Embodiment 479 is the optical system of embodiment 476, wherein the adjustable dioptric correction is provided by one or more of an adjustable distance between the first and second optical stacks, an adjustable shape of the first optical stack, and an adjustable shape of the second optical stack.

Embodiment 480 is the optical system of any of embodiments 466 to 479, further comprising an image surface and a stop surface, the partial reflector disposed between the image surface and the stop surface, the reflective polarizer disposed between the partial reflector and the stop surface.

Embodiment 481 is the optical system of embodiment 480, wherein the reflective polarizer is convex toward the image surface about the orthogonal first and second axes.

Embodiment 482 is the optical system of embodiment 480 or 481, wherein the partial reflector is convex toward the image surface about the orthogonal first and second axes.

Embodiment 483 is the optical system of any of embodiments 480 to 482, wherein substantially any chief light ray that passes through the image surface and the stop surface is incident on each of the partial reflector and the reflective polarizer with an angle of incidence less than about 30 degrees.

Embodiment 484 is the optical system of any of embodiments 480 to 482, wherein substantially any chief light ray that passes through the image surface and the stop surface is incident on each of the partial reflector and the reflective polarizer with an angle of incidence less than about 25 degrees.

Embodiment 485 is the optical system of any of embodiments 466 to 477, or embodiments 479 to 482, wherein the reflective polarizer is APF.

Embodiment 486 is the optical system of any of embodiments 466 to 477, or embodiments 479 to 485, wherein the reflective polarizer is thermoformed APF.

Embodiment 487 is the optical system of any of embodiments 466 to 486, wherein the partial reflector is a second reflective polarizer.

Embodiment 488 is the optical system of any of embodiments 466 to 487, wherein the partial reflector has an average optical transmittance of at least 30% in the desired plurality of wavelengths.

Embodiment 489 is the optical system of any of embodiments 466 to 488, wherein the desired plurality of wavelengths comprise at least one continuous wavelength range.

Embodiment 490 is the optical system of any of embodiments 466 to 489, wherein the desired plurality of wavelengths comprises a visible range of wavelengths.

Embodiment 491 is the optical system of embodiment 490, wherein the visible range is from 400 nm to 700 nm.

Embodiment 492 is the optical system of any of embodiments 466 to 491, wherein the desired plurality of wavelengths comprises an infrared range of wavelengths.

Embodiment 493 is the optical system of any of embodiments 466 to 492, wherein the desired plurality of wavelengths comprises one or more of infrared, visible and ultraviolet wavelengths.

Embodiment 494 is the optical system of any of embodiments 466 to 493, wherein the partial reflector is a notch reflector.

Embodiment 495 is the optical system of embodiment 494, wherein the desired plurality of wavelengths comprises one or more continuous wavelength ranges, and wherein at least one of the continuous wavelength ranges has a full width at half maximum of no more than 100 nm.

Embodiment 496 is the optical system of embodiment 495, wherein the full width at half maximum is no more than 50 nm.

Embodiment 497 is the optical system of any of embodiments 466 to 496, wherein s1/r1 is at least 0.2.

Embodiment 498 is the optical system of any of embodiments 466 to 497, wherein s1/r1 is in a range of 0.2 to 0.8.

Embodiment 499 is the optical system any of embodiments 466 to 498, wherein s1/r1 is in a range of 0.3 to 0.6.

Embodiment 500 is the optical system of any of embodiments 466 to 499, wherein the reflective polarizer has a second location having a radial distance, r2, from the optical axis and a displacement, s2, from the plane, s2/r2 being at least 0.3.

Embodiment 501 is the optical system of any of embodiments 466 to 500, wherein for an area of the reflective polarizer defined by s1 and r1, a maximum variation of a transmission axis of the reflective polarizer is less than about 2 degrees.

Embodiment 502 is the optical system of any of embodiments 466 to 501 being a beam expander.

Embodiment 503 is a beam expander comprising the optical system of any of embodiments 466 to 501.

Embodiment 504 is a projection system comprising the beam expander of embodiment 503 and an image forming device adapted to emit a patterned light, the projection system configured to direct the patterned light toward the beam expander.

Embodiment 505 is the projection system of embodiment 504, wherein the optical system of the beam expander is oriented with the partial reflector facing the image forming device.

Embodiment 506 is the projection system of embodiment 504 or 505, further comprising a polarizing beam splitter disposed between the image forming device and the beam expander.

Embodiment 507 is the projection system of embodiment 506, further comprising a second reflective polarizer disposed between the beam expander and the polarizing beam splitter.

Embodiment 508 is the projection system of embodiment 506 or 507, wherein the polarizing beam splitter comprises first and second prisms and a flat reflective polarizer disposed between the first and second prisms along diagonal faces of the first and second prisms.

Embodiment 509 is the projection system of embodiment 508, wherein the first prism is disposed between the second prism and the image forming device.

Embodiment 510 is the projection system of embodiment 508 or 509, wherein the first prism has a first volume, the second prism has a second volume, and the first volume is no greater than about half the second volume.

Embodiment 511 is a projection system comprising the beam expander of embodiment 503 and an illuminator, the projection system configured to direct a light output from the illuminator toward the beam expander.

Embodiment 512 is the projection system of embodiment 511, where the illuminator comprises:
a polarizing beam splitter comprising:
  a first prism having an input face, an output face and a first hypotenuse;
  a second prism having an imager face and a second hypotenuse, the second hypotenuse disposed adjacent the first hypotenuse; and
  a second reflective polarizer disposed between the first hypotenuse and the second hypotenuse;
a light source disposed adjacent the input face and defining an input active area on the input face; and
an image forming device disposed adjacent the imager face for receiving light emitted from the light source and emitting a patterned light, the image forming device having a largest image area, the largest image area defining an output active area on the output face;
wherein one or both of the input active area and the output active area are less than about half the largest image area.

Embodiment 513 is the projection system of embodiment 512, wherein the input active area is less than about half the largest image area.

Embodiment 514 is the projection system of embodiment 512, wherein the output active area is less than about half the largest image area.

Embodiment 515 is the projection system of embodiment 512, wherein each of the input active area and the output active area is less than about half the largest image area.

Embodiment 516 is the projection system of embodiment 512, wherein a largest surface area of input face is less than about half the largest image area.

Embodiment 517 is the projection system of embodiment 512, wherein a largest surface area of the output face is less than about half the largest image area.

Embodiment 518 is the projection system of embodiment 512, a largest surface area of input face is less than about half the largest image area, and wherein a largest surface area of the output face is less than about half the largest image area.

Embodiment 519 is the projection system of embodiment 512, further comprising a reflective component disposed adjacent the polarizing beam splitter opposite the light source.

Embodiment 520 is the projection system of embodiment 512, wherein the second reflective polarizer is a polymeric multilayer reflective polarizer, a wire grid polarizer, a MacNeille reflective polarizer, or a cholesteric reflective polarizer.

Embodiment 521 is the projection system of embodiment 512, wherein the second reflective polarizer is a polymeric multilayer reflective polarizer.

Embodiment 522 is the optical system of any of embodiments 1 to 333, or any of embodiments 378 to 381, or any of embodiments 403 to 475, wherein the optical system is adapted to provide a dioptric correction.

Embodiment 523 is the optical system of embodiment 522, wherein the dioptric correction is adjustable.

Embodiment 524 is a device comprising the optical system of any of embodiments 1 to 333, or any of embodiments 378 to 381, or any of embodiments 403 to 523.

Embodiment 525 is the device of embodiment 524 being a head-mounted display.

Embodiment 526 is the device of embodiment 524 being a beam expander, an illuminator, or a projector.

Embodiment 527 is the device of embodiment 524 being a camera.

Embodiment 528 is the device of embodiment 524 being a telescope, a microscope or binoculars.

Embodiment 529 is a head-mounted display comprising a first optical system, the first optical system being the optical system of any of embodiments 1 to 333, or any of embodiments 378 to 381, or any of embodiments 403 to 523.

Embodiment 530 is the head-mounted display of any of embodiments 529, further comprising an eye-tracking system.

Embodiment 531 is the head-mounted display of embodiment 530, wherein the optical system is adapted to adjust a location of the reflective polarizer or a location of the partial reflector in response to signals received from the eye-tracking system.

Embodiment 532 is the head-mounted display of embodiment 529, further comprising a second optical system, the second optical system the optical system of any of embodiments 1 to 333, or any of embodiments 378 to 381, or any of embodiments 403 to 523.

Embodiment 533 is the head-mounted display of embodiment 532, further comprising an eye-tracking system.

Embodiment 534 is the head-mounted display of embodiment 533, wherein the optical system is adapted to adjust a location of the reflective polarizer of the first optical system or a location of the partial reflector of the first optical system in response to signals received from the eye-tracking system.

Embodiment 535 is the head-mounted display of embodiment 533 or 534, wherein the optical system is adapted to adjust a location of the reflective polarizer of the second optical system or a location of the partial reflector of the second optical system in response to signals received from the eye-tracking system.

Embodiment 536 is a head-mounted display comprising:
a first optical system comprising:
    a first image surface;
    a first exit pupil;
    a first reflective polarizer disposed between the first exit pupil and the first image surface, the first reflective polarizer convex about two orthogonal axes;
    a first partial reflector disposed between the first reflective polarizer and the first image surface, the first partial reflector having an average optical reflectance of at least 30% in a pre-determined plurality of wavelengths; and
    a first quarter wave retarder disposed between the first reflective polarizer and the first partial reflector; and
a second optical system disposed proximate the first optical system, the second optical system comprising:
    a second image surface;
    a second exit pupil;
    a second reflective polarizer disposed between the second exit pupil and the second image surface, the second reflective polarizer convex about two orthogonal axes;
    a second partial reflector disposed between the second reflective polarizer and the second image surface, the second partial reflector having an average optical reflectance of at least 30% in the pre-determined plurality of wavelengths; and
    a second quarter wave retarder disposed between the second reflective polarizer and the second partial reflector.

Embodiment 537 is the head-mounted display of embodiment 536, wherein an image source comprises the first and second image surfaces.

Embodiment 538 is the head-mounted display of embodiment 537, wherein the image source comprises a display panel.

Embodiment 539 is the head-mounted display of embodiment 538, wherein the display panel is transparent or semi-transparent.

Embodiment 540 is the head-mounted display of any of embodiments 537 to 539, wherein the image source comprises a shutter.

Embodiment 541 is the head-mounted display of embodiment 536, wherein a first image source comprises the first image surface and a second image source comprises the second image surface.

Embodiment 542 is the head-mounted display of embodiment 536, wherein the first image source comprises a first display panel.

Embodiment 543 is the head-mounted display of embodiment 542, wherein the first display panel is transparent or semi-transparent.

Embodiment 544 is the head-mounted display of any of embodiments 541 to 543, wherein the first image source comprises a first shutter.

Embodiment 545 is the head-mounted display of any of embodiments 541 to 544, wherein the second image source comprises a second display panel.

Embodiment 546 is the head-mounted display of embodiment 545, wherein the second display panel is transparent or semi-transparent.

Embodiment 547 is the head-mounted display of any of embodiments 541 to 546, wherein the second image source comprises a second shutter.

Embodiment 548 is the head-mounted display of any of embodiments 536 to 547, wherein the first and second image surfaces are substantially planar.

Embodiment 549 is the head-mounted display of any of embodiments 536 to 547, wherein one or both of the first and second image surfaces are curved.

Embodiment 550 is the head-mounted display of any of embodiments 536 to 549, wherein the first optical system comprises a first optical lens.

Embodiment 551 is the head-mounted display of embodiment 550, wherein the first reflective polarizer is disposed on a major surface of the first optical lens.

Embodiment 552 is the head-mounted display of embodiment 550 or 551, wherein the first optical lens has a non-uniform edge profile.

Embodiment 553 is the head-mounted display of any of embodiments 536 to 552, wherein the second optical system comprises a second optical lens.

Embodiment 554 is the head-mounted display of embodiment 553, wherein the second reflective polarizer is disposed on a major surface of the second optical lens.

Embodiment 555 is the head-mounted display of embodiment 553 or 554, wherein the second optical lens has a non-uniform edge profile.

Embodiment 556 is the head-mounted display of any of embodiments 536 to 555, wherein the first reflective polarizer is the thermoformed multilayer reflective polarizer of any of embodiments 334 to 353.

Embodiment 557 is the head-mounted display of any of embodiments 536 to 556, wherein the second reflective polarizer is the thermoformed multilayer reflective polarizer of any of embodiments 334 to 353.

Embodiment 558 is the head-mounted display of any of embodiments 536 to 557, further comprising an eye-tracking system.

Embodiment 559 is the head-mounted display of embodiment 558, wherein the first optical system is adapted to adjust a distance between the first reflective polarizer and the first partial reflector in response to signals received from the eye-tracking system.

Embodiment 560 is the head-mounted display of embodiment 558 or embodiment 559, wherein the second optical system is adapted to adjust a distance between the second reflective polarizer and the second partial reflector in response to signals received from the eye-tracking system.

Embodiment 561 is the head-mounted display of any of embodiments 536 to 560, wherein the pre-determined plurality of wavelengths comprise at least one continuous wavelength range.

Embodiment 562 is the head-mounted display of any of embodiments 536 to 561, wherein the pre-determined plurality of wavelengths comprises a visible range of wavelengths.

Embodiment 563 is the head-mounted display of embodiment 562, wherein the visible range is from 400 nm to 700 nm.

Embodiment 564 is the head-mounted display of any of embodiments 536 to 563, wherein the pre-determined plurality of wavelengths comprises an infrared range of wavelengths.

Embodiment 565 is the head-mounted display of any of embodiments 536 to 564, wherein the pre-determined plurality of wavelengths comprises one or more of infrared, visible and ultraviolet wavelengths.

Embodiment 566 is the head-mounted display of any of embodiments 536 to 565, wherein the partial reflector is a notch reflector.

Embodiment 567 is the head-mounted display of embodiment 566, wherein the pre-determined plurality of wavelengths comprises one or more continuous wavelength ranges, and wherein at least one of the continuous wavelength ranges has a full width at half maximum of no more than 100 nm.

Embodiment 568 is the head-mounted display of embodiment 566, wherein the pre-determined plurality of wavelengths comprises one or more continuous wavelength ranges, and wherein at least one of the continuous wavelength ranges has a full width at half maximum of no more than 50 nm.

Embodiment 569 is the head-mounted display of any of embodiments 536 to 568, wherein the first optical system is the optical system of any of embodiments 1 to 333, or any of embodiments 378 to 381, or any of embodiments 403 to 523.

Embodiment 570 is the head-mounted display of any of embodiments 536 to 569, wherein the second optical system is the optical system of any of embodiments 1 to 333, or any of embodiments 378 to 381, or any of embodiments 403 to 523.

Embodiment 571 is the head-mounted display of any of embodiments 529 to 570 being a virtual reality display.

Embodiment 572 is a camera comprising:
an aperture;
an image recording device;
a reflective polarizer disposed between the aperture and the image recording device, the reflective polarizer curved about two orthogonal axes;
a partial reflector disposed between the reflective polarizer and the image recording device, the partial reflector having a having an average optical reflectance of at least 30% in a pre-determined plurality of wavelengths; and
a quarter wave retarder disposed between the reflective polarizer and the partial reflector.

Embodiment 573 is the camera of embodiment 572 further comprising a first optical stack, the first optical stack including a first lens and the partial reflector.

Embodiment 574 is the camera of embodiment 572 or 573 further comprising a second optical stack, the second optical stack including a second lens and the reflective polarizer.

Embodiment 575 is the camera of embodiment 572 further comprising an integral optical stack, the integral optical stack comprising a first optical lens, the reflective polarizer, the partial reflector and the quarter wave retarder.

Embodiment 576 is the camera of embodiment 575, wherein the integral optical stack further comprises a second optical lens adjacent the first optical lens, the quarter wave retarder disposed between the first and second optical lenses, the partial reflector disposed on a major surface of the first optical lens opposite the second optical lens, and the reflective polarizer disposed on a major surface of the second optical lens opposite the first optical lens.

Embodiment 577 is the camera of any of embodiments 572 to 576, wherein at least one first location on the reflective polarizer has a radial distance r1 from an optical axis of the reflective polarizer and a displacement s1 from a plane perpendicular to the optical axis at an apex of the reflective polarizer, s1/r1 being at least 0.1.

Embodiment 578 is the camera of embodiment 577, wherein s1/r1 is at least 0.2.

Embodiment 579 is the camera of any of embodiments 577 to 578, wherein the reflective polarizer comprises at least one layer substantially optically biaxial at at least one first location on the at least one layer away from the optical axis and substantially optically uniaxial at at least one second location away from the optical axis.

Embodiment 580 is the camera of any of embodiments 572 to 579, wherein the reflective polarizer is thermoformed APF.

Embodiment 581 is the camera of any of embodiments 572 to 578, wherein the reflective polarizer is a wire grid polarizer.

Embodiment 582 is the camera of any of embodiments 572 to 581, wherein the reflective polarizer is convex towards the image recording device.

Embodiment 583 is the camera of embodiment 572, wherein the camera comprises an optical system, the optical system including the reflective polarizer, the quarter wave retarder and the partial reflector, an image surface and a stop surface, the image surface being a surface of the image recording device and the stop surface being a surface defined by the aperture.

Embodiment 584 is the camera of embodiment 583 wherein the optical system is further characterized by any of embodiments 1 to 333, or any of embodiments 378 to 381, or any of embodiments 403 to 523.

Embodiment 585 is a beam expander comprising:
a partial reflector having a having an average optical reflectance of at least 30% in a pre-determined plurality of wavelengths;
a reflective polarizer disposed adjacent to and spaced apart from the partial reflector, the reflective polarizer curved about two orthogonal axes; and
a quarter wave retarder disposed between the reflective polarizer and the partial reflector.

Embodiment 586 is the beam expander of embodiment 585, wherein the beam expander is adapted to receive converging light incident on the partial reflector and transmit diverging light through the reflective polarizer.

Embodiment 587 is the beam expander of embodiment 585 or 586 further comprising a first optical stack, the first optical stack including a first lens and the partial reflector.

Embodiment 588 is the beam expander of any of embodiments 585 to 587, further comprising a second optical stack, the second optical stack including a second lens and the reflective polarizer.

Embodiment 589 is the beam expander of embodiment 585 or 586 further comprising an integral optical stack, the integral optical stack comprising a first optical lens, the reflective polarizer, the partial reflector and the quarter wave retarder.

Embodiment 590 is the beam expander of embodiment 589, wherein the integral optical stack further comprises a second optical lens adjacent the first optical lens, the quarter wave retarder disposed between the first and second optical lenses, the partial reflector disposed on a major surface of the first optical lens opposite the second optical lens, and the reflective polarizer disposed on a major surface of the second optical lens opposite the first optical lens.

Embodiment 591 is the beam expander of any of embodiments 585 to 590, wherein at least one first location on the reflective polarizer has a radial distance r1 from an optical axis of the reflective polarizer and a displacement s1 from a plane perpendicular to the optical axis at an apex of the reflective polarizer, s1/r1 being at least 0.1.

Embodiment 592 is the beam expander of embodiment 591, wherein s1/r1 is at least 0.2.

Embodiment 593 is the beam expander of any of embodiments 585 to 592, wherein the reflective polarizer comprises at least one layer substantially optically biaxial at at least one first location on the at least one layer away from the optical axis and substantially optically uniaxial at at least one second location away from the optical axis.

Embodiment 594 is the beam expander of any of embodiments 585 to 593, wherein the reflective polarizer is thermoformed APF.

Embodiment 595 is the beam expander of any of embodiments 585 to 592, wherein the reflective polarizer is a wire grid polarizer.

Embodiment 596 is a projection system comprising a light source, an image forming device disposed to receive light from the light source and emit a patterned light, and the beam expander of any of embodiments 585 to 595 disposed such that the patterned light from the image forming device is incident on the partial reflector.

Embodiment 597 is the projection system of embodiment 596, further comprising a polarizing beam splitter disposed between the image forming device and the beam expander.

Embodiment 598 is a projection system comprising a light source, an image forming device disposed to receive light from the light source and emit a converging patterned light, and a beam expander, the beam expander comprising:
a partial reflector having a having an average optical reflectance of at least 30% in a pre-determined plurality of wavelengths;
a reflective polarizer disposed adjacent to and spaced apart from the partial reflector, the reflective polarizer curved about two orthogonal axes; and
a quarter wave retarder disposed between the reflective polarizer and the partial reflector,
wherein the beam expander is disposed such that the converging patterned light from the image forming device is incident on the partial reflector, the beam expander transmitting a diverging patterned light.

Embodiment 599 is the projections system of embodiment 598, wherein the beam expander is further characterized by any of embodiments 586 to 595.

Embodiment 600 is the projections system of embodiment 598 or 599 further comprising a polarizing beam splitter disposed between the image forming device and the beam expander.

Embodiment 601 is an illuminator comprising:
a beam expander comprising a reflective polarizer curved about two orthogonal directions;
a polarizing beam splitter comprising:
a first prism having an input face, an output face and a first hypotenuse;
a second prism having a first face and a second hypotenuse, the second hypotenuse disposed adjacent the first hypotenuse; and
a second reflective polarizer disposed between the first hypotenuse and the second hypotenuse;
a light source disposed adjacent the input face and defining an input active area on the input face; and
a reflective component disposed adjacent the first face for receiving light
emitted from the light source and emitting a converging light, the reflective component having a largest active area, the largest active area defining an output active area on the output face;
wherein the beam expander disposed to receive the converging light and transmit a diverging light, and one or both of the input active area and the output active area are less than about half the largest active area of the reflective component.

Embodiment 602 is the illuminator of embodiment 601, wherein the beam expander further comprises a partial reflector adjacent to and spaced apart from the reflective polarizer, the partial reflector having an average optical reflectance of at least 30% in a pre-determined plurality of wavelengths, the partial reflector disposed between the polarizing beam splitter and the reflective polarizer.

Embodiment 603 is the illuminator of embodiment 602 further comprising a quarter wave retarder disposed between the reflective polarizer and the partial reflector.

Embodiment 604 is the illuminator of any of embodiments 601 to 603, wherein the beam expander is further characterized by any of embodiments 585 to 595.

Embodiment 605 is the illuminator of any of embodiments 601 to 604, wherein the reflective component is an image forming device.

Embodiment 606 is the illuminator of any of embodiments 601 to 605 being an image projector.

Embodiment 607 is a magnifying device comprising an optical system, the optical system comprising:
an exit pupil;
a reflective polarizer proximate the exit pupil, the reflective polarizer curved about two orthogonal axes;
a partial reflector disposed adjacent the reflective polarizer opposite the exit pupil, the partial reflector spaced apart from the reflective polarizer; the partial reflector having a having an average optical reflectance of at least 30% in a pre-determined plurality of wavelengths; and
a quarter wave retarder disposed between the reflective polarizer and the partial reflector.

Embodiment 608 is the magnifying device of embodiment 607, wherein the optical system is further characterized by any of embodiments 1 to 333, or any of embodiments 378 to 381, or any of embodiments 403 to 523.

Embodiment 609 is the magnifying device of embodiment 607 or 608 further comprising an objective portion and an eyepiece portion.

Embodiment 610 is the magnifying device of embodiment 609, wherein the objective portion comprises the reflective polarizer, the partial reflector and the quarter wave retarder.

Embodiment 611 is the magnifying device of embodiment 609, wherein the eyepiece portion comprises the optical system.

Embodiment 612 is the magnifying device of any of embodiments 607 to 611, wherein the optical system further comprises a first optical stack, the first optical stack including a first lens and the partial reflector.

Embodiment 613 is the magnifying device of any of embodiments 607 to 612, wherein the optical system further comprises a second optical stack, the second optical stack including a second lens and the reflective polarizer.

Embodiment 614 is the magnifying device of any of embodiments 607 to 611, wherein the optical system further comprises an integral optical stack, the integral optical stack comprising a first optical lens, the reflective polarizer, the partial reflector and the quarter wave retarder.

Embodiment 615 is the magnifying device of embodiment 614, wherein the integral optical stack further comprises a second optical lens adjacent the first optical lens, the quarter wave retarder disposed between the first and second optical lenses, the partial reflector disposed on a major surface of the first optical lens opposite the second optical lens, and the reflective polarizer disposed on a major surface of the second optical lens opposite the first optical lens.

Embodiment 616 is the magnifying device of any of embodiments 607 to 615, being binoculars, a telescope or a microscope.

Embodiment 617 is the magnifying device of any of embodiments 607 to 616, wherein at least one first location on the reflective polarizer has a radial distance r1 from an optical axis of the reflective polarizer and a displacement s1 from a plane perpendicular to the optical axis at an apex of the reflective polarizer, s1/r1 being at least 0.1.

Embodiment 618 is the magnifying device of embodiment 617, wherein s1/r1 is at least 0.2.

Embodiment 619 is the magnifying device of any of embodiments 607 to 618, wherein the reflective polarizer comprises at least one layer substantially optically biaxial at at least one first location on the at least one layer away from the optical axis and substantially optically uniaxial at at least one second location away from the optical axis.

Embodiment 620 is the magnifying device of any of embodiments 607 to 619, wherein the reflective polarizer is thermoformed APF.

Embodiment 621 is the magnifying device of any of embodiments 607 to 618, wherein the reflective polarizer is a wire grid polarizer.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Descriptions for elements in figures should be understood to apply equally to corresponding elements in other figures, unless indicated otherwise or unless the context clearly indicates otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of making an optical film and lens molded thereto comprising:
    providing a first optical film comprising alternating first and second polymeric layers;
    providing a thermoform tool having a curved surface;
    heating and conforming the first optical film to the curved surface and then releasing the first optical film from the curved surface resulting in a first curved optical film, the first curved optical film being rotationally symmetric about an optical axis, the curved surface being rotationally asymmetric about the optical axis; and
    molding a molten optical material onto the first curved optical film resulting in an optical lens molded to the first curved optical film.

2. The method of claim 1, wherein the molding step comprises molding the optical lens onto a second optical film opposite the first curved optical film.

3. The method of claim 2, wherein the first curved optical film comprises a reflective polarizer and the second optical film comprises a partial reflector.

4. The method of claim 2, further comprising the step of thermoforming the second optical film prior to the molding step.

5. The method of claim 1, wherein the first curved optical film comprises a reflective polarizer.

6. The method of claim 5, wherein the reflective polarizer comprises at least one layer substantially optically uniaxial at at least one location.

7. The method of claim 5, wherein the first curved optical film further comprises a retarder.

8. The method of claim 1, wherein prior to the heating and conforming step, the first polymeric layers are substantially uniaxially oriented and the second polymeric layers are substantially isotropic.

9. The method of claim 1, wherein the molding step comprises film insert molding.

10. The method of claim 1, wherein the molding step comprises injection molding.

11. The method of claim 1, wherein the molten optical material comprises polycarbonate.

12. A method of making an optical film comprising:
providing an optical film;
providing a tool having an external surface having a first shape different than a desired shape, the desired shape being rotationally symmetric about an optical axis, the first shape being rotationally asymmetric about the optical axis;
conforming the optical film to the external surface having the first shape while stretching the optical film along at least orthogonal first and second directions resulting in a conformed optical film having the first shape;
releasing the conformed optical film from the external surface resulting in the optical film having the desired shape.

13. The method of claim 12, wherein the optical film comprises alternating first and second polymeric layers.

14. The method of claim 13, wherein prior to the conforming step, the first polymeric layers are substantially uniaxially oriented and the second polymeric layers are substantially isotropic.

15. The method of claim 12, wherein the optical film having the desired shape is a reflective polarizer comprising at least one layer substantially optically uniaxial at at least one location.

16. The method of claim 12, further comprising molding a molten optical material onto the optical film having the desired shape.

* * * * *

UNITED STATES PATENT AND TRADEMARK OFFICE
CERTIFICATE OF CORRECTION

PATENT NO. : 10,921,594 B2
APPLICATION NO. : 15/987166
DATED : February 16, 2021
INVENTOR(S) : Gregg Ambur It is certified that error appears in the above-identified patent and that said Letters Patent is hereby corrected as shown below:

In the Specification

Column 1
Line 25, Delete "Y4" and insert -- 1/4 --, therefor.

Column 19
Line 4, Delete "20," and insert -- 2θ, --, therefor.

Column 27
Line 50, Delete "a" and insert -- α --, therefor.

Column 27
Line 52, Delete "a" and insert -- α --, therefor.

Column 78
Line 23, Delete "s" and insert -- s1/r1 --, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*